US012429898B2

(12) United States Patent
Paul et al.

(10) Patent No.: US 12,429,898 B2
(45) Date of Patent: Sep. 30, 2025

(54) PATIENT TRANSPORT APPARATUS WITH ASYMMETRIC THROTTLE ASSEMBLY

(71) Applicant: Stryker Corporation, Kalamazoo, MI (US)

(72) Inventors: Anish Paul, Kalamazoo, MI (US); Richard A. Derenne, Portage, MI (US); Tyler Ethen, Portage, MI (US)

(73) Assignee: Stryker Corporation, Portage, MI (US)

( * ) Notice: Subject to any disclaimer, the term of this patent is extended or adjusted under 35 U.S.C. 154(b) by 130 days.

(21) Appl. No.: 18/564,199

(22) PCT Filed: May 27, 2021

(86) PCT No.: PCT/US2021/034631
§ 371 (c)(1),
(2) Date: Nov. 27, 2023

(87) PCT Pub. No.: WO2022/250677
PCT Pub. Date: Dec. 1, 2022

(65) Prior Publication Data

US 2024/0248507 A1 Jul. 25, 2024

(51) Int. Cl.
*A61G 7/08* (2006.01)
*A61G 7/05* (2006.01)
(Continued)

(52) U.S. Cl.
CPC ............. *G05G 5/04* (2013.01); *A61G 7/0528* (2016.11); *A61G 7/08* (2013.01); *G05G 1/08* (2013.01); *G05G 5/05* (2013.01); *G05G 2505/00* (2013.01)

(58) Field of Classification Search
CPC .. G05G 5/04; G05G 1/08; G05G 5/05; G05G 2505/00; A61G 7/00; A61G 7/05;
(Continued)

(56) References Cited

U.S. PATENT DOCUMENTS 7,644,458 B2 1/2010 Foster et al.
8,756,726 B2 6/2014 Hamberg et al.
(Continued)

FOREIGN PATENT DOCUMENTS

JP 2006087598 A 4/2006

OTHER PUBLICATIONS

International Search Report for Application No. PCT/US2021/034631 dated Sep. 10, 2021, 1 page.
(Continued)

*Primary Examiner* — Fredrick C Conley
(74) *Attorney, Agent, or Firm* — Howard & Howard Attorneys PLLC

(57) ABSTRACT

A patient transport apparatus with a throttle arranged for rotation by a user between a maximum forward position and a maximum backward position to modulate propulsion via a wheel drive system. A biasing element urges the throttle toward a neutral position defined between the maximum forward and backward positions. A limiter restricts rotation of the throttle and includes a first surface, a second surface, and a guide arranged to abut the first surface to inhibit rotation beyond the maximum forward position and to abut the second surface to inhibit rotation beyond the maximum backward position. The guide is closer to the second surface than to the first surface in the neutral position such that rotation from the neutral position to the maximum forward position occurs along a first arc and rotation from the neutral position to the maximum backward position occurs along a second arc smaller than the first arc.

20 Claims, 36 Drawing Sheets

(51) Int. Cl.
*G05G 1/08* (2006.01)
*G05G 5/04* (2006.01)
*G05G 5/05* (2006.01)

(58) Field of Classification Search
CPC ...... A61G 7/0528; A61G 7/08; A61G 7/0507; A61G 7/012
See application file for complete search history.

(56) References Cited

U.S. PATENT DOCUMENTS

| | | | | |
|---|---|---|---|---|
| 2016/0302985 | A1 | 10/2016 | Tessmer et al. | |
| 2017/0281440 | A1* | 10/2017 | Puvogel ............... | A61G 7/0527 |
| 2019/0201255 | A1* | 7/2019 | Paul ..................... | A61G 1/0268 |
| 2019/0201256 | A1 | 7/2019 | Derenne et al. | |
| 2020/0138649 | A1 | 5/2020 | Wiggermann | |
| 2021/0000665 | A1 | 1/2021 | Paul et al. | |

OTHER PUBLICATIONS

English language abstract and machine-assisted English translation for JP 2006-087598 A extracted from espacenet.com database on Nov. 28, 2023, 18 pages.

* cited by examiner

PATIENT TRANSPORT APPARATUS WITH ASYMMETRIC THROTTLE ASSEMBLY

BACKGROUND

Patient transport systems facilitate care of patients in a health care setting. Patient transport systems comprise patient transport apparatuses such as, for example, hospital beds, stretchers, cots, tables, wheelchairs, and chairs, to move patients between locations. A conventional patient transport apparatus comprises a base, a patient support surface, and several support wheels, such as four swiveling caster wheels. Often, the patient transport apparatus has one or more non-swiveling auxiliary wheels, in addition to the four caster wheels. The auxiliary wheel, by virtue of its non-swiveling nature, is employed to help control movement of the patient transport apparatus over a floor surface in certain situations.

When a caregiver wishes to use the auxiliary wheel to help control movement of the patient transport apparatus, such as down long hallways or around corners, the auxiliary wheel may be driven by a wheel drive system such that the auxiliary wheel rotates and the patient transport apparatus moves without the caregiver exerting an external force on the patient transport apparatus in a desired direction. In many cases, it's desirable for the auxiliary wheel to be driven at slower speeds in congested areas. However, the caregiver must be cautious in operating the wheel drive system to avoid collisions with objects and people.

With many conventional types of patient transport apparatuses, the caregiver generally selectively moves the auxiliary wheel from a retracted position, out of contact with the floor surface, to a deployed position in contact with the floor surface. In many cases, it is desirable for the auxiliary wheel to retract so that the caregiver may adjust a horizontal position of the patient transport apparatus without having the auxiliary wheel contact the floor surface. However, the caregiver must remember to selectively retract the auxiliary wheel before adjusting the horizontal position of the patient transport apparatus.

A patient transport apparatus designed to overcome one or more of the aforementioned challenges is desired.

SUMMARY

The present disclosure provides a patient transport apparatus including a support structure, a wheel coupled to the support structure to influence motion of the patient transport apparatus over a floor surface, a wheel drive system coupled to the wheel to rotate the wheel relative to the support structure at a rotational speed, and a throttle assembly. The throttle assembly is arranged for engagement by a user and is operably coupled to the wheel drive system to enable the user to modulate propulsion of the patient transport apparatus between a forward direction and a rearward direction. The throttle assembly includes a handle configured to be gripped by the user, and a throttle arranged for user-selected rotation relative to the handle about a central axis between a maximum forward throttle position and a maximum backward throttle position. A throttle biasing element interposed between the throttle and the handle urges the throttle toward a neutral throttle position defined between the maximum forward throttle position and the maximum backward throttle position. A limiter restricts rotation of the throttle relative to the handle. The limiter includes a guide, a first limit surface, and a second limit surface spaced from the first limit surface. The guide is arranged to abut the first limit surface to inhibit rotation of the throttle beyond the maximum forward throttle position, and to abut the second limit surface to inhibit rotation of the throttle beyond the maximum backward throttle position. The guide is positioned closer to the second limit surface than to the first limit surface when the throttle is disposed in the neutral throttle position such that rotation of the throttle from the neutral throttle position to the maximum forward throttle position occurs along a first arc path and rotation of the throttle from the neutral throttle position to the maximum backward throttle position occurs along a second arc path smaller than the first arc path.

DETAILED DESCRIPTION

Figure 1:
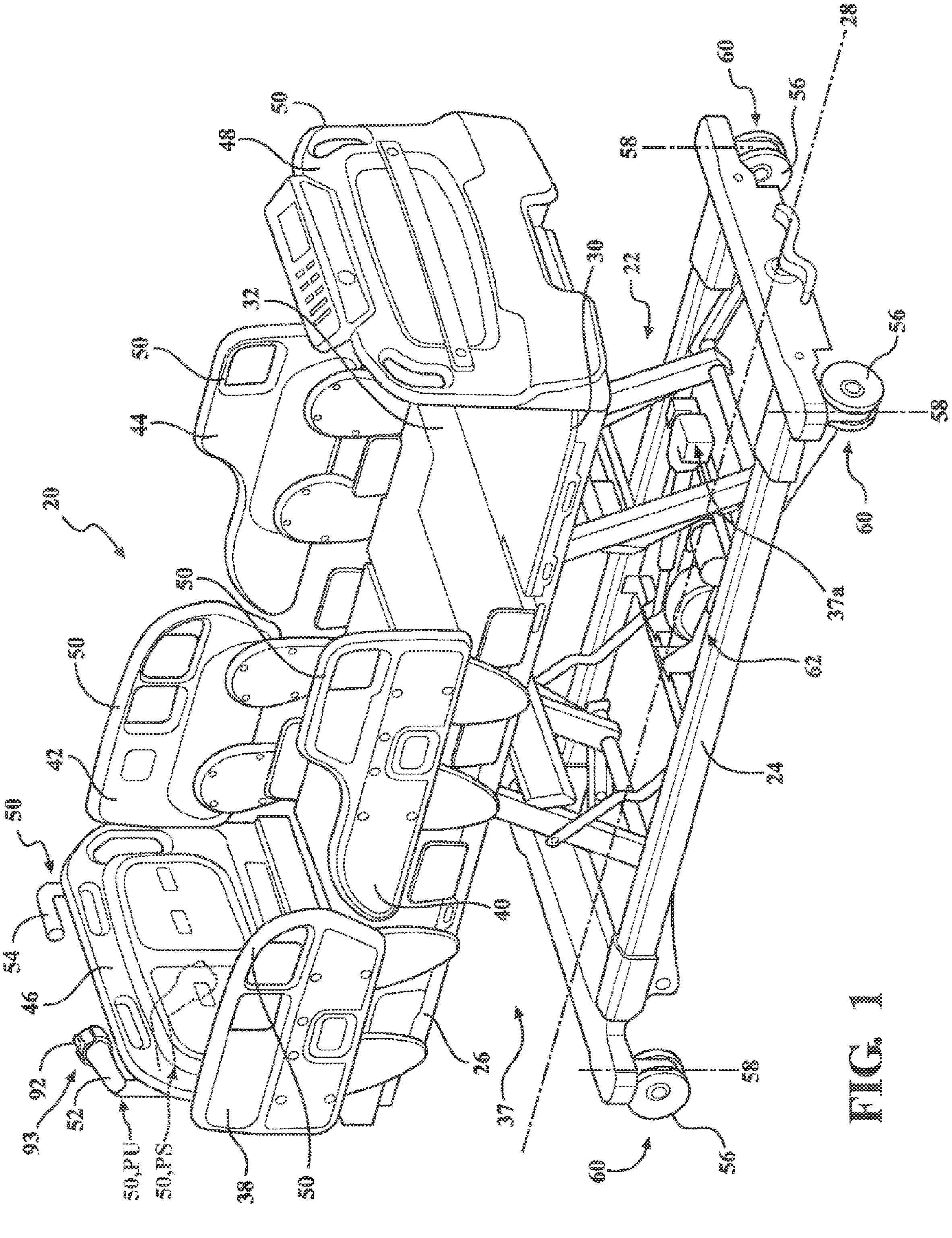
FIG. 1 is a perspective view of a patient transport apparatus according to one version of the present disclosure.

Referring to FIG. 1, a patient transport system comprising a patient transport apparatus 20 is shown for supporting a patient in a health care setting. The patient transport apparatus 20 illustrated in FIG. 1 comprises a hospital bed. In other versions, however, the patient transport apparatus 20 may comprise a stretcher, a cot, a table, a wheelchair, and a chair, or similar apparatus, utilized in the care of a patient to transport the patient between locations.

A support structure 22 provides support for the patient. The support structure 22 illustrated in FIG. 1 comprises a base 24 and an intermediate frame 26. The base 24 defines a longitudinal axis 28 from a head end to a foot end. The intermediate frame 26 is spaced above the base 24. The support structure 22 also comprises a patient support deck 30 disposed on the intermediate frame 26. The patient support deck 30 comprises several sections, some of which articulate (e.g., pivot) relative to the intermediate frame 26, such as a fowler section, a seat section, a thigh section, and a foot section. The patient support deck 30 provides a patient support surface 32 upon which the patient is supported.

In certain versions, such as is depicted in FIG. 1, the patient transport apparatus 20 further comprises a lift assembly, generally indicated at 37, which operates to lift and lower the support frame 36 relative to the base 24. The lift assembly 37 is configured to move the support frame 36 between a plurality of vertical configurations relative to the base 24 (e.g., between a minimum height and a maximum height, or to any desired position in between). To this end, the lift assembly 37 comprises one or more bed lift actuators 37*a* which are arranged to facilitate movement of the support frame 36 with respect to the base 24. The bed lift actuators 37*a* may be realized as linear actuators, rotary actuators, or other types of actuators, and may be electrically operated, hydraulic, electro-hydraulic, or the like. It is contemplated that, in some versions, separate lift actuators could be disposed to facilitate independently lifting the head and foot ends of the support frame 36 and, in other versions, only one lift actuator may be employed, (e.g., to raise only one end of the support frame 36). The construction of the lift assembly 37 and/or the bed lift actuators 37*a* may take on any known or conventional design, and is not limited to that specifically illustrated. One exemplary lift assembly that can be utilized on the patient transport apparatus 20 is described in U.S. Patent Application Publication No. 2016/0302985, entitled "Patient Support Lift Assembly", which is hereby incorporated herein by reference in its entirety.

A mattress, although not shown, may be disposed on the patient support deck 30. The mattress comprises a secondary patient support surface upon which the patient is supported. The base 24, intermediate frame 26, patient support deck 30, and patient support surface 32 each have a head end and a foot end corresponding to designated placement of the patient's head and feet on the patient transport apparatus 20. The construction of the support structure 22 may take on any known or conventional design, and is not limited to that specifically set forth above. In addition, the mattress may be omitted in certain versions, such that the patient rests directly on the patient support surface 32.

Side rails 38, 40, 42, 44 are supported by the base 24. A first side rail 38 is positioned at a right head end of the intermediate frame 26. A second side rail 40 is positioned at a right foot end of the intermediate frame 26. A third side rail 42 is positioned at a left head end of the intermediate frame 26. A fourth side rail 44 is positioned at a left foot end of the intermediate frame 26. If the patient transport apparatus 20 is a stretcher, there may be fewer side rails. The side rails 38, 40, 42, 44 are movable between a raised position in which they block ingress and egress into and out of the patient transport apparatus 20 and a lowered position in which they are not an obstacle to such ingress and egress. The side rails 38, 40, 42, 44 may also be movable to one or more intermediate positions between the raised position and the lowered position. In still other configurations, the patient transport apparatus 20 may not comprise any side rails.

A headboard 46 and a footboard 48 are coupled to the intermediate frame 26. In other versions, when the headboard 46 and footboard 48 are provided, the headboard 46 and footboard 48 may be coupled to other locations on the patient transport apparatus 20, such as the base 24. In still other versions, the patient transport apparatus 20 does not comprise the headboard 46 and/or the footboard 48.

User interfaces 50, such as handles, are shown integrated into the footboard 48 and side rails 38, 40, 42, 44 to facilitate movement of the patient transport apparatus 20 over floor surfaces. Additional user interfaces 50 may be integrated into the headboard 46 and/or other components of the patient transport apparatus 20. The user interfaces 50 are graspable by the user to manipulate the patient transport apparatus 20 for movement.

Other forms of the user interface 50 are also contemplated. The user interface may simply be a surface on the patient transport apparatus 20 upon which the user logically applies force to cause movement of the patient transport apparatus 20 in one or more directions, also referred to as a push location. This may comprise one or more surfaces on the intermediate frame 26 or base 24. This could also comprise one or more surfaces on or adjacent to the headboard 46, footboard 48, and/or side rails 38, 40, 42, 44.

In the version shown in FIG. 1, one set of user interfaces 50 comprises a first handle 52 and a second handle 54. The first and second handles 52, 54 are coupled to the intermediate frame 26 proximal to the head end of the intermediate frame 26 and on opposite sides of the intermediate frame 26 so that the user may grasp the first handle 52 with one hand and the second handle 54 with the other. As is described in greater detail below in connection with FIGS. 12-18B, in some versions the first handle 52 comprises an inner support 53 defining a central axis C, and handle body 55 configured to be gripped by the user. In other versions, the first and second handles 52, 54 are coupled to the headboard 46. In still other versions the first and second handles 52, 54 are coupled to another location permitting the user to grasp the first and second handle 52, 54. As shown in FIG. 1, one or more of the user interfaces (e.g., the first and second handles 52, 54) may be arranged for movement relative to the intermediate frame 26, or another part of the patient transport apparatus 20, between a use position PU arranged for engagement by the user, and a stow position PS (depicted in phantom), with movement between the use position PU and the stow position PS being facilitated such as by a hinged or pivoting connection to the intermediate frame 26 (not shown in detail). Other configurations are contemplated.

Support wheels 56 are coupled to the base 24 to support the base 24 on a floor surface such as a hospital floor. The support wheels 56 allow the patient transport apparatus 20 to move in any direction along the floor surface by swiveling to assume a trailing orientation relative to a desired direction of movement. In the version shown, the support wheels 56 comprise four support wheels each arranged in corners of the base 24. The support wheels 56 shown are caster wheels able to rotate and swivel about swivel axes 58 during transport. Each of the support wheels 56 forms part of a caster assembly 60. Each caster assembly 60 is mounted to the base 24. It should be understood that various configurations of the caster assemblies 60 are contemplated. In addition, in some versions, the support wheels 56 are not caster wheels and may be non-steerable, steerable, non-powered, powered, or combinations thereof. Additional support wheels 56 are also contemplated.

Figure 2:
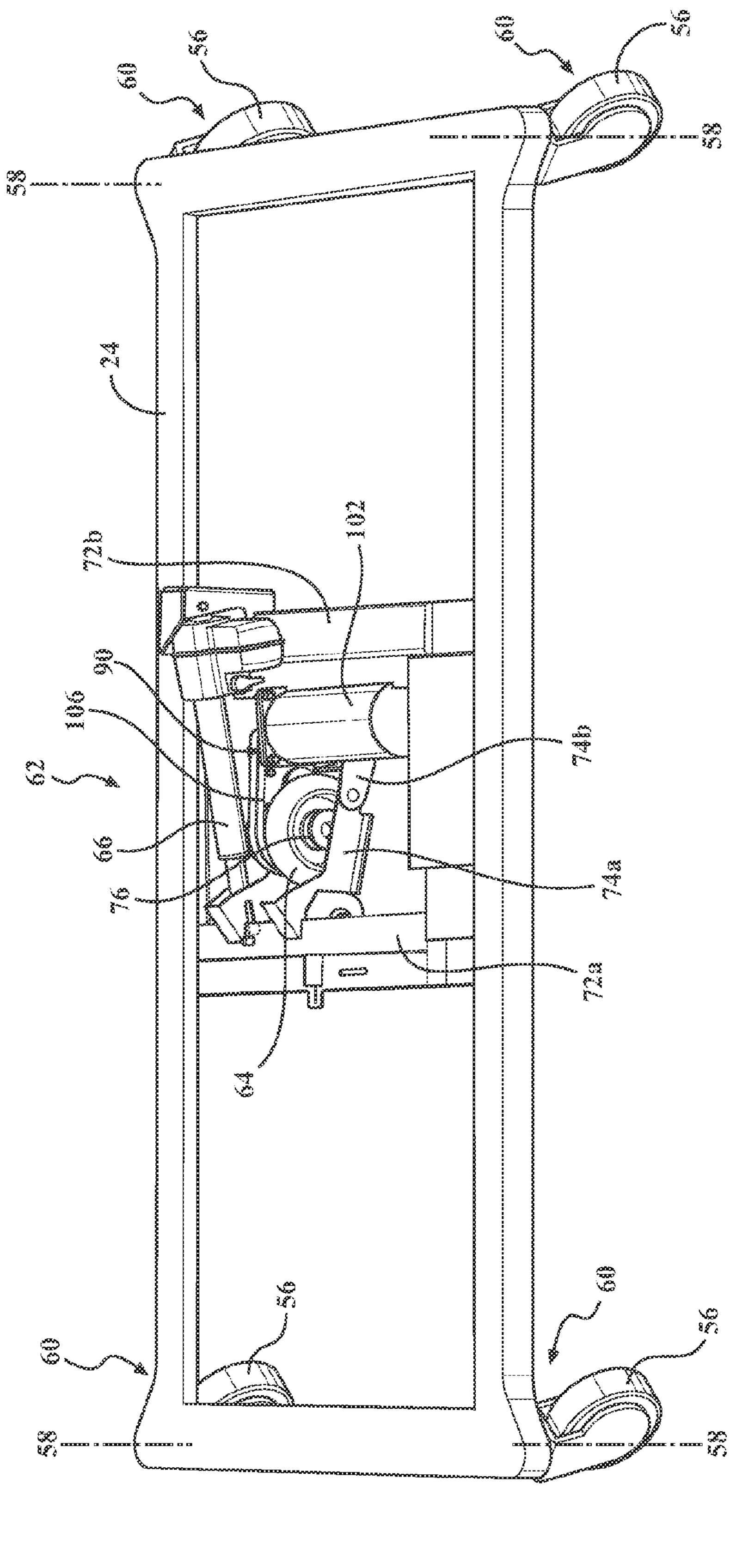
FIG. 2 is a perspective view of an auxiliary wheel assembly of the patient transport apparatus coupled to a base of the patient transport apparatus.
Figure 5A:
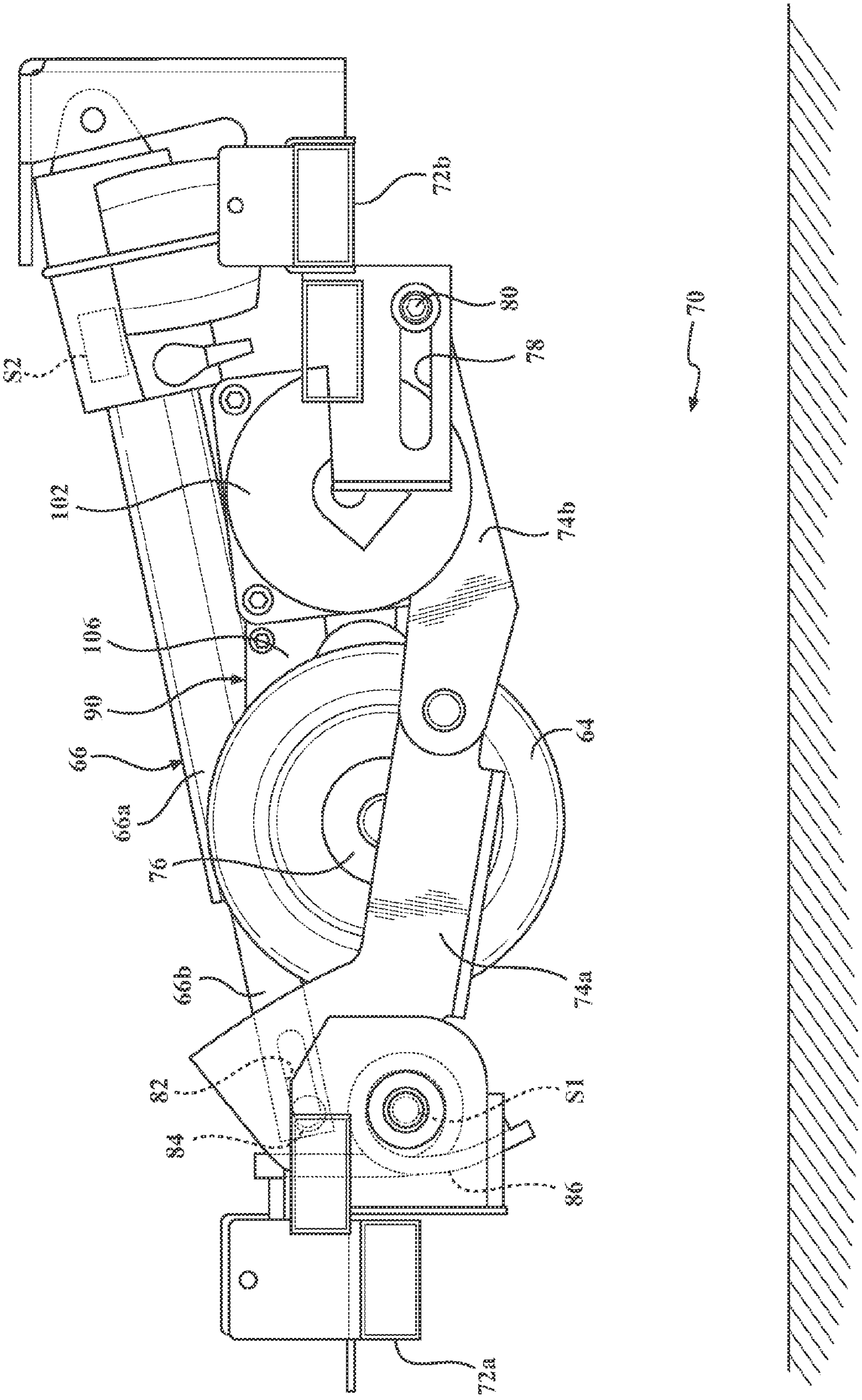
FIG. 5A is an elevational view of the auxiliary wheel in a retracted position.

Referring to FIG. 2, an auxiliary wheel assembly 62 is coupled to the base 24. The auxiliary wheel assembly 62 influences motion of the patient transport apparatus 20 during transportation over the floor surface. The auxiliary wheel assembly 62 comprises an auxiliary wheel 64 and a lift actuator 66 operatively coupled to the auxiliary wheel 64. The lift actuator 66 is operable to move the auxiliary wheel 64 between a deployed position 68 (see FIG. 5C) engaging the floor surface and a retracted position 70 (see FIG. 5A) spaced away from and out of contact with the floor surface. The retracted position 70 may alternatively be referred to as the "fully retracted position." The auxiliary wheel 64 may also be positioned in one or more intermediate positions 71 (see FIG. 5B) between the deployed position 68 (see FIG. 5C) and the retracted position 70 (FIG. 5A). The intermediate position 71 may alternatively be referred to as a "partially retracted position," or may also refer to another "retracted position" (e.g., compared to the "fully" retracted position 70 depicted in FIG. 5A). The auxiliary wheel 64 influences motion of the patient transport apparatus 20 during transportation over the floor surface when the auxiliary wheel 64 is in the deployed position 68. In some versions, the auxiliary wheel assembly 62 comprises an additional auxiliary wheel movable with the auxiliary wheel 64 between the deployed position 68 and the position 70 via the lift actuator 66.

By deploying the auxiliary wheel 64 on the floor surface, the patient transport apparatus 20 can be easily moved down long, straight hallways or around corners, owing to a non-swiveling nature of the auxiliary wheel 64. When the auxiliary wheel 64 is in the retracted position 70 (see FIG. 5A) or in one of the intermediate positions 71, the patient transport apparatus 20 is subject to moving in an undesired direction due to uncontrollable swiveling of the support wheels 56. For instance, during movement down long, straight hallways, the patient transport apparatus 20 may be susceptible to "dog tracking." which refers to undesirable sideways movement of the patient transport apparatus 20. Additionally, when cornering, without the auxiliary wheel 64 deployed, and with all of the support wheels 56 able to swivel, there is no wheel assisting with steering through the corner, unless one or more of the support wheels 56 are provided with steer lock capability and the steer lock is activated.

The auxiliary wheel 64 may be arranged parallel to the longitudinal axis 28 of the base 24. Said differently, the auxiliary wheel 64 rotates about a rotational axis R (see FIG. 3) oriented perpendicularly to the longitudinal axis 28 of the base 24 (albeit offset in some cases from the longitudinal axis 28). In the version shown, the auxiliary wheel 64 is incapable of swiveling about a swivel axis. In other versions, the auxiliary wheel 64 may be capable of swiveling, but can be locked in a steer lock position in which the auxiliary wheel 64 is locked to solely rotate about the rotational axis R oriented perpendicularly to the longitudinal axis 28. In still other versions, the auxiliary wheel 64 may be able to freely swivel without any steer lock functionality.

The auxiliary wheel 64 may be located to be deployed inside a perimeter of the base 24 and/or within a support wheel perimeter defined by the swivel axes 58 of the support wheels 56. In some versions, such as those employing a single auxiliary wheel 64, the auxiliary wheel 64 may be located near a center of the support wheel perimeter, or offset from the center. In this case, the auxiliary wheel 64 may also be referred to as a fifth wheel. In other versions, the auxiliary wheel 64 may be disposed along the support wheel perimeter or outside of the support wheel perimeter. In the version shown, the auxiliary wheel 64 has a diameter larger than a diameter of the support wheels 56. In other versions, the auxiliary wheel 64 may have the same or a smaller diameter than the support wheels 56.

Figure 3:
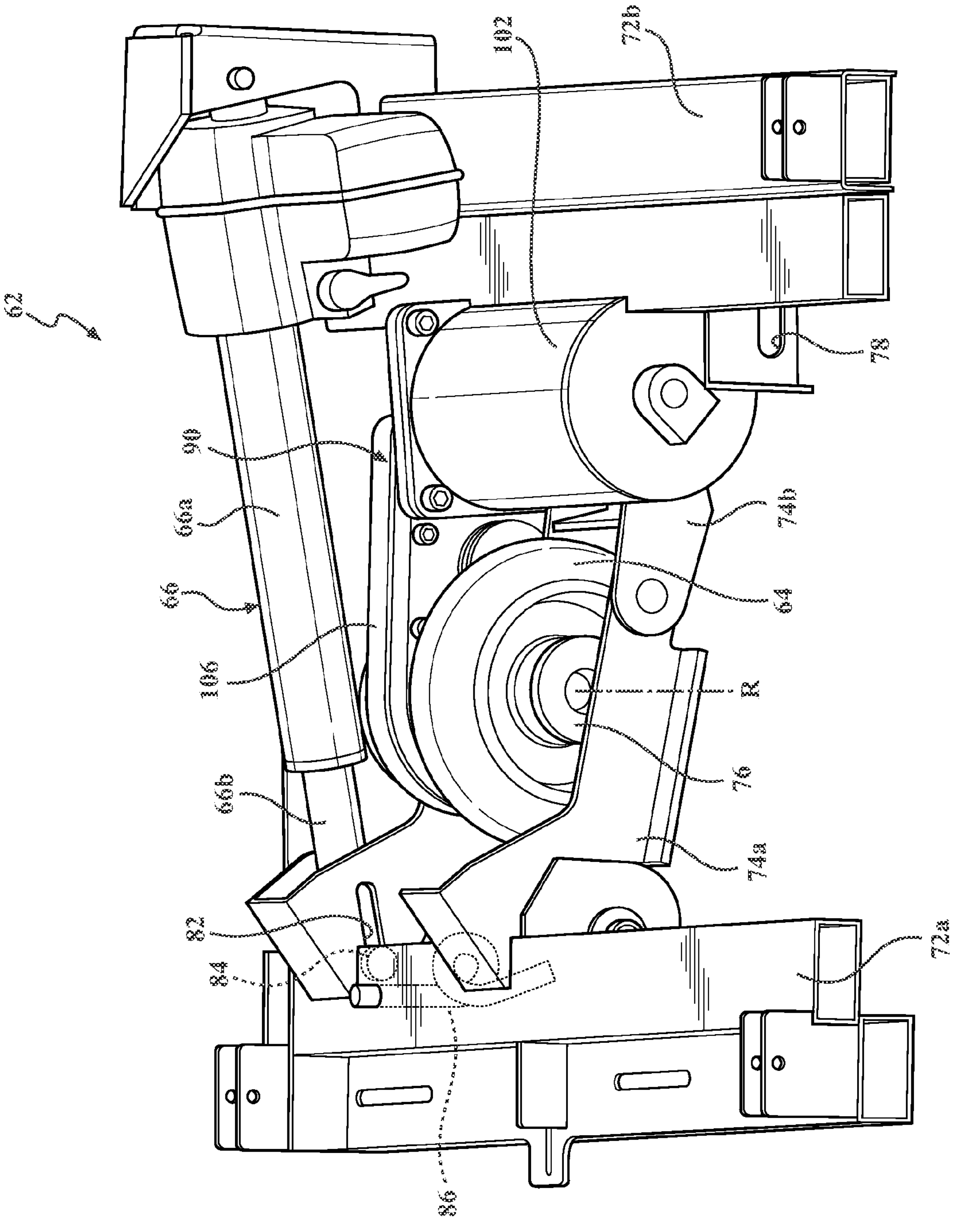
FIG. 3 is a perspective view of the auxiliary wheel assembly comprising an auxiliary wheel and a lift actuator.
Figure 4:
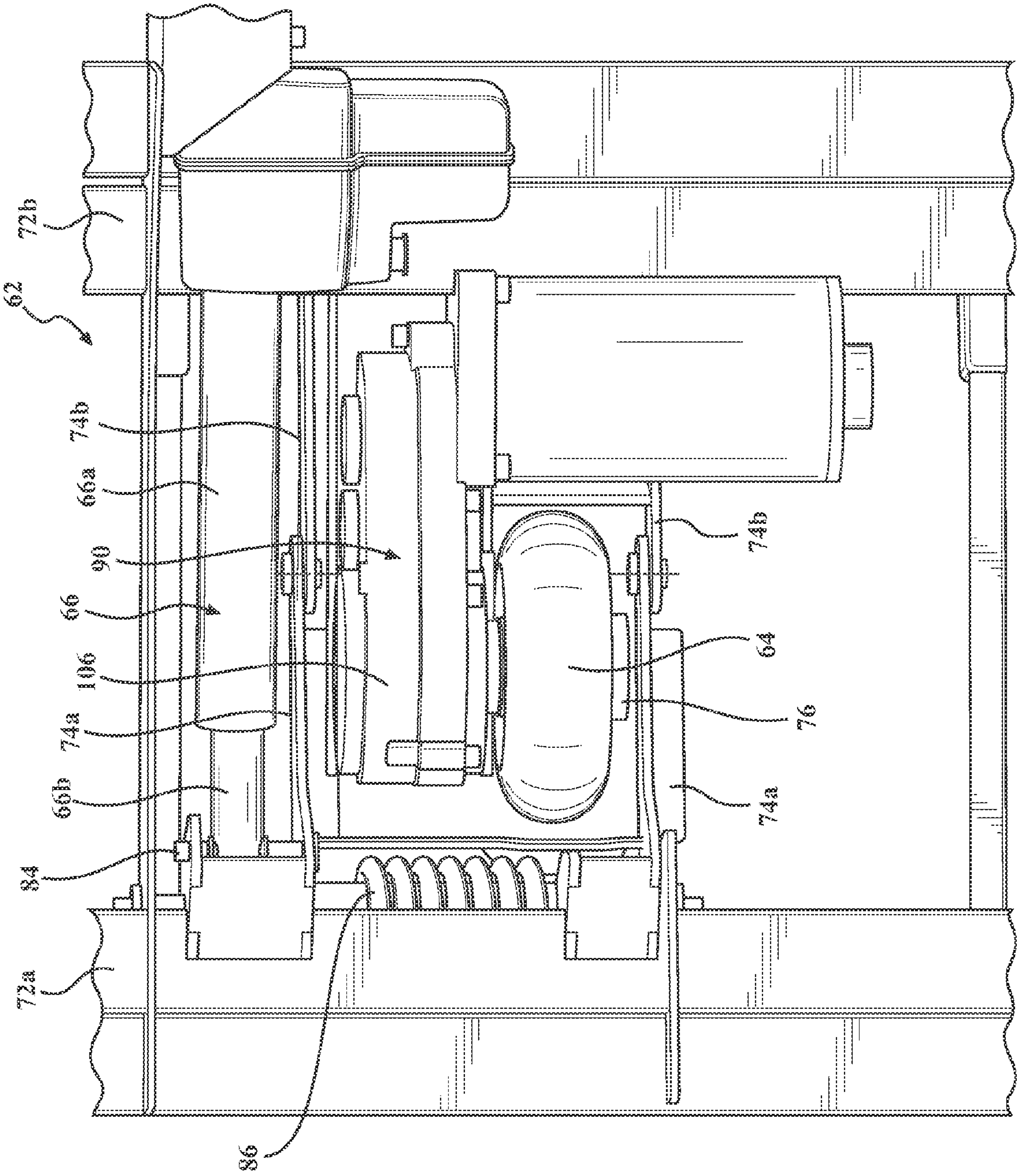
FIG. 4 is a plan view of the auxiliary wheel assembly comprising the auxiliary wheel and the lift actuator.

In one version shown in FIGS. 2-4, the base 24 comprises a first cross-member 72*a* and a second cross-member 72*b*. The auxiliary wheel assembly 62 is disposed between and coupled to the cross-members 72*a*, 72*b*. The auxiliary wheel assembly 62 comprises a first auxiliary wheel frame 74*a* coupled to and arrange to articulate (e.g. pivot) relative to the first cross-member 72*a*. The auxiliary wheel assembly 62 further comprises a second auxiliary wheel frame 74*b* pivotably coupled to the first auxiliary wheel frame 74*a* and the second cross-member 72*b*. The second auxiliary wheel frame 74*b* is arranged to articulate and translate relative to the second cross-member 72*b*. The second cross-member 72*b* defines a slot 78 for receiving a pin 80 (see FIGS. 5A and 5C) connected to the second auxiliary wheel frame 74*b* to permit the second auxiliary wheel frame 74*b* to translate and pivot relative to the second cross-member 72*b*.

In the version shown in FIGS. 3 and 4, the auxiliary wheel assembly 62 comprises an auxiliary wheel drive system 90 (described in more detail below) operatively coupled to the auxiliary wheel 64. The auxiliary wheel drive system 90 is configured to drive (e.g. rotate) the auxiliary wheel 64. In the version shown, the auxiliary wheel drive system 90 comprises a motor 102 coupled to a power source 104 (shown schematically in FIG. 10) and the second auxiliary wheel frame 74*b*. The auxiliary wheel drive system 90 further comprises a gear train 106 coupled to the motor 102 and an axle 76 of the auxiliary wheel 64. In the version shown, the auxiliary wheel 64, the gear train 106, and the motor 102 are arranged and supported by the second auxiliary wheel frame 74*b* to articulate and translate with the second auxiliary wheel frame 74*b* relative to the second cross-member 72*b*. In other versions, the axle 76 of the auxiliary wheel 64 is coupled directly to the second auxiliary wheel frame 74*b* and the auxiliary wheel drive system 90 drives the auxiliary wheel 64 in another manner. Electrical power is provided from the power source 104 to energize the motor 102. The motor 102 converts electrical power from the power source 104 to torque supplied to the gear train 106. The gear train 106 transfers torque to the auxiliary wheel 64 to rotate the auxiliary wheel 64.

In the version shown, the lift actuator 66 is a linear actuator comprising a housing 66*a* and a drive rod 66*b* extending from the housing 66*a*. The drive rod 66*b* has a proximal end received in the housing 66*a* and a distal end spaced from the housing 66*a*. The distal end of the drive rod 66*b* is configured to be movable relative to the housing 66*a* to extend and retract an overall length of the lift actuator 66. The housing 66*a* is pivotally coupled to the second cross-member 72*b* and the distal end of the drive rod 66*b* is coupled to the first auxiliary wheel frame 74*a*. More specifically, the first auxiliary wheel frame 74*a* defines a slot 82 to receive a pin 84 connected to the distal end of the drive rod 66*b* to permit the drive rod 66*b* to translate and pivot relative to the first auxiliary wheel frame 74*a*.

Figure 5B:
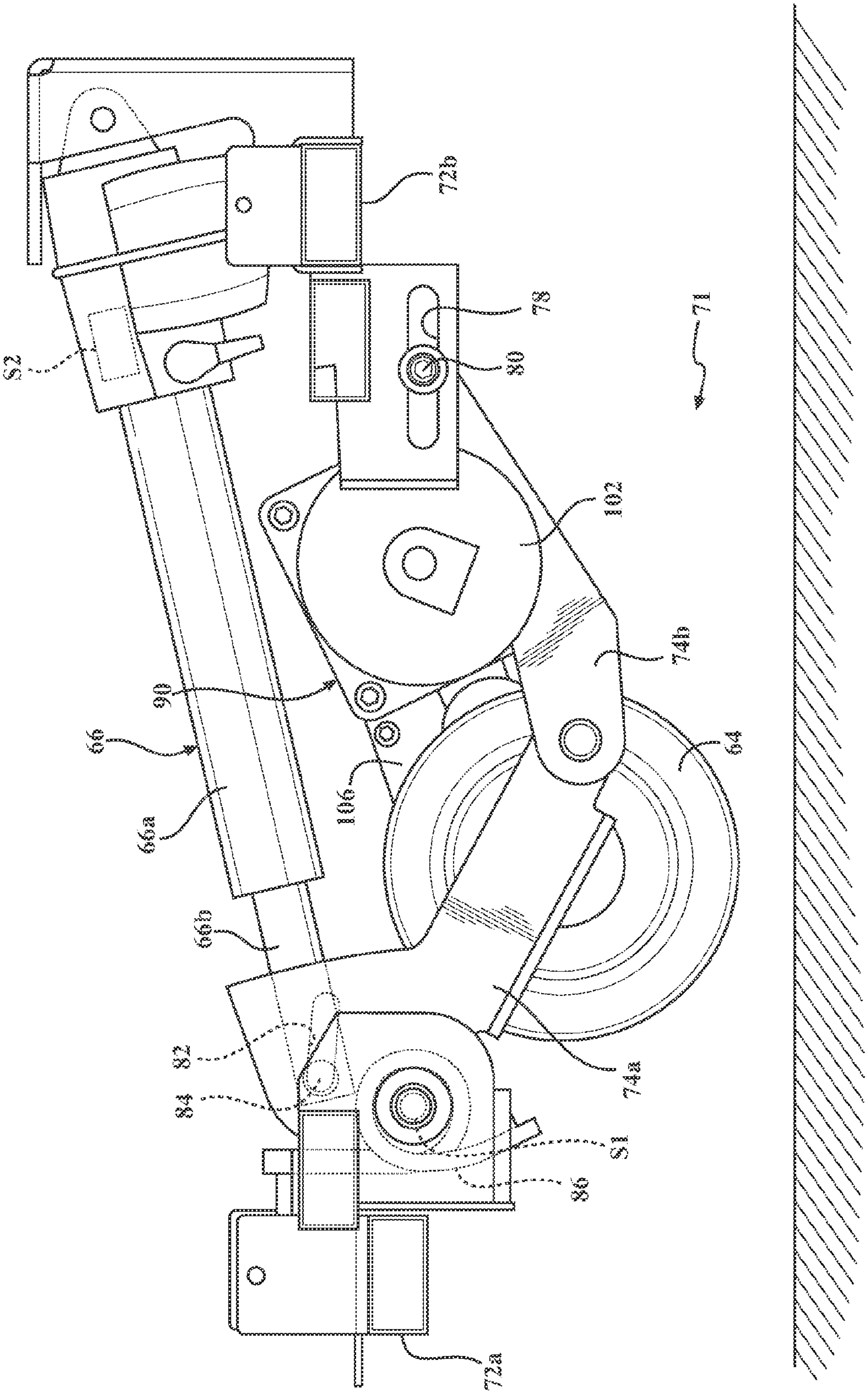
FIG. 5B is an elevational view of the auxiliary wheel in an intermediate position.
Figure 5C:
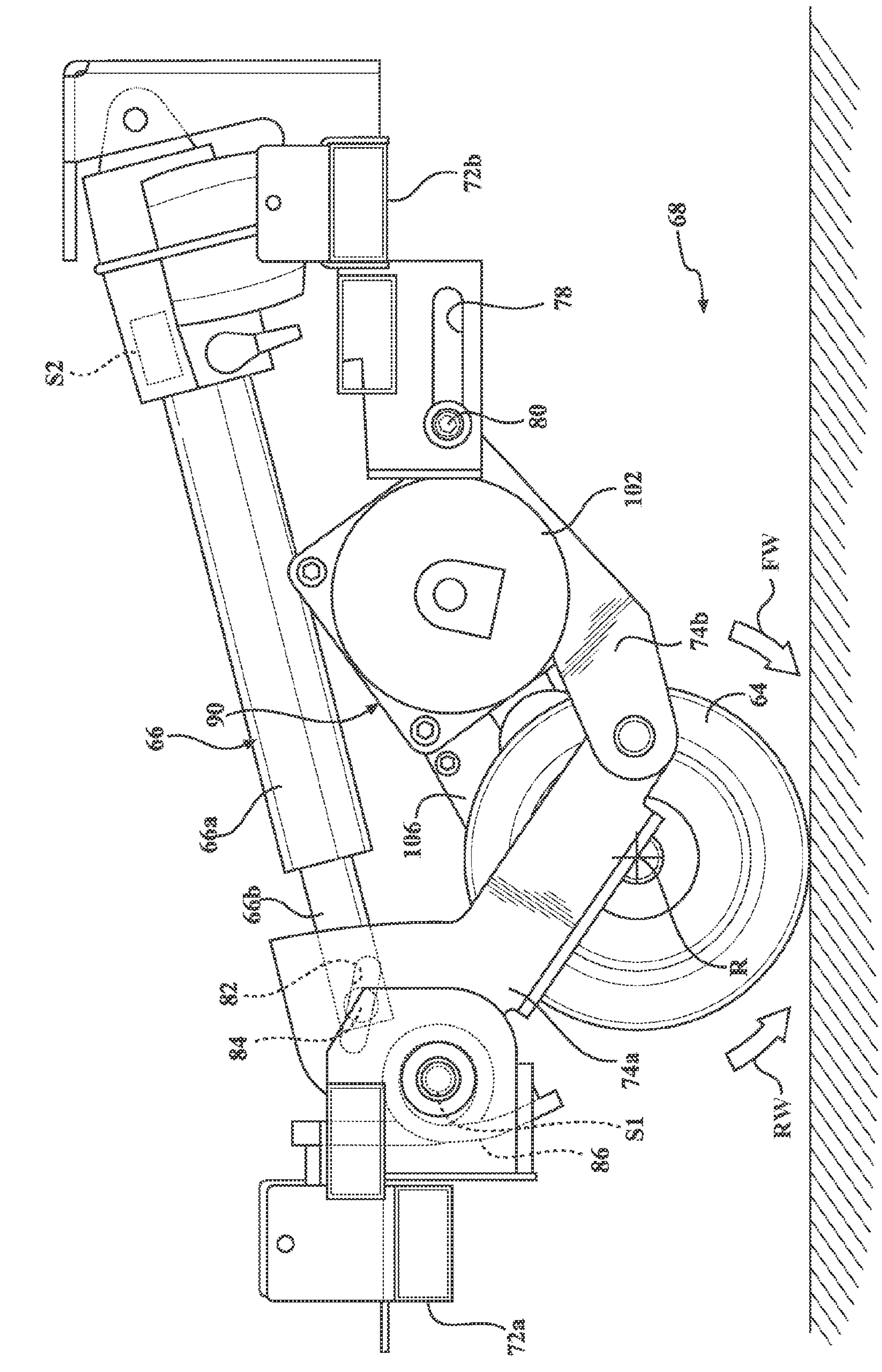
FIG. 5C is an elevational view of the auxiliary wheel in a deployed position.

In the version shown, the auxiliary wheel assembly 62 comprises a biasing device such as a torsion spring 86 to apply a biasing force to bias the first and second auxiliary wheel frames 74*a*, 74*b* toward the floor surface and thus move the auxiliary wheel 64 toward the deployed position 68 (see FIG. 5C). The pin 84 at the distal end of the drive rod 66*b* abuts a first end of the slot 82 to limit the distance the torsion spring 86 would otherwise rotate the first auxiliary wheel frame 74*a* toward the floor surface. Thus, even though the torsion spring 86 applies the force that ultimately causes the auxiliary wheel 64 to move to the floor surface in the deployed position 68, the lift actuator 66 is operable to move the auxiliary wheel 64 to the deployed position 68 and the retracted position 70 or any other position, such as one or more intermediate positions 71 between the deployed position 68 and the retracted position 70.

In the version shown, in the deployed position 68 of FIG. 5C, the lift actuator 66 is controlled so that the pin 84 is located centrally in the slot 82 to permit the auxiliary wheel 64 to move away from the floor surface when encountering an obstacle and to dip lower when encountering a low spot in the floor surface. For instance, when the auxiliary wheel 64 encounters an obstacle, the auxiliary wheel 64 moves up to avoid the obstacle and the pin 84 moves toward a second end of the slot 82 against the biasing force from the torsion spring 86 without changing the overall length of the lift actuator 66. Conversely, when the auxiliary wheel 64 encounters a low spot in the floor surface, the auxiliary wheel 64 is able to travel lower to maintain traction with the floor surface and the pin 84 moves toward the first end of the slot 82 via the biasing force from the torsion spring 86 without changing the overall length of the lift actuator 66.

Referring to FIG. 4, the first and second auxiliary wheel frames 74*a*, 74*b* each comprise first arms pivotably coupled to each other on one side of the auxiliary wheel 64 (as shown in FIG. 3) and second arms pivotably coupled to each other on the other side of the auxiliary wheel 64. The first and second arms are pivotably connected by pivot pins. The first and second arms of the first auxiliary wheel frame 74*a* are rigidly connected to each other such that the first and second arms of the first auxiliary wheel frame 74*a* articulate together relative to the first cross-member 72*a*. The first and second arms of the second auxiliary wheel frame 74*b* are rigidly connected to each other such that the first and second arms of the second auxiliary wheel frame 74*b* articulate and translate together relative to the second cross-member 72*b*. The second cross-member 72*b* defines another slot 78 for receiving another pin 80 connected to the second auxiliary wheel frame 74*b* (one for each arm). The respective first and second arms of the first and second auxiliary wheel frames 74*a*, 74*b* cooperate to balance the force applied by the auxiliary wheel 64 against the floor surface.

Referring to FIG. 5A, the auxiliary wheel 64 is in the retracted position 70 spaced from the floor surface. FIG. 5A illustrates one version of the auxiliary wheel 64 being in a "fully retracted" position 70, and FIG. 5B illustrates one version of the auxiliary wheel 64 being in one of the intermediate positions 71 (which may also referred to as a "partially-retracted" position or a "partially deployed" position). In the retracted position 70, the lift actuator 66 applies a force against the biasing force of the torsion spring 86 to retain a spaced relationship of the auxiliary wheel 64 with the floor surface. To move the auxiliary wheel 64 to the deployed position 68 (see FIG. 5C), the distal end of the drive rod 66*b* is configured to retract into the housing 66*a*, which permits the biasing force of the torsion spring 86 to rotate the first auxiliary wheel frame 74*a*, the second auxiliary wheel frame 74*b*, and the auxiliary wheel 64 toward the floor surface. The second auxiliary wheel frame 74*b* is configured to rotate relative to the first auxiliary wheel frame 74*a* by virtue of the second auxiliary wheel frame 74*b* being pivotably coupled to the first auxiliary wheel frame 74*a* (via a pinned connection therebetween) and pivotably and slidably coupled to the second cross-member 72*b*. In other words, the slot 78 of the second cross-member 72*b* permits the pin 80, and thus the second auxiliary wheel frame 74*b* to move toward the first cross-member 72*a*. To return the auxiliary wheel 64 to the retracted position 70, the lift actuator 66 is configured to apply a force greater than the biasing force of the torsion spring 86 to move the auxiliary wheel 64 away from the floor surface. While a single intermediate position 71 is illustrated in FIG. 5B, one skilled in the art would recognize that there are more than one intermediate positions 71 possible between the deployed position 68 and the retracted position 70.

Referring to FIG. 5C, the auxiliary wheel 64 is in the deployed position 68 engaging the floor surface. In this version, the overall length of the lift actuator 66 is shorter when the auxiliary wheel 64 is in the deployed position 68 than when the auxiliary wheel 64 is in the retracted position 70.

Although an exemplary version of an auxiliary wheel assembly 62 is described above and shown in the drawings, it should be appreciated that other configurations employing a lift actuator 66 to move the auxiliary wheel 64 between the retracted position 70 and deployed position 68 are contemplated.

In some versions, the lift actuator 66 is configured to cease application of force against the biasing force of the torsion spring 86 instantly to permit the torsion spring 86 to move the auxiliary wheel 64 to the deployed position 68 expeditiously. In one version, the auxiliary wheel 64 moves from the retracted position 70 to the deployed position 68 in less than three seconds. In another version, the auxiliary wheel 64 moves from the retracted position 70 to the deployed position 68 in less than two seconds. In still other versions, the auxiliary wheel 64 moves from the retracted position 70 to the deployed position 68 in less than one second.

Figure 6A:
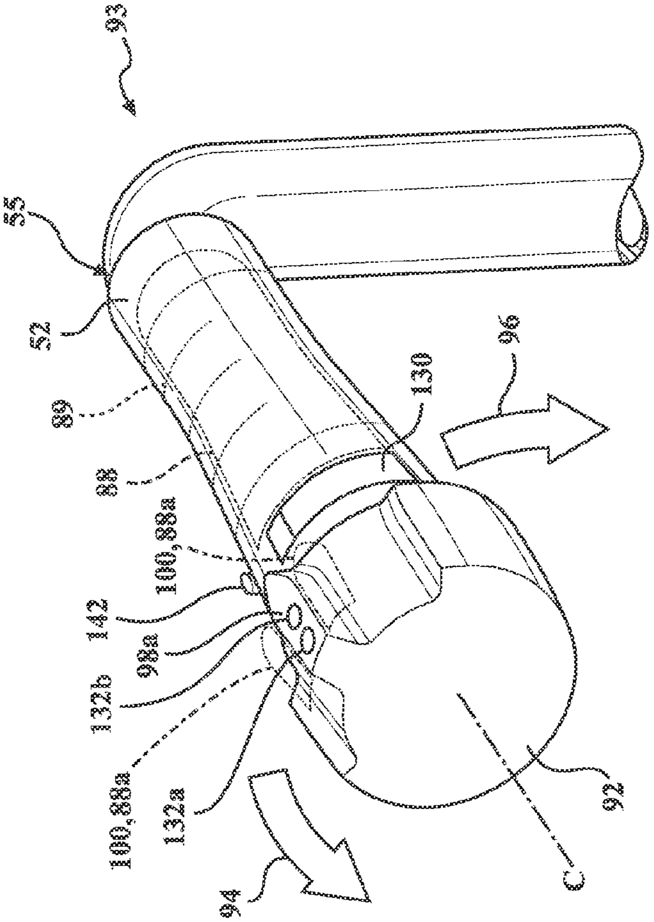
FIG. 6A is a perspective view of a handle and a throttle assembly of the patient transport apparatus.
Figure 6B:
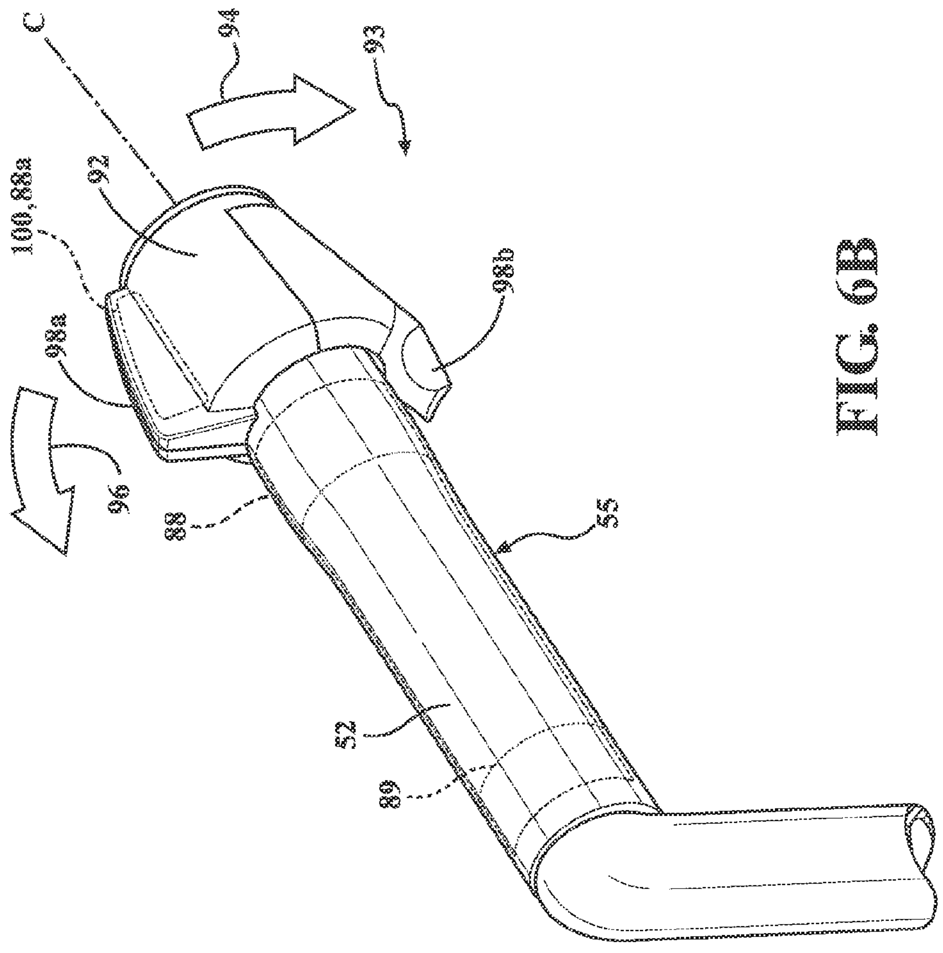
FIG. 6B is another perspective view of the handle and the throttle assembly of the patient transport apparatus.
Figure 7:
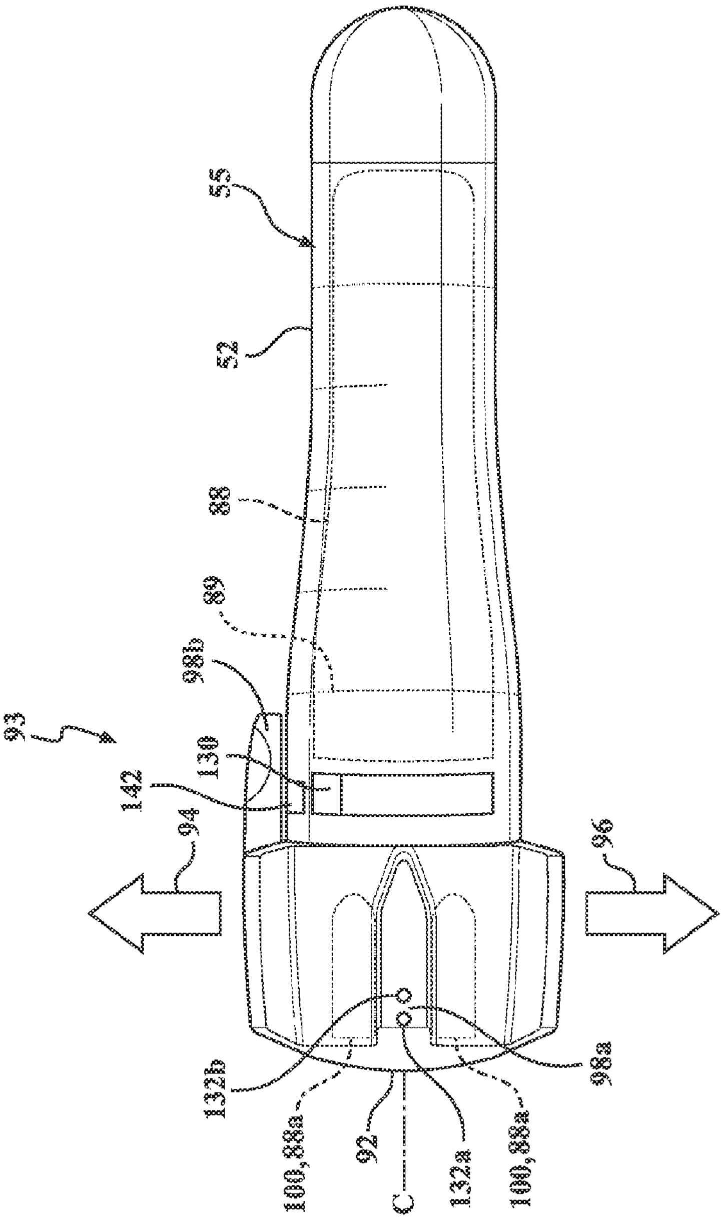
FIG. 7 is a plan view of the handle and the throttle assembly of the patient transport apparatus.

In some versions, such as those shown in FIGS. 6A-7, one or more user interface sensors 88 are coupled to the first handle 52 to determine engagement by the user and generate a signal responsive to touch (e.g. hand placement/contact) of the user. The one or more user interface sensors 88 are operatively coupled to the lift actuator 66 to control movement of the auxiliary wheel 64 between the deployed position 68 and the retracted position 70. Operation of the lift actuator 66 in response to the user interface sensor 88 is described in more detail below. In other versions, the user interface sensor 88 is coupled to another portion of the patient transport apparatus 20, such as another user interface 50.

In some versions, such as those depicted in FIGS. 6A-7, engagement features or indicia 89 are located on the first handle 52 to indicate to the user where the user's hands may be placed on a particular portion of the first handle 52 for the user interface sensor 88 to generate the signal indicating engagement by the user. For instance, the first handle 52 may comprise embossed or indented features to indicate where the user's hand should be placed. In other versions, the indicia 89 comprises a film, cover, or ink disposed at least partially over the first handle 52 and shaped like a handprint to suggest the user's hand should match up with the handprint for the user interface sensor 88 to generate the signal. In still other versions, the shape of the user interface sensor 88 acts as the indicia 89 to indicate where the user's hand should be placed for the user interface sensor 88 to generate the signal. In some versions (not shown), the patient transport apparatus 20 does not comprise a user interface sensor 88 operatively coupled to the lift actuator 66 for moving the auxiliary wheel 64 between the deployed position 68 and the retracted position 70. Instead, a user input device is operatively coupled to the lift actuator 66 for the user to selectively move the auxiliary wheel 64 between the deployed position 68 and the retracted position 70.

Figure 8C:
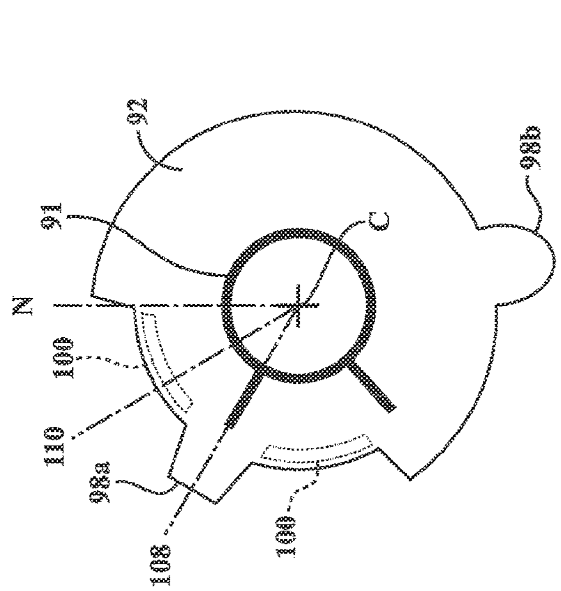
FIG. 8C is an elevational view of a third position of the throttle relative to the handle.
Figure 8B:
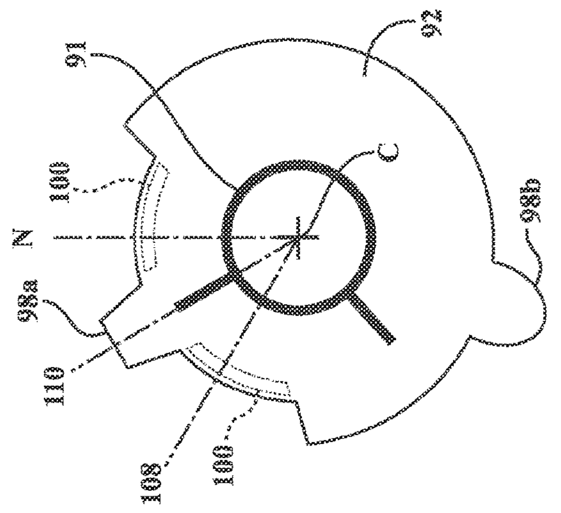
FIG. 8B is an elevational view of a second position of the throttle relative to the handle.
Figure 8A:
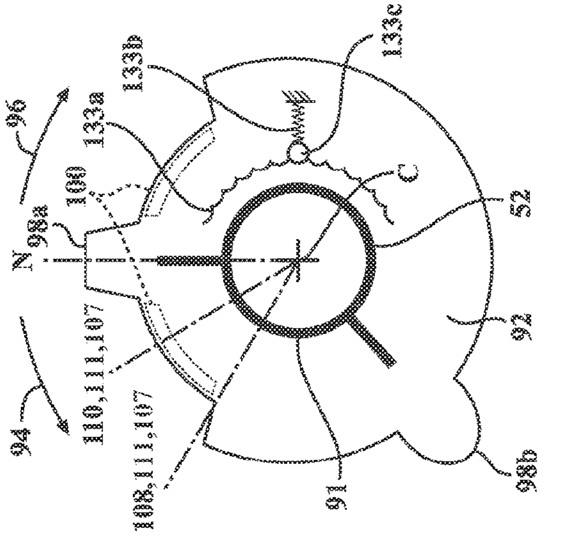
FIG. 8A is an elevational view of a first position of a throttle of the throttle assembly relative to the handle.
Figure 8F:
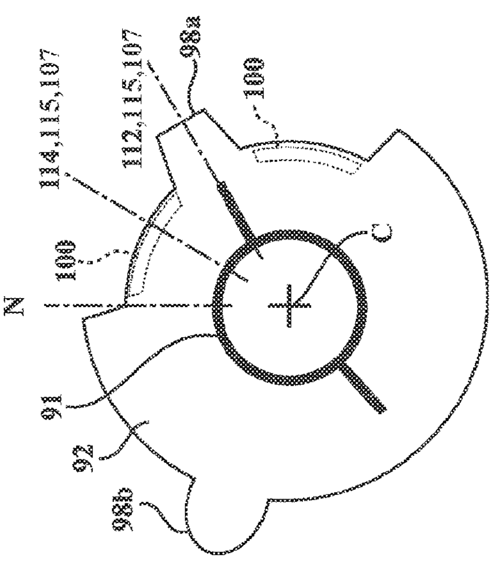
FIG. 8F is an elevational view of a fifth position of the throttle relative to the handle.
Figure 8E:
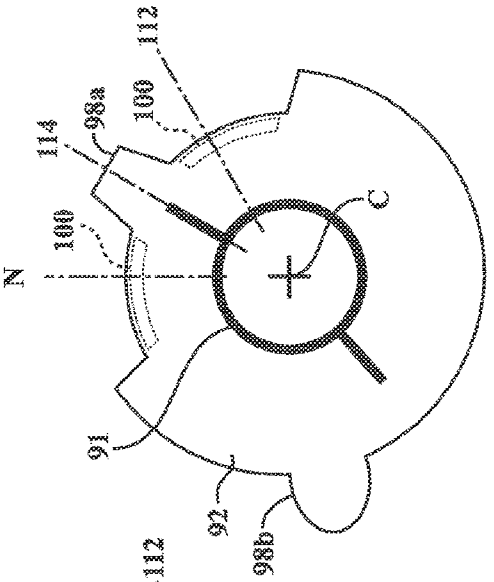
FIG. 8E is an elevational view of a fourth position of the throttle relative to the handle.
Figure 8D:
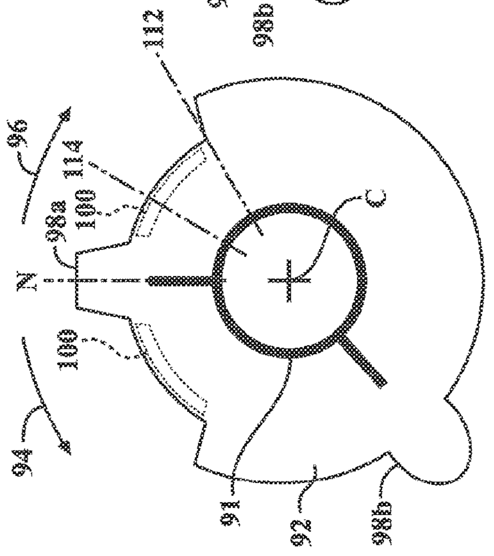
FIG. 8D is another elevational view of the first position of the throttle relative to the handle.

In the versions shown in FIGS. 6A-7, the auxiliary wheel drive system 90 is configured to drive (e.g. rotate) the auxiliary wheel 64 in response to a throttle 92 operable by the user. As is described in greater detail below in connection with FIGS. 12-18B, the throttle 92 is operatively attached to the first handle 52 in the illustrated version to define a throttle assembly 93. In FIGS. 6A-7 the throttle 92 is illustrated in a neutral throttle position N. The throttle 92 is movable in a first direction 94 (also referred to as a "forward direction") relative to the neutral throttle position N and a second direction 96 (also referred to as a "backward direction") relative to the neutral throttle position N opposite the first direction 94. As will be appreciated from the subsequent description below, the auxiliary wheel drive system 90 drives the auxiliary wheel 64 in a forward direction FW (see FIG. 5C) when the throttle 92 is moved in the first direction 94, and in a rearward direction RW (see FIG. 5C) when the throttle 92 is moved in the second direction 96. When the throttle 92 is disposed in the neutral throttle position N, as shown in FIG. 6A (see also FIGS. 8A and 8D), the auxiliary wheel drive system 90 does not drive the auxiliary wheel 64 in either direction. In many versions, the throttle 92 is spring-biased to the neutral throttle position N. In some versions, when the throttle 92 is in the neutral throttle position N, the auxiliary wheel drive system 90 permits the auxiliary wheel 64 to be manually rotated as a result of a user pushing on the first handle 52 or another user interface 50 to push the patient transport apparatus 20 in a desired direction. In other words, the motor 102 may be unbraked and capable of being driven manually. In some versions, a throttle biasing element 91 such as a torsion spring (shown schematically in FIGS. 8A-8F) is used to bias or otherwise urge the throttle 92 to the neutral throttle position N such that when a user releases the throttle 92 after rotating the throttle 92 relative to the first handle 52 in either direction, the throttle biasing element 91 returns the throttle 92 to the neutral throttle position N.

It should be appreciated that the terms forward and backward are used to describe opposite directions that the auxiliary wheel 64 rotates to move the base 24 along the floor surface. For instance, forward refers to movement of the patient transport apparatus 20 with the foot end leading and backward refers to the head end leading. In other versions, backward rotation moves the patient transport apparatus 20 in the direction with the foot end leading and forward rotation moves the patient transport apparatus 20 in the direction with the head end leading. In this version, the handles 52, 54 may be located at the foot end.

Referring to FIGS. 6A-7, the location of the throttle 92 relative to the first handle 52 permits the user to simultaneously grasp the handle body 55 of the first handle 52 and rotate the throttle 92 about the central axis C defined by the inner support 53. This allows the user interface sensor 88, which is operatively attached to the handle body 55 in the illustrated version, to generate the signal responsive to touch by the user while the user moves the throttle 92. In some versions, the throttle 92 comprises one or more throttle interfaces for assisting the user with rotating the throttle 92; more specifically, a thumb throttle interface 98*a* arranged so as to be engaged or otherwise operated by a user's thumb, and a finger throttle interface 98*b* arranged so as to be engaged or otherwise operated by one or more fingers of the user (e.g. forefinger). In some versions, the throttle 92 comprises only one of the throttle interfaces 98*a*, 98*b*. The user may place their thumb on either side of the thumb throttle and finger throttle interfaces 98*a*, 98*b* to assist in rotating the throttle 92 relative to the first handle 52. In some versions, the user may rotate the throttle 92 in the first direction 94 using the thumb throttle interface 98*a* and in the second direction 96 using the finger throttle interface 98*b*, or vice-versa.

In some versions, the throttle assembly 93 may comprise one or more auxiliary user interface sensors 88A, in addition to the user interface sensor 88, to determine engagement by the user. In the version illustrated in FIGS. 6A-7, the auxiliary user interface sensors 88A are realized as throttle interface sensors 100 respectively coupled to each of the throttle interface 98*a*, 98*b* and operatively coupled to the auxiliary wheel drive system 90 (e.g., via electrical communication). The throttle interface sensors 100 are likewise configured to determine engagement by the user and generate a signal responsive to touch of the user's thumb and/or fingers. When the user is touching one or more of the throttle interfaces 98*a*, 98*b*, the throttle interface sensors 100 generate a signal indicating the user is currently touching one or more of the throttle interfaces 98*a*, 98*b* and movement of the throttle 92 is permitted to cause rotation of the auxiliary wheel 64. When the user is not touching any of the throttle interfaces 98*a*, 98*b*, the throttle interface sensors 100 generate a signal indicating an absence of the user's thumb and/or fingers on the throttle interfaces 98*a*, 98*b*, and movement of the throttle 92 is restricted from causing rotation of the auxiliary wheel 64. The throttle interface sensors 100 mitigate the chances for inadvertent contact with the throttle 92 to unintentionally cause rotation of the auxiliary wheel 64. The throttle interface sensors 100 may be absent in some versions. As is described in greater detail below in connection with FIGS. 12-18B, other types of auxiliary user interface sensors 88A are contemplated by the present disclosure besides the throttle interface sensors 100 described above. Furthermore, it will be appreciated that certain versions may comprise both the user interface sensor 88 and the auxiliary user interface sensor 88*a* (e.g., one or more throttle interface sensors 100), whereas other versions may comprise only one of either the user interface sensor 88 and the auxiliary user interface sensor 88*a*. Other configurations are contemplated.

Referring to FIGS. 8A-8F, various positions of the throttle 92 are shown. The throttle 92 is movable relative to the first handle 52 in a first throttle position, a second throttle position, and intermediate throttle positions therebetween. The throttle 92 is operable between the first throttle position and the second throttle position to adjust the rotational speed of the auxiliary wheel.

Figure 22A:
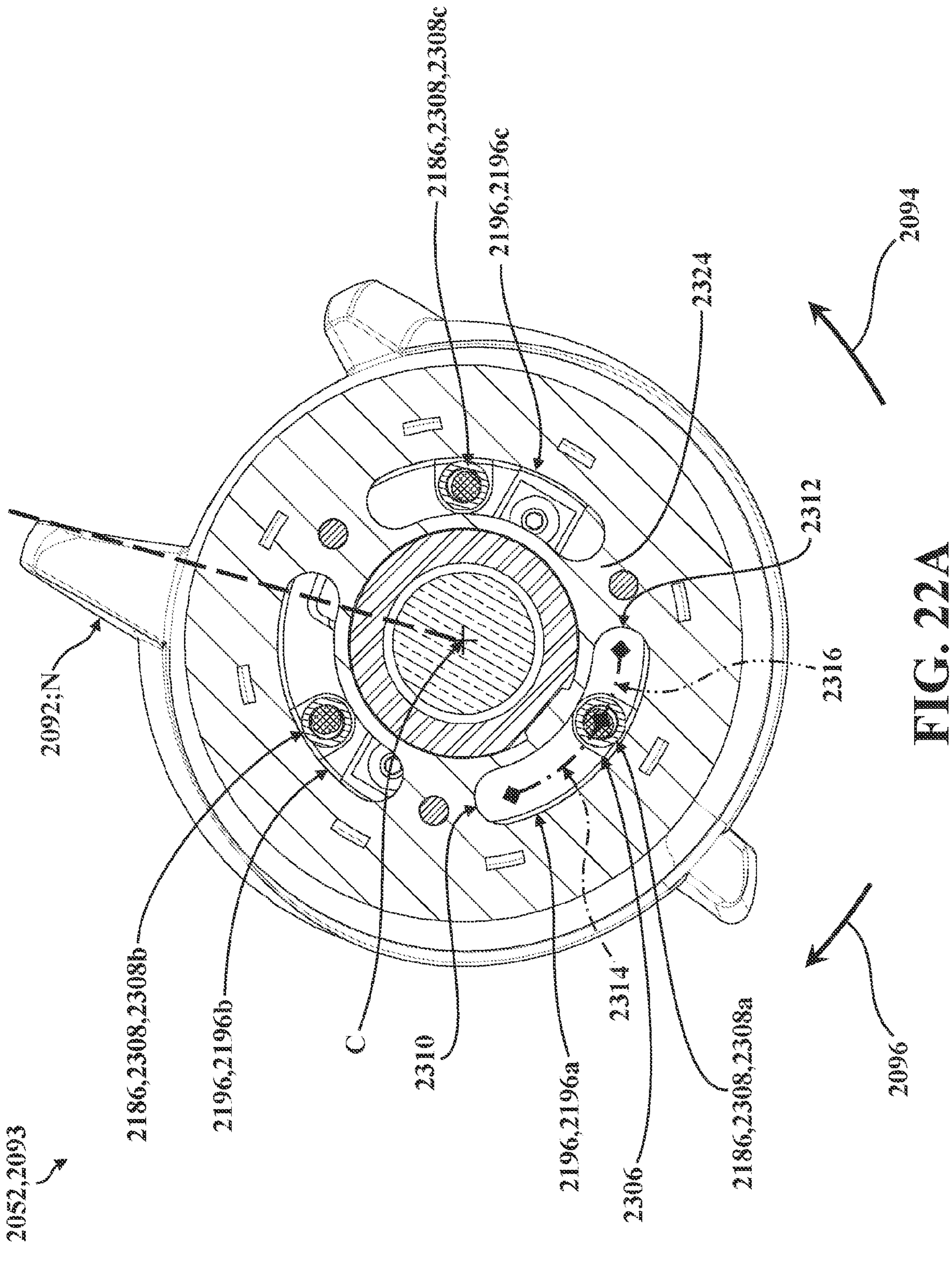
FIG. 22A is a sectional view of the throttle assembly and the handle taken as indicated by line 22-22 in FIG. 19, depicting the throttle in a neutral throttle position relative to the handle.
Figure 22B:
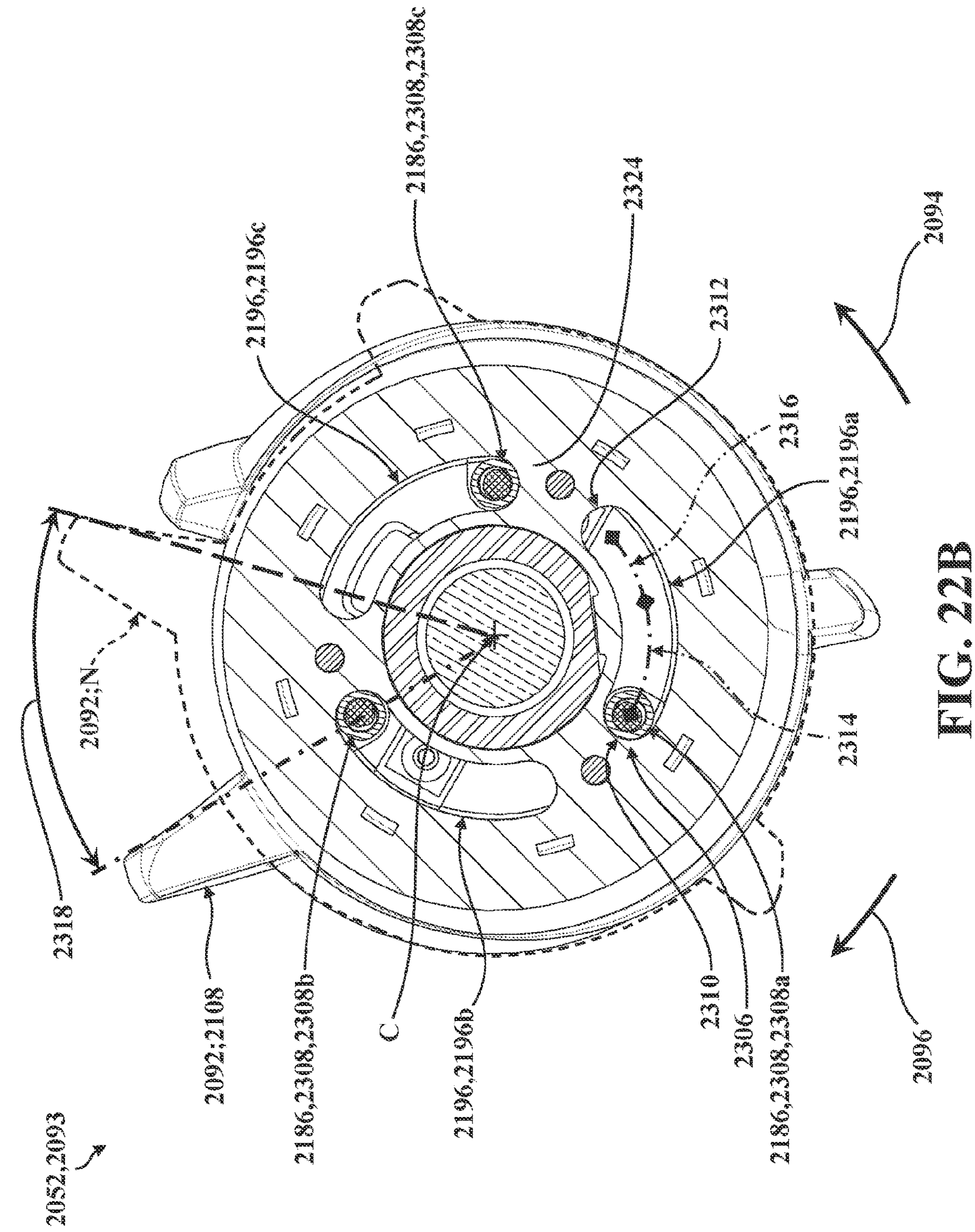
FIG. 22B is another sectional view of the throttle assembly and the handle taken as indicated by line 22-22 in FIG. 19, depicting the throttle in a maximum forward throttle position relative to the handle.

In some versions, the first throttle position corresponds with the neutral throttle position N (shown in FIGS. 8A and 8D; see also FIGS. 16A, 22A, and 23A) and the auxiliary wheel 64 is at rest. The second throttle position is defined as an operating throttle position 107 (see FIG. 8A) and, more specifically, corresponds with a maximum forward position 108 (shown in FIG. 8C; see also FIGS. 16B, 22B, and 23B) of the throttle 92 moved in the first direction 94. Here, the intermediate throttle position is also defined as an operating throttle position 107 and, more specifically, corresponds with an intermediate forward throttle position 110 (shown FIG. 8B) of the throttle 92 between the neutral throttle position N and the maximum forward throttle position 108. Here, both the maximum forward position 108 and the intermediate forward throttle position 110 may also be referred to as forward throttle positions 111 (see FIG. 8A).

In other cases, the second throttle position corresponds with a maximum backward throttle position 112 (shown in FIG. 8E; see also FIGS. 16C, 22C, and 23C) of the throttle 92 moved in the second direction 96. Here, the intermediate throttle position corresponds with an intermediate backward throttle position 114 (shown in FIG. 8F) of the throttle 92 between the neutral throttle position N and the maximum backward throttle position 112. Here, both the maximum backward throttle position 112 and the intermediate backward throttle position 114 may also be referred to as backward throttle positions 115 (see FIG. 8F). In the versions shown, the throttle 92 is movable from the neutral throttle position N to one or more operating throttle positions 107 (see FIGS. 8A and 8F) between the maximum backward throttle position 112 and the maximum forward throttle position 108, including a plurality of forward throttle positions 111 (e.g., the intermediate forward throttle position 110) between the neutral throttle position N and the maximum forward throttle position 108 as well as a plurality of backward throttle positions 115 (e.g., the intermediate backward throttle position 114) between the neutral throttle position N and the maximum backward throttle position 112. The configuration of the throttle 92 and the throttle assembly 93 will be described in greater detail below.

Figure 10:
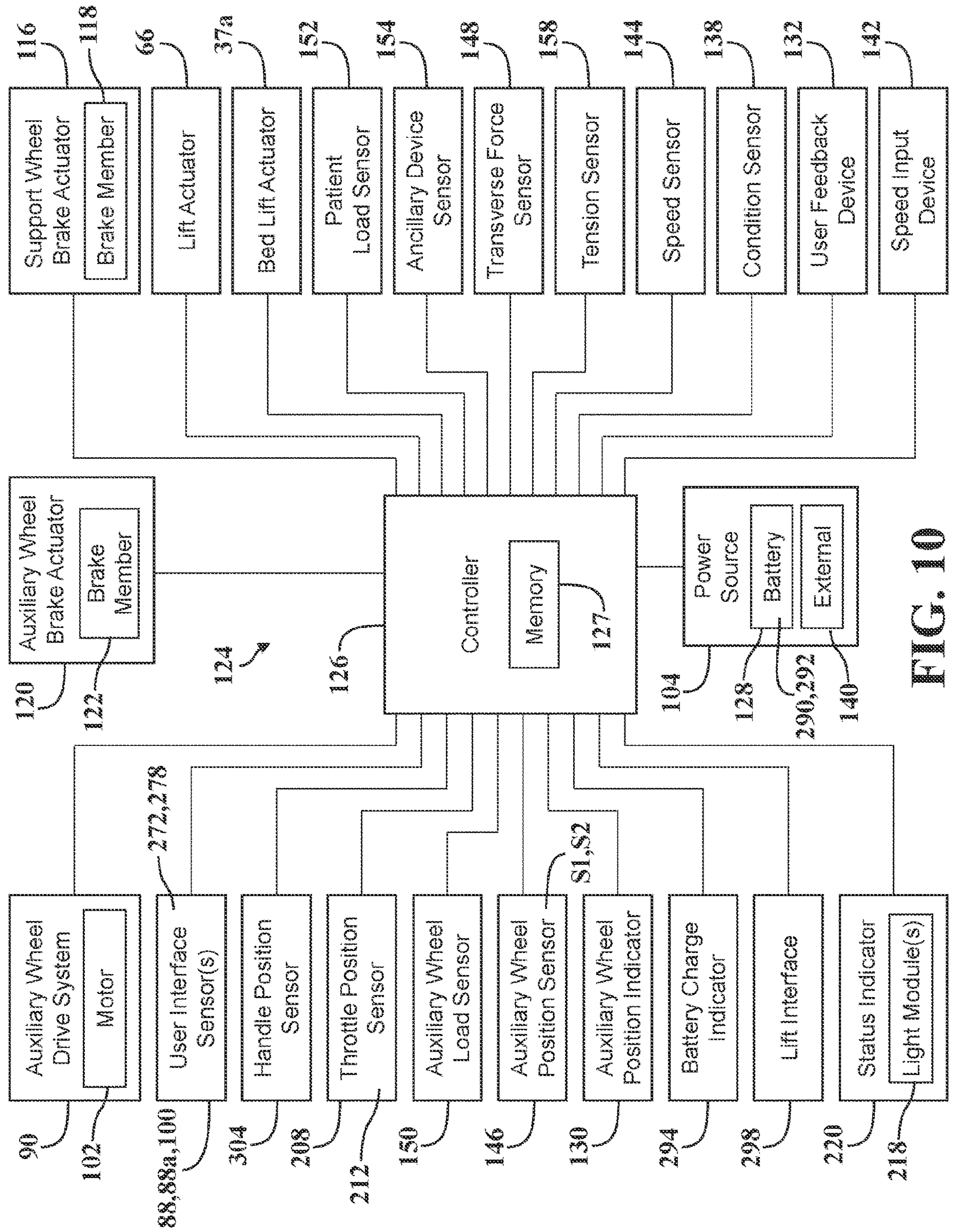
FIG. 10 is a schematic view of a control system of the patient support apparatus.

In some versions, as shown schematically in FIG. 10, the patient transport apparatus 20 comprises a support wheel brake actuator 116 operably coupled to one or more of the support wheels 56 for braking one or more support wheels 56. In one version, the support wheel brake actuator 116 comprises a brake member 118 coupled to the base 24 and movable between a braked position engaging one or more of the support wheels 56 to brake the support wheel 56 and a released position permitting one or more of the support wheels 56 to rotate freely.

In some versions, as shown schematically in FIG. 10, the patient transport apparatus 20 comprises an auxiliary wheel brake actuator 120 operably coupled to the auxiliary wheel 64 for braking the auxiliary wheel 64. In one version, the auxiliary wheel brake actuator 120 comprises a brake member 122 coupled to the base 24 and movable between a braked position engaging the auxiliary wheel 64 to brake the auxiliary wheel 64 and a released position permitting the auxiliary wheel 64 to rotate freely.

FIG. 10 illustrates a control system 124 of the patient transport apparatus 20. The control system 124 comprises a controller 126 coupled to, among other components, the user interface sensors 88, 88A, the throttle assembly 93, the lift actuator 66, the auxiliary wheel drive system 90, the throttle interface sensors 100, the support wheel brake actuator 116, the bed lift actuator 37*a*, and the auxiliary wheel brake actuator 120. The controller 126 is configured to operate the lift actuator 66, the auxiliary wheel drive system 90, the support wheel brake actuator 116, the bed lift actuator 37*a* to operate the lift assembly 37, and the auxiliary wheel brake actuator 120. The controller 126 is configured to detect the signals from the sensors 88, 88*a*, 100. The controller 126 is further configured to operate the lift actuator 66 responsive to the user interface sensor 88 generating signals responsive to touch.

The controller 126 includes a memory 127. Memory 127 may be any memory suitable for storage of data and computer-readable instructions. For example, the memory 127 may be a local memory, an external memory, or a cloud-based memory embodied as random access memory (RAM), non-volatile RAM (NVRAM), flash memory, or any other suitable form of memory.

The controller 126 generally comprises one or more microprocessors for processing instructions or for processing algorithms stored in memory to control operation of the lift actuator. Additionally or alternatively, the controller 126 may comprise one or more microcontrollers, field programmable gate arrays, systems on a chip, discrete circuitry, and/or other suitable hardware, software, or firmware that is capable of carrying out the functions described herein. The controller 126 may be carried on-board the patient transport apparatus 20, or may be remotely located. In one version, the controller 126 is mounted to the base 24.

In one version, the controller 126 comprises an internal clock to keep track of time. In one version, the internal clock is a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both.

In some versions, the memory 127, microprocessors, and microcontroller clock cooperate to send signals to and operate the actuators 66, 116, 120 and the auxiliary wheel drive system 90 to meet predetermined timing parameters. These predetermined timing parameters are discussed in more detail below and are referred to as predetermined durations.

The controller 126 may comprise one or more subcontrollers configured to control the actuators 66, 116, 120 or the auxiliary wheel drive system 90, or one or more subcontrollers for each of the actuators 66, 116, 120 or the auxiliary wheel drive system 90. In some cases, one of the subcontrollers may be attached to the intermediate frame 26 with another attached to the base 24. Power to the actuators 66, 116, 120, the auxiliary wheel drive system 90, and/or the controller 126 may be provided by a battery power supply 128.

The controller 126 may communicate with the actuators 66, 116, 120 and the auxiliary wheel drive system 90 via wired or wireless connections. The controller 126 generates and transmits control signals to the actuators 66, 116, 120 and the auxiliary wheel drive system 90, or components thereof, to operate the actuators 66, 116, 120 and the auxiliary wheel drive system 90 to perform one or more desired functions.

In one version, and as is shown in FIGS. 6A-7, the control system 124 comprises an auxiliary wheel position indicator 130 to display a current position of the auxiliary wheel 64 between or at the deployed position 68 and the retracted position 70, and the one or more intermediate positions 71. In one version, the auxiliary wheel position indicator 130 comprises a light bar that lights up completely when the auxiliary wheel 64 is in the deployed position 68 to indicate to the user that the auxiliary wheel 64 is ready to be driven. Likewise, the light bar may be partially lit up when the auxiliary wheel 64 is in a partially retracted position and the light bar may be devoid of light when the auxiliary wheel 64 is in the fully retracted position 70. Other visualization schemes are possible to indicate the current position of the auxiliary wheel 64 to the user, such as other graphical displays, text displays, and the like. Such light indicators or displays are coupled to the controller 126 to be controlled by the controller 126 based on the detected position of the auxiliary wheel 64 as described below.

In one version schematically shown in FIG. 10, the control system 124 comprises a user feedback device 132 coupled to the controller 126 to indicate to the user one of a current speed, a current range of speeds, a current throttle position, and a current range of throttle positions. In one version, the user feedback device 132 comprises one of a visual indicator, an audible indicator, and a tactile indicator.

In one exemplary version shown in FIGS. 6A and 8, when the user operates the throttle 92 to move the throttle 92 between the neutral throttle position N and the intermediate forward throttle position 110, a first LED **132*a* lights up to indicate to a user that the current throttle position is between the neutral throttle position N and the intermediate forward throttle position 110. When the user operates the throttle 92 to move the throttle 92 to a position between the intermediate forward throttle position 110 and the maximum forward throttle position 108, the first LED 132*a* may turn off and a second LED 132*b*** lights up to indicate to the user that a new range of throttle positions or a new range of speeds has been selected.

In other versions LED's may illuminate different colors to indicate different settings, positions, speeds, etc. In still other versions, at least a portion of the throttle 92 is translucent to permit different colors and or color intensities to shine through and indicate different settings, positions, speeds, etc.

In another exemplary version, the first handle 52 comprises a plurality of detents **133*a* (shown in FIG. 8A) for providing tactile feedback to the user to indicate one of a change in throttle position and a change in a range of throttle positions when the user moves the throttle 92 relative to the first handle 52 to effect a change in throttle position. A detent spring 133*b* is coupled to the throttle 92 to rotate with the throttle 92 relative to the first handle 52. The detent spring 133*b* biases a detent ball 133*c* into engagement with the plurality of detents 133*a*. When the user rotates the throttle 92, the plurality of detents 133*a* and detent ball 133*c* assist the user in retaining a throttle position. The detent spring 133*b* biases the detent ball 133*c* with a force less than the biasing force of the throttle biasing element 91. In this manner, the force of the detent spring 133*b* does not restrict the throttle biasing element 91 from returning the throttle 92 to the neutral throttle position N when the user releases the throttle 92. In other versions, the detent spring 133*b* may be coupled to the first handle 52 and the plurality of detents 133*a* may be coupled to the throttle 92 to rotate with the throttle 92 relative to the first handle 52**.

Other visualization schemes are possible to indicate one or more of the current speed, the current range of speeds, the current throttle position, and the current range of throttle positions to the user or other settings of the throttle 92, such as other graphical displays, text displays, and the like. Such light indicators or displays are coupled to the controller 126 to be controlled by the controller 126 based on the detected one or more current speed, current range of speeds, current throttle position, and current range of throttle positions or other current settings as described below.

The actuators 66, 116, 120 and the auxiliary wheel drive system 90 described above may comprise one or more of an electric actuator, a hydraulic actuator, a pneumatic actuator, combinations thereof, or any other suitable types of actuators, and each actuator may comprise more than one actuation mechanism. The actuators 66, 116, 120 and the auxiliary wheel drive system 90 may comprise one or more of a rotary actuator, a linear actuator, or any other suitable actuators. The actuators 66, 116, 120 and the auxiliary wheel drive system 90 may comprise reversible, DC motors, or other types of motors.

A suitable actuator for the lift actuator 66 comprises a linear actuator supplied by LINAK A/S located at Smedevænget 8, Guderup, DK-6430, Nordborg, Denmark. It is contemplated that any suitable actuator capable of deploying the auxiliary wheel 64 may be utilized.

The controller 126 is generally configured to operate the lift actuator 66 to move the auxiliary wheel 64 to the deployed position 68 responsive to detection of the signal from the user interface sensor 88. When the user touches the first handle 52, the user interface sensor 88 generates a signal indicating the user is touching the first handle 52 and the controller operates the lift actuator 66 to move the auxiliary wheel 64 to the deployed position 68. In some versions, the controller 126 is further configured to operate the lift actuator 66 to move the auxiliary wheel 64 to the retracted position 70 responsive to the user interface sensor 88 generating a signal indicating the absence of the user touching the first handle 52.

In some versions, the controller 126 is configured to operate the lift actuator 66 to move the auxiliary wheel 64 to the deployed position 68 responsive to detection of the signal from the user interface sensor 88 indicating the user is touching the first handle 52 for a first predetermined duration greater than zero seconds. Delaying operation of lift actuator 66 for the first predetermined duration after the controller 126 detects the signal from the sensor 88 indicating the user is touching the first handle 52 mitigates chances for inadvertent contact to result in operation of the lift actuator 66. In some versions, the controller 126 is configured to initiate operation of the lift actuator 66 to move the auxiliary wheel 64 to the deployed position 68 immediately after (e.g., less than 1 second after) the user interface sensor 88 generates the signal indicating the user is touching the first handle 52.

In some versions, the controller 126 is further configured to operate the lift actuator 66 to move the auxiliary wheel 64 to the retracted position 70, or to the one or more intermediate positions 71, responsive to the user interface sensor 88 generating a signal indicating the absence of the user touching the first handle 52. In some versions, the controller 126 is configured to operate the lift actuator 66 to move the auxiliary wheel 64 to the retracted position 70, or to the one or more intermediate positions 71, responsive to the user interface sensor 88 generating the signal indicating the absence of the user touching the first handle 52 for a predetermined duration greater than zero seconds. In some versions, the controller 126 is configured to initiate operation of the lift actuator 66 to move the auxiliary wheel 64 to the retracted position 70, or to the one or more intermediate positions 71, immediately after (e.g., less than 1 second after) the user interface sensor 88 generates the signal indicating the absence of the user touching the first handle 52.

In versions including the support wheel brake actuator 116 and/or the auxiliary wheel brake actuator 120, the controller 126 may also be configured to operate one or both brake actuators 116, 120 to move their respective brake members 118, 122 between the braked position and the released position. In one version, the controller 126 is configured to operate one or both brake actuators 116, 120 to move their respective brake members 118, 122 to the braked position responsive to the user interface sensor 88 generating the signal indicating the absence of the user touching the first handle 52 for a predetermined duration. In one version, the predetermined duration for moving brake members 118, 122 to the braked position is greater than zero seconds. In some versions, the controller 126 is configured to initiate operation of one or both brake actuators 116, 120 to move their respective brake members 118, 122 to the braked position immediately after (e.g., less than 1 second after) the user interface sensor 88 generates the signal indicating the absence of the user touching the first handle 52.

In one version, the controller 126 is configured to operate one or both brake actuators 116, 120 to move their respective brake members 118, 122 to the released position responsive to the user interface sensor 88 generating the signal indicating the user is touching the first handle 52 for a predetermined duration. In one version, the predetermined duration for moving brake members 118, 122 to the released position is greater than zero seconds. In some versions, the controller 126 is configured to initiate operation of one or both brake actuators 116, 120 to move their respective brake members 118, 122 to the released position immediately after (e.g., less than 1 second after) the user interface sensor 88 generates the signal indicating the user is touching the first handle 52.

In some versions, an auxiliary wheel position sensor 146 (also referred to as a "position sensor") is coupled to the controller 126 and generates signals detected by the controller 126. The auxiliary wheel position sensor 146 is coupled to the controller 126 and the controller 126 is configured to detect the signals from the auxiliary wheel position sensor 146 to detect positions of the auxiliary wheel 64 as the auxiliary wheel 64 moves between the deployed position 68, the one or more intermediate positions 71, and the retracted position 70.

In one version, the auxiliary wheel position sensor 146 is disposed at a first sensor location S1 (see FIGS. 5A-5C) at a pivot point of the first auxiliary wheel frame 74*a*. The auxiliary wheel position sensor 146 (e.g. realized with a potentiometer, an encoder, etc.) generates one or more signals responsive to the position of the first auxiliary wheel frame 74*a* and the controller 126 determines the position of the auxiliary wheel 64 from changes in position of the first auxiliary wheel frame 74*a* (e.g., via angular changes in position of the first auxiliary wheel frame 74*a* detected by the controller 126 through signals from the sensor 146).

In another version, the auxiliary wheel position sensor 146 is disposed at a second sensor location S2 (see FIGS. 5A-5C), coupled to the lift actuator 66. The auxiliary wheel position sensor 146 (e.g. hall effect sensor, a linear potentiometer, a linear variable differential transformer, and the like) generates a signal responsive to the change in position of the drive rod 66*b* relative to the housing 66*a* and the controller 126 determines the position of the auxiliary wheel 64 from operation of the lift actuator 66.

In other versions, the auxiliary wheel position sensor 146 is disposed on the base 24 or another component of the patient transport apparatus 20 to directly monitor the position of the auxiliary wheel 64 and generate signals responsive to the position of the auxiliary wheel 64. In still other versions, the auxiliary wheel position sensor 146 detects the position of the auxiliary wheel 64 in another manner.

In one version, the controller 126 is configured to operate one or both brake actuators 116, 120 to move their respective brake members 118, 122 to the released position responsive to detection of the auxiliary wheel 64 being in the deployed position 68. In other versions, the controller 126 is configured to operate one or both brake actuators 116, 120 to move their respective brake members 118, 122 to the released position responsive to detection of the auxiliary wheel 64 being in a position between the deployed position 68 and the retracted position 70 (e.g., the one or more intermediate positions 71).

In one version, the controller 126 is configured to operate the lift actuator 66 to move the auxiliary wheel 64 to the retracted position 70 (See FIG. 5A) and the partially retracted (intermediate) position 71 (See FIG. 5B) between the deployed position 68 (See FIG. 5C) and the retracted position 70 (see FIG. 5A). More specifically, the controller 126 generates control signals to command the lift actuator 66 to move the auxiliary wheel 64 based on feedback to the controller 126 from the auxiliary wheel position sensor 146 as to the current position of the auxiliary wheel 64. In the partially retracted (intermediate) position 71, the auxiliary wheel 64 is still spaced from the floor surface, but is closer to the floor surface than when in the retracted position 70.

In one version, the controller 126 is configured to operate the lift actuator 66 to temporarily hold the auxiliary wheel 64 at the partially retracted (intermediate) position 71 for a duration greater than zero seconds as the auxiliary wheel 64 moves from the deployed position 68 toward the retracted position 70. This configuration prevents the auxiliary wheel 64 from travelling a greater distance to the retracted position 70 when the user interface sensor 88 detects a brief absence of the user. For instance, when a user momentarily releases their hand from the first handle 52 to move the patient transport apparatus 20 via the support wheels 56 in a direction transverse to a direction of travel of the auxiliary wheel 64, the lift actuator 66 moves the auxiliary wheel 64 to the partially retracted (intermediate) position 71. When the user returns their hand into engagement with the first handle 52 before the duration expires, the lift actuator 66 will not have to move the auxiliary wheel 64 as far to return the auxiliary wheel 64 to the deployed position 68. If the duration of time expires, then the controller 126 operates the lift actuator 66 to move the auxiliary wheel 64 to the retracted position 70. The duration of time for which the user may be absent before the auxiliary wheel 64 is moved to the retracted position 70 may be 15 seconds or less, 30 seconds or less, 1 minute or less, 3 minutes or less, or other suitable durations.

In one version, the control system 124 comprises a transverse force sensor 148 coupled to the controller 126 and the axle 76 of the auxiliary wheel 64. The transverse force sensor 148 is configured to generate a signal responsive to a force being applied to the patient transport apparatus 20 in a direction transverse to the direction of travel of the auxiliary wheel 64. The controller 126 is configured to detect the signal. For instance, when the user applies force to the user interface 50 of one of the side rails 38, 40, 42, 44 to move the base 24 in a direction transverse to the direction of travel of the auxiliary wheel 64, the force from the user is transferred through the support structure 22 to the auxiliary wheel 64. When the controller 126 detects a transverse force above a predetermined threshold, the controller 126 is configured to operate the lift actuator 66 to move the auxiliary wheel 64 to the partially retracted (intermediate) position 71 for a predetermined duration of time greater than zero seconds. In some versions, the controller 126 is configured to also operate the support wheel brake actuator 116 to move the brake member 118 to the released position when the controller 126 detects the transverse force above the predetermined threshold.

In some versions, the controller 126 is configured to operate the lift actuator 66 to move the auxiliary wheel 64 to the partially retracted (intermediate) position 71 when the controller detects the transverse force above the predetermined threshold even if the user interface sensor 88 detects the presence of the user. For example, while the user has their hand on the first handle 52, a second user exerts a transverse force on one or more side rails 38, 40, 42, 44 to move the base 24 in a direction transverse to the direction of travel of the auxiliary wheel 64. The controller 126 is configured to operate the lift actuator 66 to retract the auxiliary wheel 64 despite the user interface sensor 88 generating signals indicating the user is touching the first handle 52.

In one version, the lift actuator 66 is operable to move the auxiliary wheel 64 to a fully deployed position 68 and a partially deployed position (not shown) defined as an intermediate position 71 where the auxiliary wheel 64 engages the floor surface with less force than when in the fully deployed position 68. More specifically, the lift actuator 66 is operable to permit the torsion spring 86 to bias the auxiliary wheel 64 to a partially deployed position before the fully deployed position 68.

In one version, an auxiliary wheel load sensor 150 is coupled to the auxiliary wheel 64 and the controller 126, with the auxiliary wheel load sensor 150 configured to generate a signal responsive to a force of the auxiliary wheel 64 being applied to the floor surface. In some versions, the auxiliary wheel load sensor 150 is coupled to the axle 76 of the auxiliary wheel 64. The controller 126 is configured to detect the signal from the auxiliary wheel load sensor 150 and, in some versions, is configured to operate the auxiliary wheel drive system 90 to drive the auxiliary wheel 64 and move the base 24 relative to the floor surface responsive to the controller 126 detecting signals from the auxiliary wheel load sensor 150 indicating the auxiliary wheel 64 is in the partially deployed position engaging the floor surface when a force of the auxiliary wheel 64 on the floor surface exceeds an auxiliary wheel load threshold. This allows the user to drive the auxiliary wheel 64 before the auxiliary wheel 64 reaches the fully deployed position without the auxiliary wheel 64 slipping against the floor surface.

As is described in greater detail below, in some versions, a patient load sensor 152 is coupled to the controller 126 and to one of the base 24 and the intermediate frame 26. The patient load sensor 152 generates a signal responsive to weight, such as a patient being disposed on the base 24 and/or the intermediate frame 26. The controller 126 is configured to detect the signal from the patient load sensor 152. Here, the auxiliary wheel load threshold may change based on detection of the signal generated by the patient load sensor 152 to compensate for changes in weight disposed on the intermediate frame 26 and/or the base 24 to mitigate probability of the auxiliary wheel 64 slipping when the controller 126 operates the auxiliary wheel drive system 90.

In the illustrated versions, where the auxiliary wheel drive system 90 comprises the motor 102 and the gear train 106, the controller 126 is configured to operate the motor 102 to drive the auxiliary wheel 64 and move the base 24 relative to the floor surface responsive to detection of the auxiliary wheel 64 being in the partially deployed position as detected by virtue of the controller 126 detecting the motor 102 drawing electrical power from the power source 104 above an auxiliary wheel power threshold, such as by detecting a change in current draw of the motor 102 associated with the auxiliary wheel 64 being in contact with the floor surface. In this case, detection of the current drawn by the motor 102 being above a threshold operates as a form of auxiliary wheel load sensor 150.

In some versions, when power is not supplied to the motor 102 from the power source 104, the motor 102 acts as a brake to decelerate the auxiliary wheel 64 through the gear train 106. In other versions, the auxiliary wheel 64 is permitted to rotate freely when power is not supplied to the motor 102.

In some versions, the controller 126 is configured to operate the motor 102 to brake the motor 102, and thus the auxiliary wheel 64, responsive to detection of the signal from the user interface sensor 88 indicating the user is not touching the first handle 52 for a predetermined duration. In one version, the predetermined duration is greater than zero seconds. In other versions, the controller 126 is configured to initiate operation of the motor 102 to brake the motor 102, and thus the auxiliary wheel 64, immediately after (e.g., less than 1 second after) the controller 126 detects the signal from the user interface sensor 88 indicating the user is not touching the first handle 52.

In some versions, when the throttle 92 is in the neutral throttle position N, the auxiliary wheel drive system 90 permits the auxiliary wheel 64 to be manually rotated as a result of a user pushing on the first handle 52 or another user interface 50 to push the patient transport apparatus 20 in a desired direction. In other words, the motor 102 may be unbraked and capable of being driven manually.

In one version, one or more of the base 24, the intermediate frame 26, the patient support deck 30, and the side rails 38, 40, 42, 44 are configured to be coupled to an ancillary device (not shown) such as a table or a nurse module. In other versions, the ancillary device is another device configured to be coupled to the patient transport apparatus 20. An ancillary device sensor 154 is coupled to the controller 126 and configured to generate a signal responsive to whether the ancillary device is coupled to one or more of the base 24, the intermediate frame 26, the patient support deck 30, and the side rails 38, 40, 42, 44. The controller 126 is configured to detect the signal from the ancillary device sensor 154. When the controller 126 detects the ancillary device being coupled to one or more of the base 24, the intermediate frame 26, the patient support deck 30, and the side rails 38, 40, 42, 44, the controller 126 is configured to operate the support wheel brake actuator 116 to move the brake member 118 to the braked position and to operate the lift actuator 66 to move the auxiliary wheel 64 to the retracted position 70 (or, in some versions, to an intermediate position 71). The controller 126 may be configured to operate the support wheel brake actuator 116 and the lift actuator 66 in this manner even when the user interface sensor 88 detects the presence of the user.

In some versions, the user interface sensor 88 comprises a first sensor coupled to the first handle 52, and a second sensor coupled to the second handle 54. In one version, the controller 126 requires the first and second sensors of the user interface sensor 88 to generate signals indicating the user is touching both the first and second handles 52, 54 to operate the actuators 66, 116, 120 or the auxiliary wheel drive system 90 as described above where the controller 126 facilitates operation based on detection of the user touching the first handle 52. Likewise, in such versions, the controller 126 may require the first and second sensors of the user interface sensor to generate signals indicating the user is not touching either of the first and second handles 52, 54 to operate the actuators 66, 116, 120 or the auxiliary wheel drive system 90 as described above where the controller 126 facilitates operation based on detection of the user not touching the first handle 52. In other versions, the controller 126 may require one or both of the first and second sensors of the user interface sensor 88 to generate a signal indicating the user is touching at least one of the first and second handles 52, 54 to operate actuators 66, 116, 120 or the auxiliary wheel drive system 90 as described above where the controller 126 facilitates operation based on detection of the user touching the first handle 52. In another version, the controller 126 may require one or both of the first and second sensors of the user interface sensor 88 to generate a signal indicating the user is not touching at least one of first and second handles 52, 54 to operate the actuators 66, 116, 120 or the auxiliary wheel drive system 90 as described above where the controller 126 facilitates operation based on detection of the user not touching the first handle 52.

As noted above, the controller 126 is configured to operate the auxiliary wheel drive system 90 to rotate the auxiliary wheel 64 in response to operation of the throttle 92 such that moving the throttle 92 from the neutral throttle position N toward one of the maximum forward and maximum backward throttle positions 108, 112 increases the rotational speed of the auxiliary wheel 64 (e.g., increases the rotational velocity of the auxiliary wheel 64 in the desired direction).

Figure 9A:
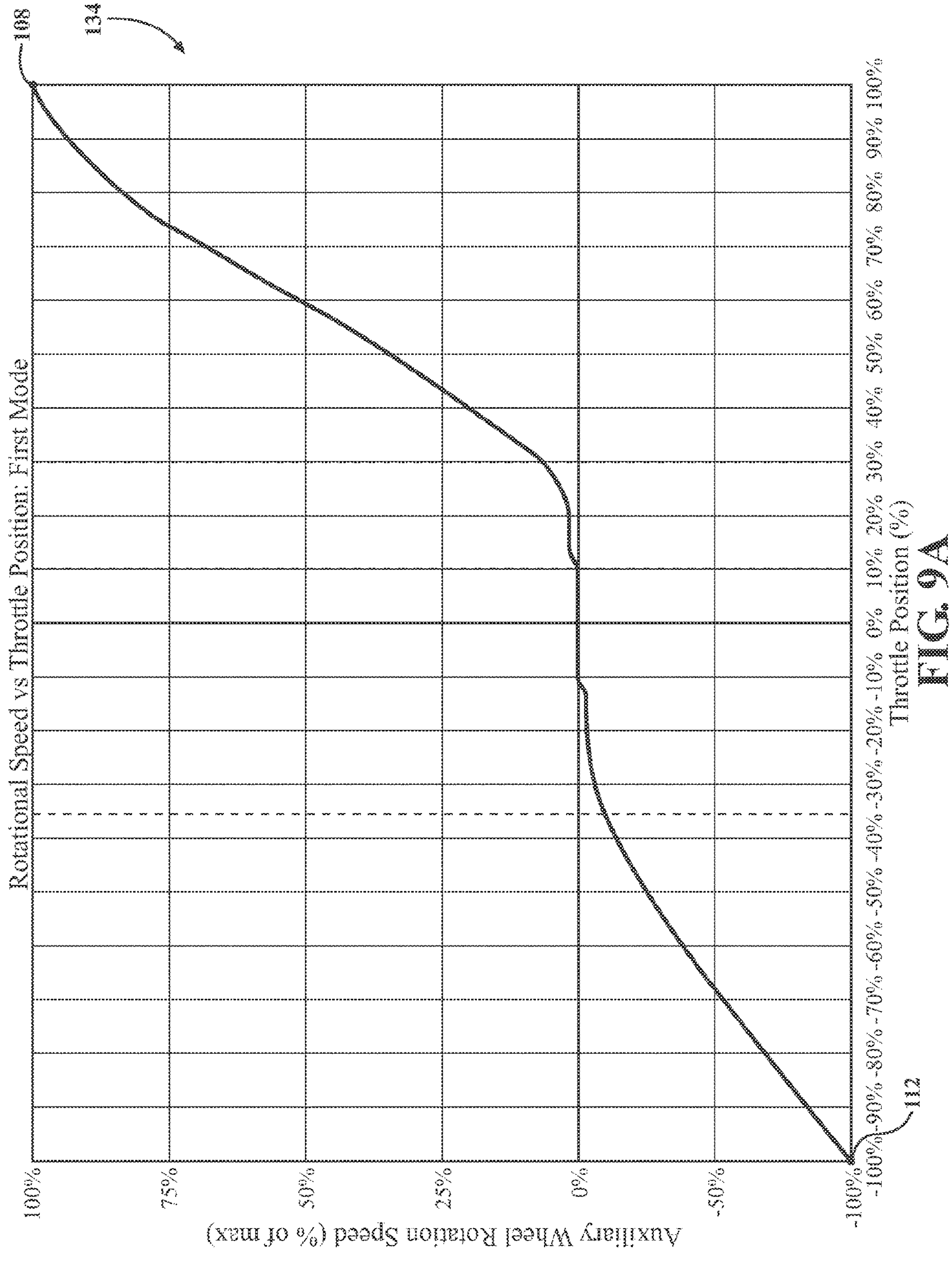
FIG. 9A is a graph of a first speed mode.
Figure 9B:
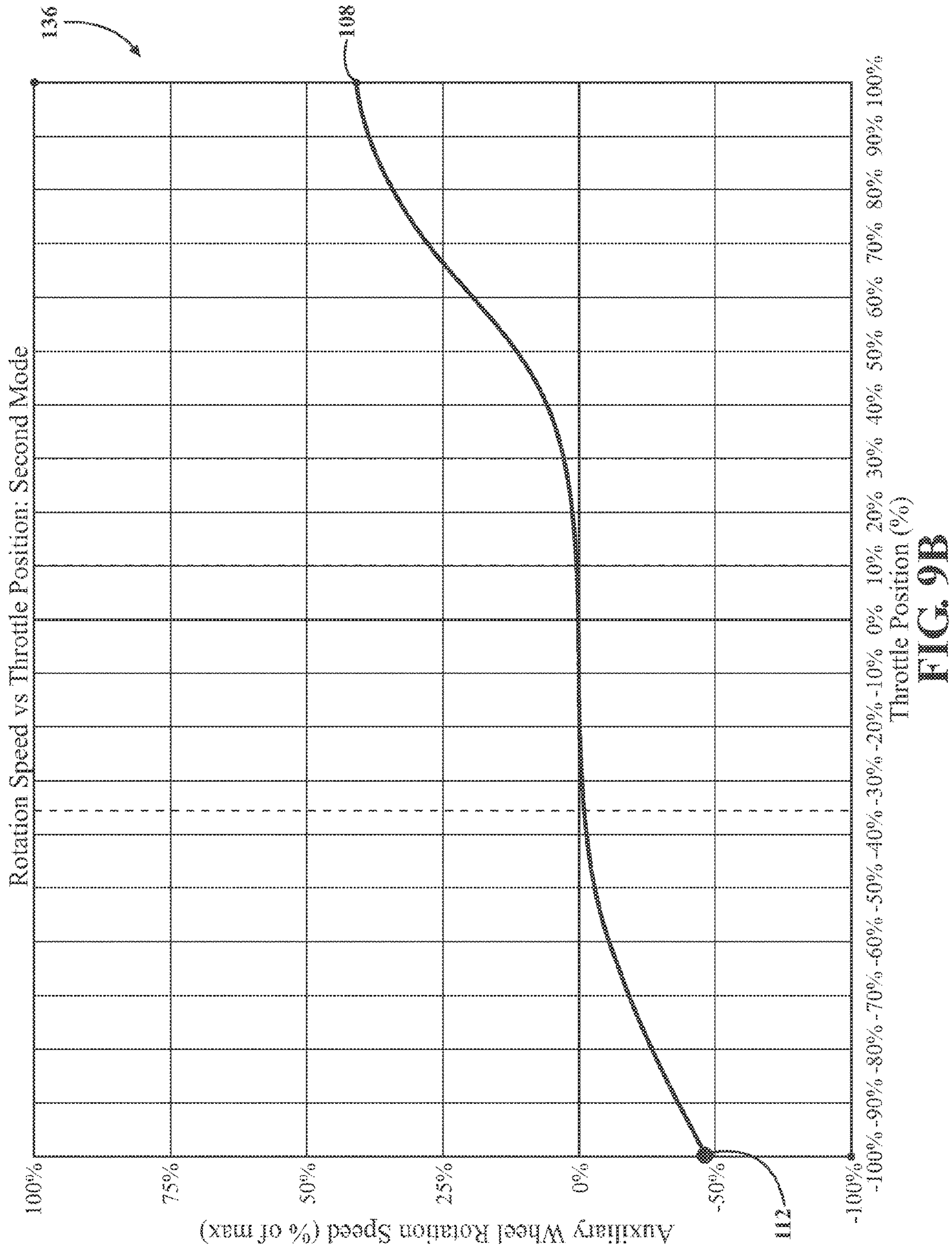
FIG. 9B is a graph of a second speed mode.

Referring to FIGS. 9A and 9B, graphs illustrating two versions of the relationship between throttle position and auxiliary wheel rotational speed are shown. The rotational speed of the auxiliary wheel 64 is shown on the Y-axis and changes in a non-linear manner with respect to movement of the throttle 92. The rotational speed of the auxiliary wheel 64 in each graph are not expressed in units, but denoted as a percentage of maximum speed in either direction. In other cases, rotation speed or velocity could be shown on the Y-axis. Throttle position is shown on the X-axis. The throttle position at 0% corresponds to the neutral throttle position N. The throttle position at 100% corresponds to maximum forward throttle position 108. The throttle position at −100% corresponds to maximum backward throttle position 112.

FIG. 9A illustrates one version of a first speed mode 134 of throttle position relative to rotational speed of the auxiliary wheel 64. FIG. 9B illustrates one version of a second speed mode 136 of throttle position relative to rotational speed of the auxiliary wheel 64. In one version, the controller 126 operates the auxiliary wheel drive system 90 using the first speed mode 134 illustrated in FIG. 9A. In another version, the controller 126 operates the auxiliary wheel drive system 90 using the second speed mode 136 illustrated in 10B. In another version described further below, the controller 126 is configured to switch between the first and second speed modes 134, 136.

When the throttle 92 is in the maximum forward throttle position 108 and the controller 126 operates the auxiliary wheel drive system 90 using the first speed mode 134, the controller 126 is configured to operate the auxiliary wheel drive system 90 to rotate the auxiliary wheel 64 at a maximum forward rotational speed. When the throttle 92 is in the maximum backward throttle position 112 and the controller 126 operates the auxiliary wheel drive system 90 using the first speed mode 134, the controller 126 is configured to operate the auxiliary wheel drive system 90 to rotate the auxiliary wheel 64 at a maximum backward rotational speed.

When the throttle 92 is in the maximum forward throttle position 108 and the controller 126 operates the auxiliary wheel drive system 90 using the second speed mode 136, the controller 126 is configured to operate the auxiliary wheel drive system 90 to rotate the auxiliary wheel 64 at an intermediate forward rotational speed less than the maximum forward rotational speed. When the throttle 92 is in the maximum backward throttle position 112 and the controller 126 operates the auxiliary wheel drive system 90 using the second speed mode 136, the controller 126 is configured to operate the auxiliary wheel drive system 90 to rotate the auxiliary wheel 64 at an intermediate backward rotational speed less than the maximum backward rotational speed.

Switching between the two speed modes 134, 136 allows the patient transport apparatus 20 to operate at relatively fast speeds, preferred for moving the patient transport apparatus 20 through open areas and for long distances such as down hallways, and relatively slow speeds, preferred for moving the patient transport apparatus 20 in congested areas, such as a patient room, elevator, etc., where the user seeks to avoid collisions with external objects and people.

In one version, the control system 124 comprises a condition sensor 138 (schematically shown in FIG. 10) coupled to the controller 126. The condition sensor 138 is configured to generate a signal responsive to a condition of the patient transport apparatus 20 indicating a presence or absence of the condition and the controller 126 is configured to detect the signal from the condition sensor 138. The condition of the patient transport apparatus 20 comprises one of power being received from an external power source 140, an obstacle in close proximity to the base 24, a connection between the patient transport apparatus 20 and an external device, and at least part of the support structure 22 entering a predetermined location.

In one version, the controller 126 is configured to automatically operate the auxiliary wheel drive system 90 using the second speed mode 136 to limit the forward rotational speed of the auxiliary wheel 64 to the intermediate forward rotational speed responsive to the throttle 92 being in the maximum forward throttle position 108 and the condition sensor 138 generating a signal indicating the presence of the condition of the patient transport apparatus 20. The controller 126 is further configured to operate the auxiliary wheel drive system 90 using the second speed mode 136 to limit the backward rotational speed of the auxiliary wheel 64 to the intermediate backward rotational speed responsive to the throttle 92 being in the maximum backward throttle position 112 and the condition sensor 138 generating the signal indicating the presence of the condition of the patient transport apparatus 20.

The controller 126 is configured to operate the auxiliary wheel drive system 90 using the first speed mode 134 to permit the forward rotational speed of the auxiliary wheel 64 to reach the maximum forward rotational speed responsive to the throttle 92 being in the maximum forward throttle position 108 and the condition sensor 138 generating a signal indicating the absence of the condition of the patient transport apparatus 20. The controller 126 is further configured to operate the auxiliary wheel drive system 90 using the first speed mode 134 to permit the backward rotational speed of the auxiliary wheel 64 to reach the maximum backward rotational speed responsive to the throttle 92 being in the maximum backward throttle position 112 and the condition sensor 138 generating the signal indicating the absence of the condition of the patient transport apparatus 20.

In one exemplary version, the condition sensor 138 comprises an obstacle detection sensor coupled to the controller 126 and the base 24. The obstacle detection sensor is configured to generate a signal indicating the presence or absence of obstacles in close proximity to the base 24.

When the obstacle detection sensor generates a signal indicating the absence of an obstacle, the controller 126 is configured to operate the auxiliary wheel drive system 90 using the first speed mode 134 and when the user moves the throttle 92 from the neutral throttle position N to the maximum forward throttle position 108, the controller 126 operates the auxiliary wheel drive system 90 to rotate the auxiliary wheel 64 at the maximum forward rotational speed.

When the obstacle detection sensor generates a signal indicating the presence of an obstacle, the controller 126 is configured to operate the auxiliary wheel drive system 90 using the second speed mode 136 and when the user moves the throttle 92 from the neutral throttle position N to the maximum forward throttle position 108, the controller 126 operates the auxiliary wheel drive system 90 to rotate the auxiliary wheel 64 at the intermediate forward rotational speed.

In another exemplary version, the condition sensor 138 comprises a proximity sensor configured to generate a signal indicating the presence or absence of an external device such as a patient warning system, an IV pole, a temperature management system, etc. When the proximity sensor generates a signal indicating the presence of the external device, the controller 126 is configured to operate the auxiliary wheel drive system 90 using the second speed mode 136. When the proximity sensor generates a signal indicating the absence of the external device, the controller 126 is configured to operate the auxiliary wheel drive system 90 using the first speed mode 134.

In some versions, the proximity sensor may be configured to generate the signal responsive to the external device being coupled to the patient transport apparatus 20 to indicate a presence. For example, the proximity sensor may be coupled to the patient support deck 30. When an IV pole is coupled to the patient support deck 30, the proximity sensor generates a signal indicating the IV pole is coupled to the patient support deck 30 and the controller 126 is configured to operate the auxiliary wheel drive system 90 using the second speed mode 136. When the IV pole is removed from the patient support deck 30, the proximity sensor generates a signal indicating the IV pole has been removed from the patient support deck 30 and the controller 126 is configured to operate the auxiliary wheel drive system 90 using the first speed mode 134.

Figure 11:
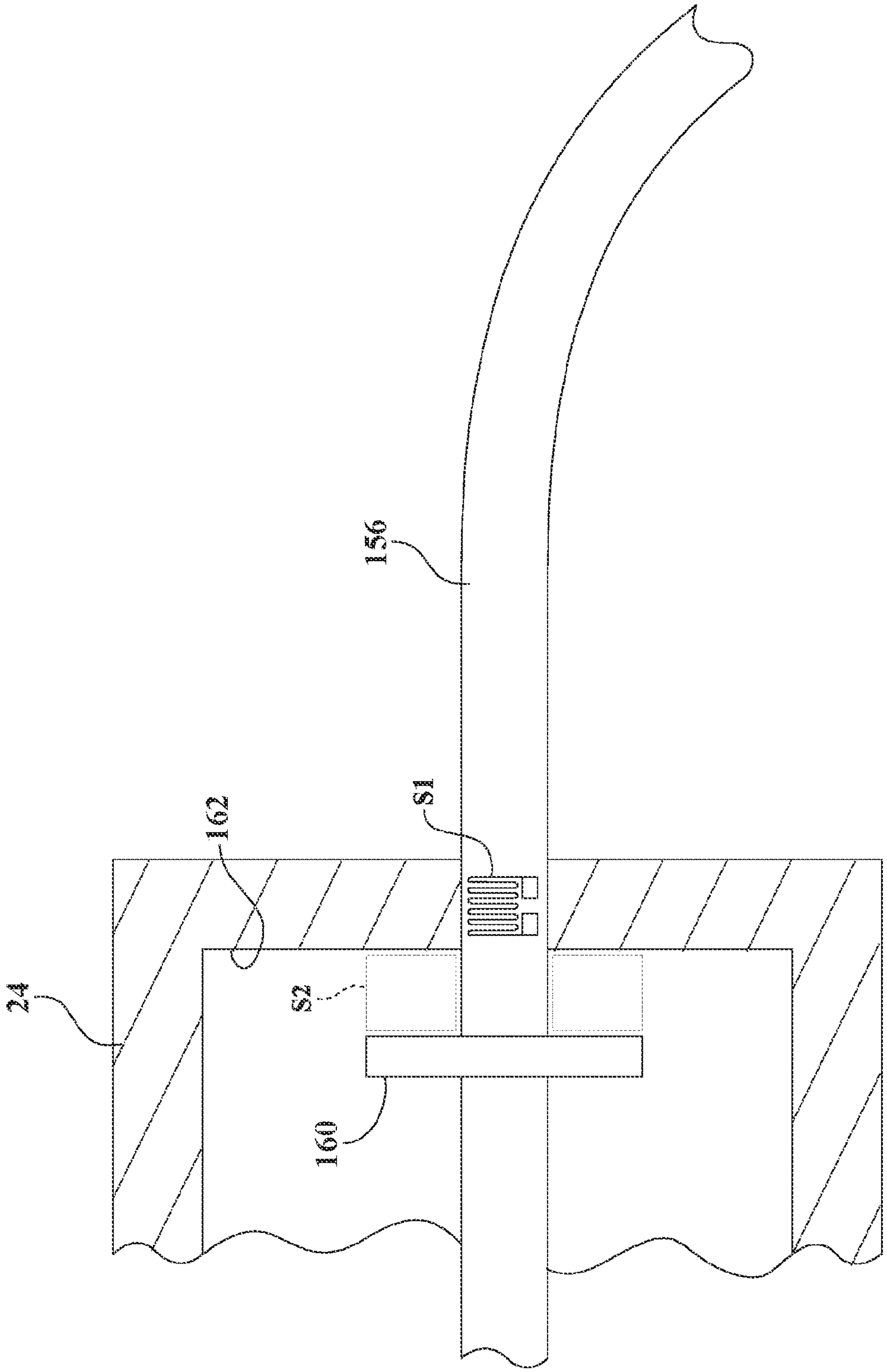
FIG. 11 is an elevational view of an electrical cable coupled to the base of the patient transport apparatus.

In the illustrated version, the power source 104 comprises the battery power supply 128 (shown schematically in FIG. 10) to permit the patient transport apparatus 20 to be supplied with power during transport. In many versions, the patient transport apparatus 20 comprises an electrical cable 156 (shown in FIG. 11) coupled to the controller 126 and configured to be coupled to the external power source 140 (e.g. plugged in) to charge the battery power supply 128 and provide power for other functions of the patient transport apparatus 20.

In another exemplary version, the condition sensor 138 is configured to generate a signal indicating the presence or absence of the controller 126 receiving power from the external power source 140. When the condition sensor 138 generates a signal indicating the controller 126 is receiving power from the external power source 140, the controller 126 is configured to operate the auxiliary wheel drive system 90 using the second speed mode 136. When the condition sensor 138 generates a signal indicating the absence of the controller 126 receiving power from the external power source 140, the controller 126 is configured to operate the auxiliary wheel drive system 90 using the first speed mode 134.

In another version shown in FIGS. 6A and 7, a speed input device 142 (shown schematically in FIG. 10) is coupled to the controller 126 and configured to be operable between a first setting and a second setting. The speed input device 142 may comprise a switch (see FIG. 6A), piezoelectric element, a touch sensor, or any other suitable input device to switch between the first and second settings. The speed input device 142 may be used in place of the condition sensor 138. In the first setting, the controller 126 operates the auxiliary wheel drive system 90 using the first speed mode 134, permitting the auxiliary wheel 64 to rotate at the maximum forward and backward rotational speeds when the throttle 92 is in the maximum forward and backward throttle positions 108, 112, respectively. In the second setting, the controller 126 operates the auxiliary wheel drive system 90 using the second speed mode 136, limiting the auxiliary wheel 64 to rotate at the intermediate forward and backward rotational speeds when the throttle 92 is in the maximum forward and backward throttle positions 108, 112, respectively.

In another version, the controller 126 may be configured to operate the auxiliary wheel drive system 90 using three or more speed modes. The controller 126 may be configured to switch between the speed modes using any combination and number of sensors and/or speed input device settings.

In one version, a speed sensor 144 (shown schematically in FIG. 10) is coupled to the controller 126 to generate a signal responsive to a current speed parameter. The current speed parameter may be obtained by the speed sensor 144 generating a signal responsive to one or more of a current speed of the base 24 moving relative to the floor surface and a current rotational speed of the auxiliary wheel 64. In another version, the current speed parameter is obtained by the speed sensor 144 generating a signal responsive to movement of a component of the auxiliary wheel drive system 90.

The controller 126 is configured to set a desired speed parameter and adjust the electrical power supplied to the motor 102 to control rotational speed of the auxiliary wheel 64 such that the current speed parameter approximates the desired speed parameter. The motor 102 is operable in response to command signals from the controller 126 to rotate the auxiliary wheel 64. The controller 126 receives various input signals and has a drive circuit or other drive controller portion that controls voltage and/or current to the motor 102 based on the input signals.

As is depicted schematically in FIG. 10, in one version, the control system 124 comprises the load sensor 152 (also referred to as a "patient load sensor") coupled to the controller 126. The load sensor 152 is configured to generate a signal indicating a current weight disposed on the patient support deck 30. In the examples shown, the load sensor 152 comprises load cells coupled to the controller 126 and arranged to detect and/or measure the weight disposed on the patient support deck 30. The load cells may be arranged in the base 24, the intermediate frame 26, patient support deck 30 or any other suitable location to measure the weight disposed on the patient support deck 30.

The controller 126 is configured to control electrical power supplied to the motor 102 responsive to a signal detected by the controller 126 from the load sensor 152 indicating a current weight such that, for each of the throttle positions, the electrical power supplied to the motor 102 is greater when a first patient of a first weight is being transported on the patient transport apparatus 20 as compared to when a second patient of a second weight, less than the first weight, is being transported. In other words, to maintain a desired speed at any given throttle position, electrical power supplied to the motor 102 increases as weight disposed on the patient support deck 30 increases. Thus, the controller 126 may control voltage and/or current supplied to the motor 102 based on patient weight.

When the electrical cable 156 is coupled to the external power source 140, the range of movement of the base 24 relative to the floor surface is limited by a length of the electrical cable 156. Moving the base 24 past the range of movement will apply tension to the electrical cable 156 and ultimately decouple the electrical cable 156 from the external power source 140 (e.g. become unplugged). In some instances, the user may seek to move the base 24 relative to the floor surface while keeping the electrical cable 156 coupled to the external power source 140.

In one version, the controller 126 is configured to determine if the electrical cable 156 is coupled to the external power source 140. When the controller 126 determines the electrical cable 156 is coupled to the external power source 140, the controller 126 is configured to operate the auxiliary wheel drive system 90 to limit the number of rotations of the auxiliary wheel 64 to limit the distance the base 24 moves relative to the floor surface.

In one version, the control system 124 comprises a tension sensor 158 (shown schematically in FIG. 10) coupled to the electrical cable 156 and the controller 126. The tension sensor 158 is configured to generate a signal indicating tension is being applied to the electrical cable 156 as a result of the controller 126 operating the auxiliary wheel drive system 90 to rotate the auxiliary wheel 64 and move the base 24 relative to the floor surface. The controller 126 is configured to operate the auxiliary wheel drive system 90 to stop rotating the auxiliary wheel 64 responsive to the tension sensor 158 generating the signal indicating the tension of the electrical cable 156 exceeds a tension threshold.

In one version, the electrical cable 156 is coupled to one of the base 24 and the intermediate frame 26. The tension sensor 158 is disposed at a first sensor location S1 (see FIG. 11) at a point on an exterior of the electrical cable 156. The tension sensor 158 (e.g. strain gauge) generates a signal indicating the amount of tension on the electrical cable 156 and the controller 126 determines whether the tension is above the threshold to determine whether to operate the auxiliary wheel drive system 90 to stop rotating the auxiliary wheel 64.

In another version, the tension sensor 158 is disposed at a second sensor location S2 (see FIG. 11) at a point between a plate 160 that is fixed to the electrical cable 156 and a surface 162 of the base 24. The tension sensor 158 (e.g. pressure sensor) generates a signal indicating an amount of pressure between the plate 160 and the surface 162 resulting from tension on the electrical cable 156 and the controller 126 relates the pressure with a tension to determine whether the tension is above the threshold to determine whether to operate the auxiliary wheel drive system 90 to stop rotating the auxiliary wheel 64. Each of the sensors 88, 100, 138, 144, 152, 158 described above may comprise one or more of a force sensor, a load cell, a speed radar, an optical sensor, an electromagnetic sensor, an accelerometer, a potentiometer, an infrared sensor, a capacitive sensor, an ultrasonic sensor, a limit switch, or any other suitable sensor for performing the functions recited herein. Other configurations are contemplated.

In one version, the controller 126 is configured to operate one or both the brake actuators 116, 120 to brake the auxiliary wheel 64 or one or more support wheels 56 when the controller 126 determines the base 24 has moved a predetermined distance or when the tension sensor 158 generates a signal indicating the tension of the electrical cable 156 approaches the tension threshold.

In one version, the user feedback device 132 is further configured to indicate to the user whether the electrical cable 156 is coupled to the external power source 140 or whether the electrical cable 156 is about to be decoupled from the external power source 140. In an exemplary version, an (visual, audible, and/or tactile) alarm may trigger if the base 24 has moved the predetermined distance while the electrical cable 156 is plugged in or tension of the electrical cable 156 approaches the tension threshold.

Figure 12:
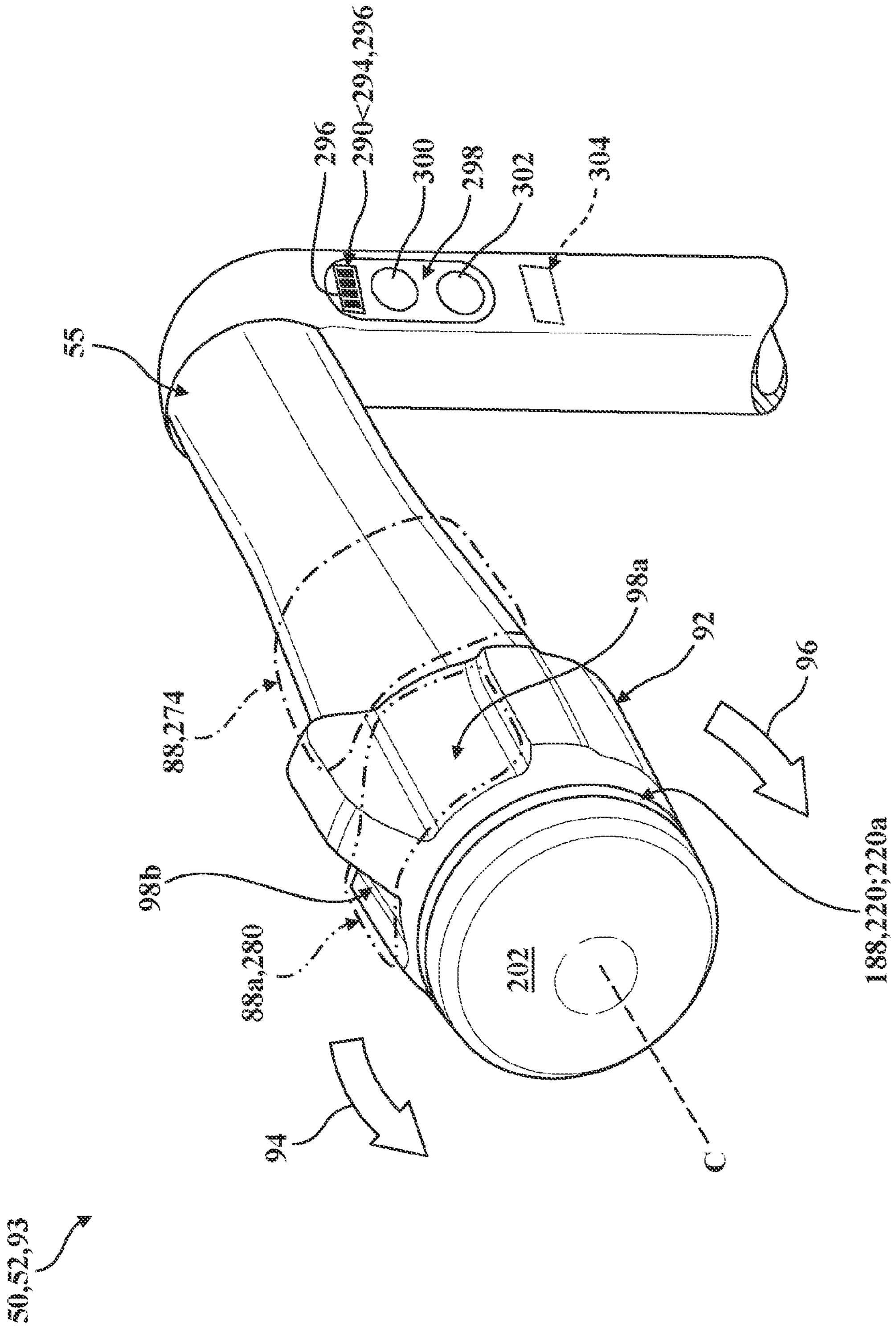
FIG. 12 is a partial perspective view of another version of the handle and the throttle assembly of the patient transport apparatus, shown comprising a status indicator operating in a first output state.
Figure 13:
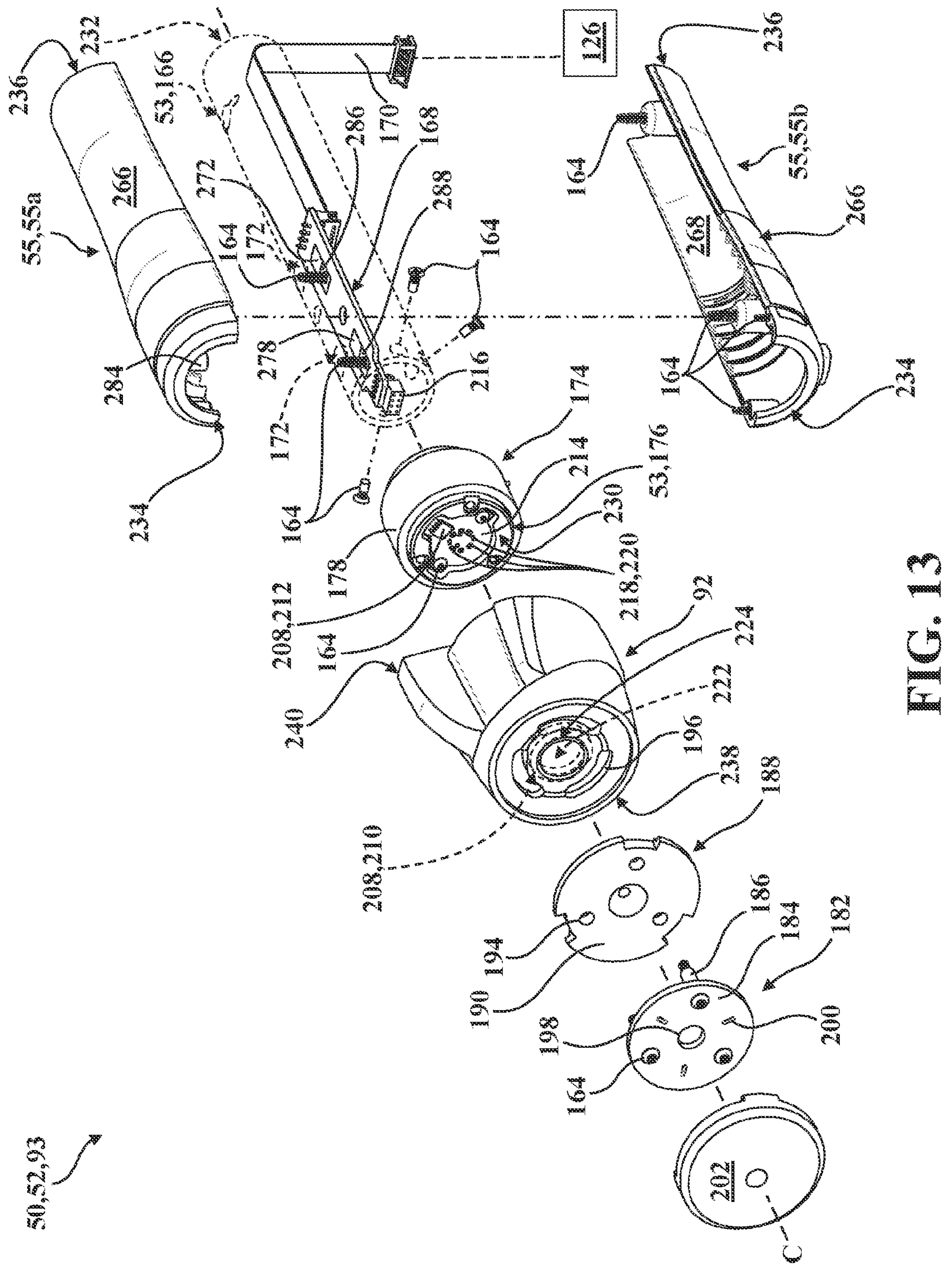
FIG. 13 is a partially-exploded perspective view of portions of the handle and the throttle assembly of FIG. 12.
Figure 14:
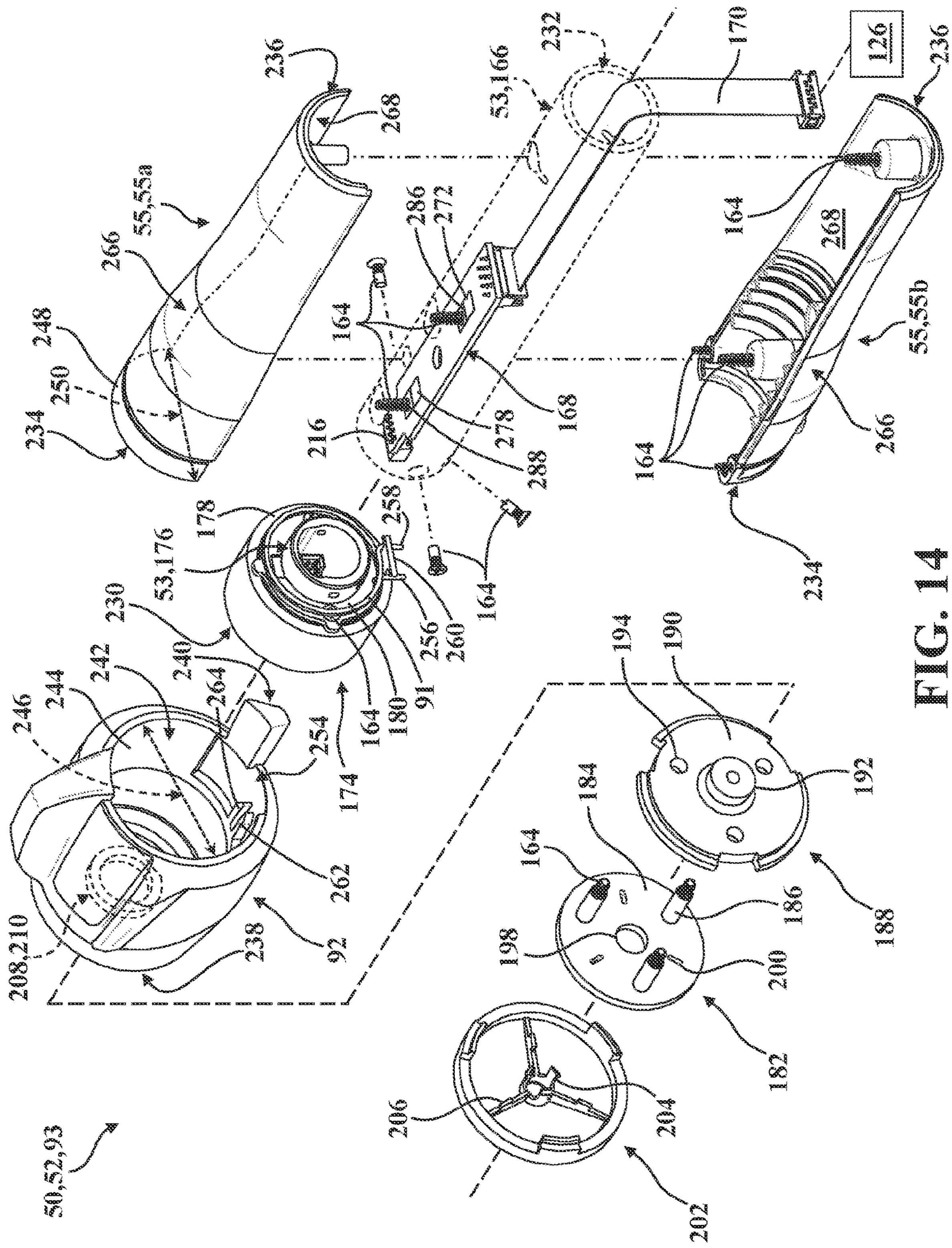
FIG. 14 is another partially-exploded perspective view of the portions of the handle and the throttle assembly of FIG. 12.
Figure 15:
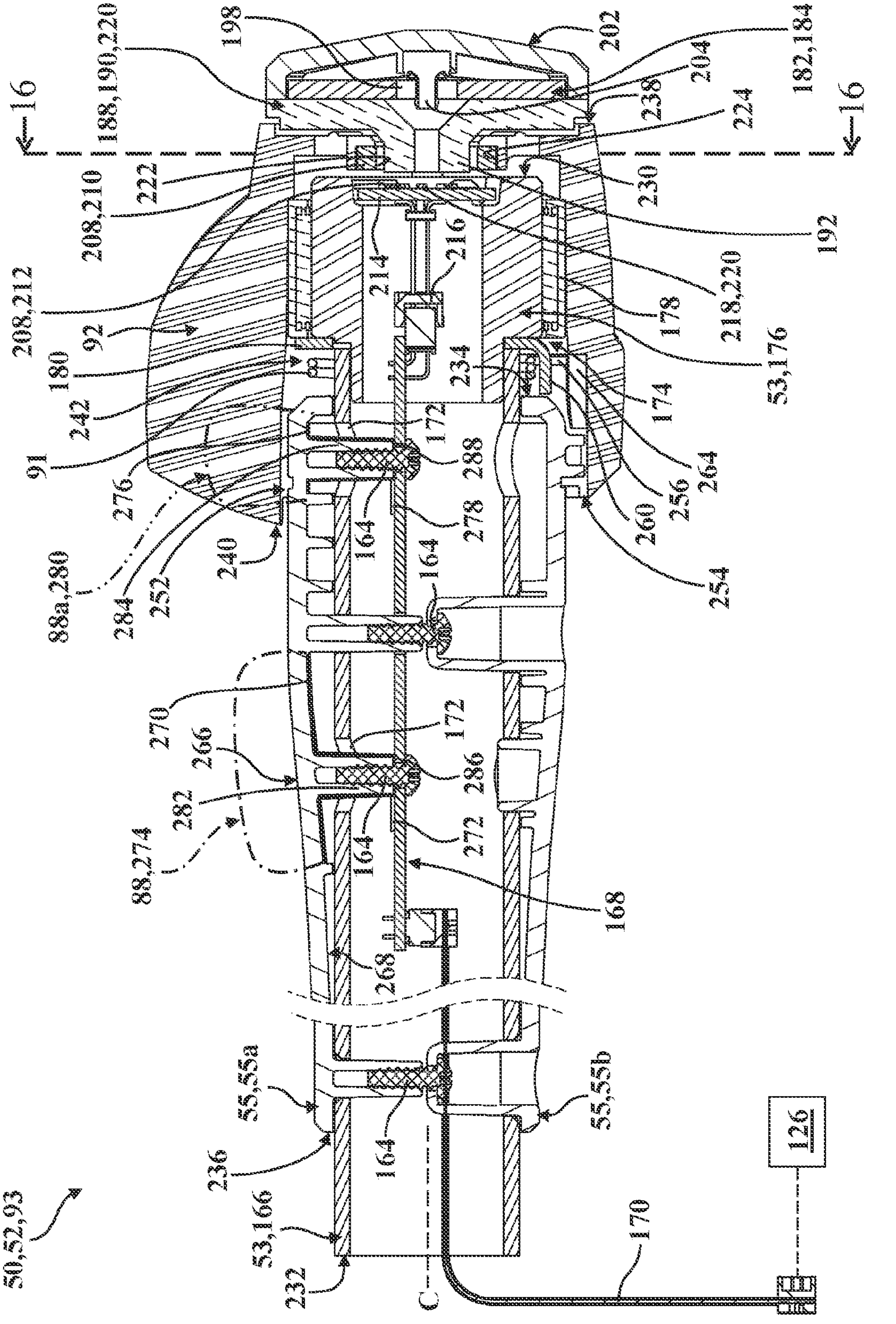
FIG. 15 is a broken, longitudinal sectional view of the portions of the handle and the throttle assembly of FIGS. 12-14.

Referring now to FIGS. 12-18B, another version of the first handle 52 (hereinafter referred to as "the handle 52") and the throttle assembly 93 is generally depicted. As is best depicted in FIGS. 13-15, the handle body 55 has a shell-like configuration defined by first and second handle body members 55*a*, 55*b* which interlock, clamp, or otherwise operatively attach to the inner support 53 via one or more fasteners 164. Here, the inner support 53 comprises a tubular member 166 has a generally hollow, cylindrical profile which defines the central axis C and generally facilitates connection of the handle 52 and the throttle assembly 93 to the intermediate frame 26 or another portion of the patient transport apparatus 20 (connection not shown in detail). In the illustrated version, an interface sensor board 168 is supported within the tubular member 166. The interface sensor board 168 is disposed in communication with the controller 126 of the control system 124 via a harness 170 and, as is described in greater detail below, generally supports the user interface sensors 88, 88A. Here, the interface sensor board 168 is secured to the first handle body member 55*a* of the handle body 55 via fasteners 164 which extend through clearance apertures 172 formed in the tubular member 166 of the inner support 53.

With continued reference to FIGS. 13-15, in the illustrated version, the throttle assembly 93 also comprises a bearing subassembly 174 to facilitate rotation of the throttle 92 about the central axis C to move from the neutral throttle position N (see FIGS. 8A and 16A) to the various operating throttle positions 107 such as: the maximum forward throttle position 108 (see FIGS. 8C and 16B) or another forward throttle position 111 defined by rotation from the neutral throttle position N in the first direction 94; or the maximum backward throttle position 112 (sec FIGS. 8F and 16C) or another backward throttle position 115 defined by rotation from the neutral throttle position N in the second direction 96. To this end, the bearing subassembly 174 generally comprises a coupling body 176 and a bearing 178. Here, the coupling body 176 forms part of the inner support 53 and is operatively attached to the tubular member 166 of the inner support 53 via one or more fasteners 164. The coupling body 176 supports the bearing 178 which, in turn, rotatably supports the throttle 92 for rotation about the central axis C so as to facilitate rotational movement of the throttle 92 relative to the handle body 55 from the neutral throttle position N to the one or more operating throttle positions 107. As is described in greater detail below, the coupling body 176 of the inner support 53 also supports the throttle biasing element 91 via a keeper plate 180.

In order to facilitate axial retention of the throttle 92, a retainer 182 comprising a retainer plate 184 and one or more retainer braces 186 secures to the coupling body 176 via one or more fasteners 164 such that at least a portion of the throttle 92 arranged along the central axis C is secured between the retainer plate 184 and the coupling body 176 (see also FIG. 15). In the illustrated version, a light guide 188, which is described in greater detail below in connection with FIGS. 17A-18B, is provided. The light guide 188 generally comprises a guide plate 190 and a guide extension 192 interposed in engagement between the retainer plate 184 and the throttle 92. To this end, the guide plate 190 comprises one or more guide apertures 194 through which the retainer braces 186 extend. Similarly, the throttle 92 in this version comprises one or more arc slots 196 (see FIG. 13; see also FIGS. 16A-16C) through which the retainer braces 186 extend. Here, the arc slots 196 are shaped and arranged to limit rotation of the throttle 92 about the central axis C between the maximum forward throttle position 108 (see FIG. 16B) and the maximum backward throttle position 112 (see FIG. 16C).

The retainer plate 184 also comprises a retainer aperture 198 and one or more retainer indexing features 200 (see FIG. 13) which facilitate attachment of an end cap 202 to the retainer 182. More specifically, and as is best depicted in FIG. 14, the end cap 202 comprises one or more cantilevered fingers 204 that extend into the retainer aperture 198 and secure against the retainer plate 184, and one or more end cap indexing features 206 that are shaped and arranged to engage in the retainer indexing features 200 so as to "clock" or otherwise align the end cap 202 with the retainer 182 about the central axis C.

Figure 16A:
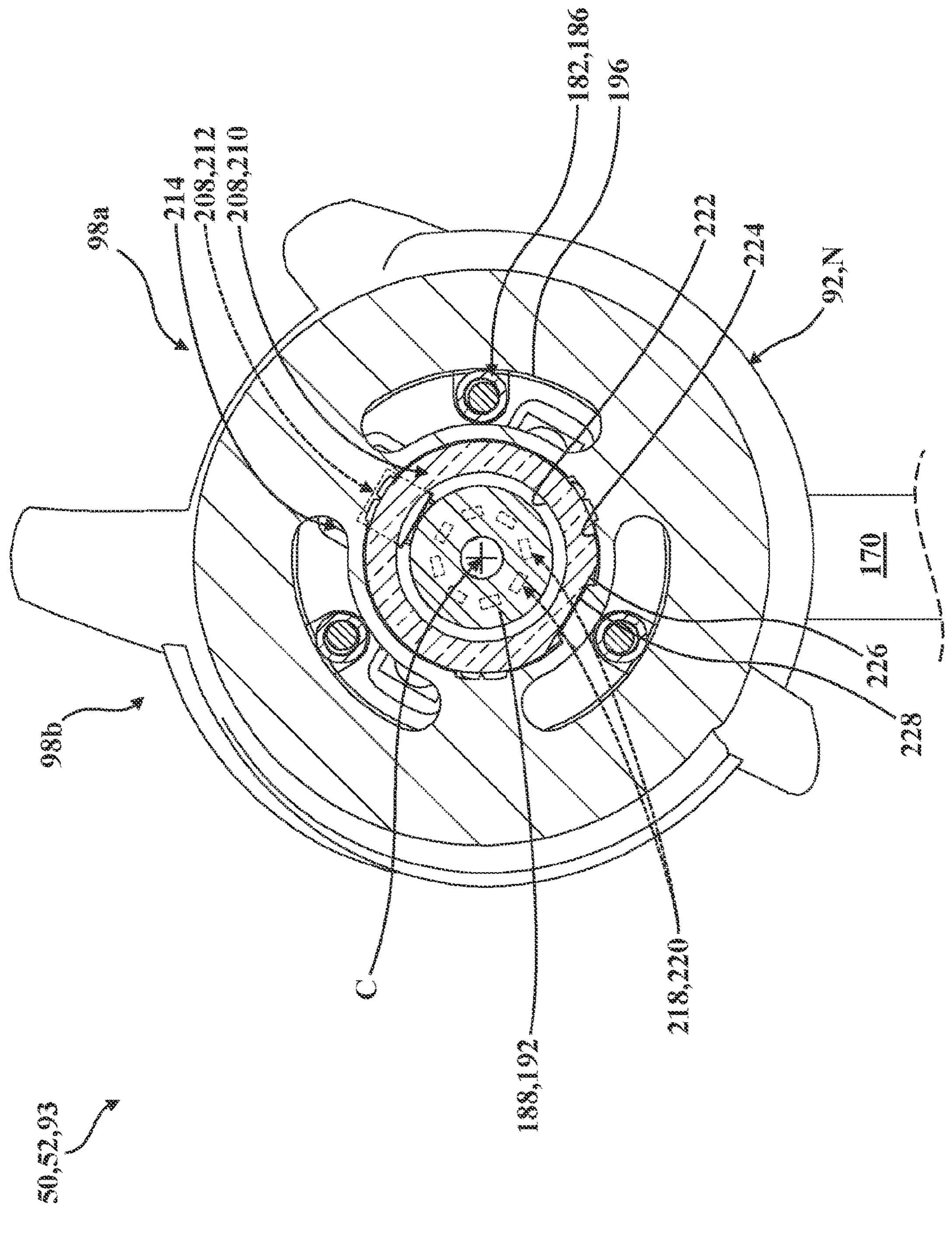
FIG. 16A is a transverse sectional view of the throttle assembly and the handle taken as indicated by line 16-16 in FIG. 15, depicting the throttle in the first position relative to the handle.
Figure 16B:
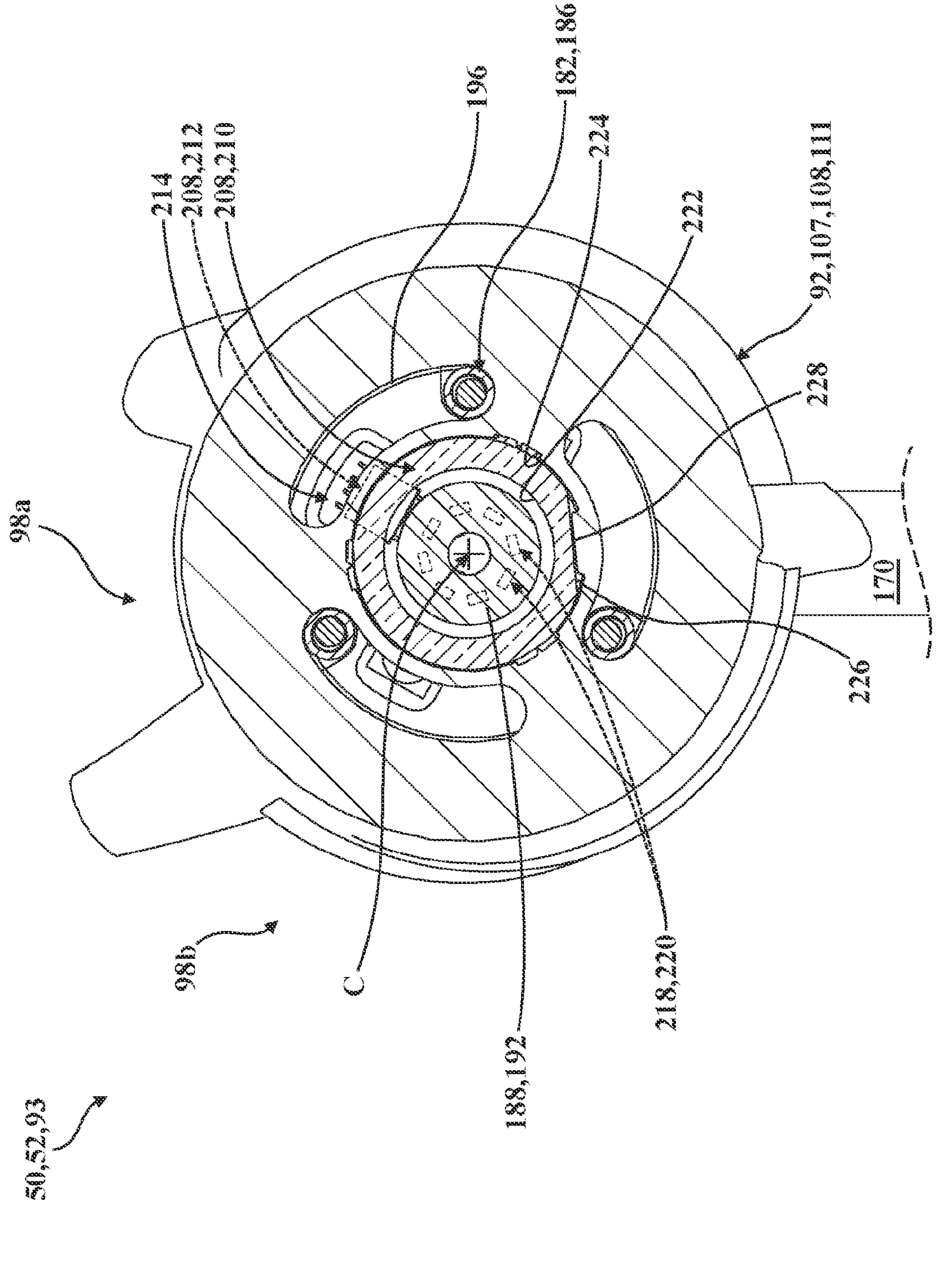
FIG. 16B is another transverse sectional view of the throttle assembly and the handle taken as indicated by line 16-16 in FIG. 15, depicting the throttle in the third position relative to the handle.
Figure 16C:
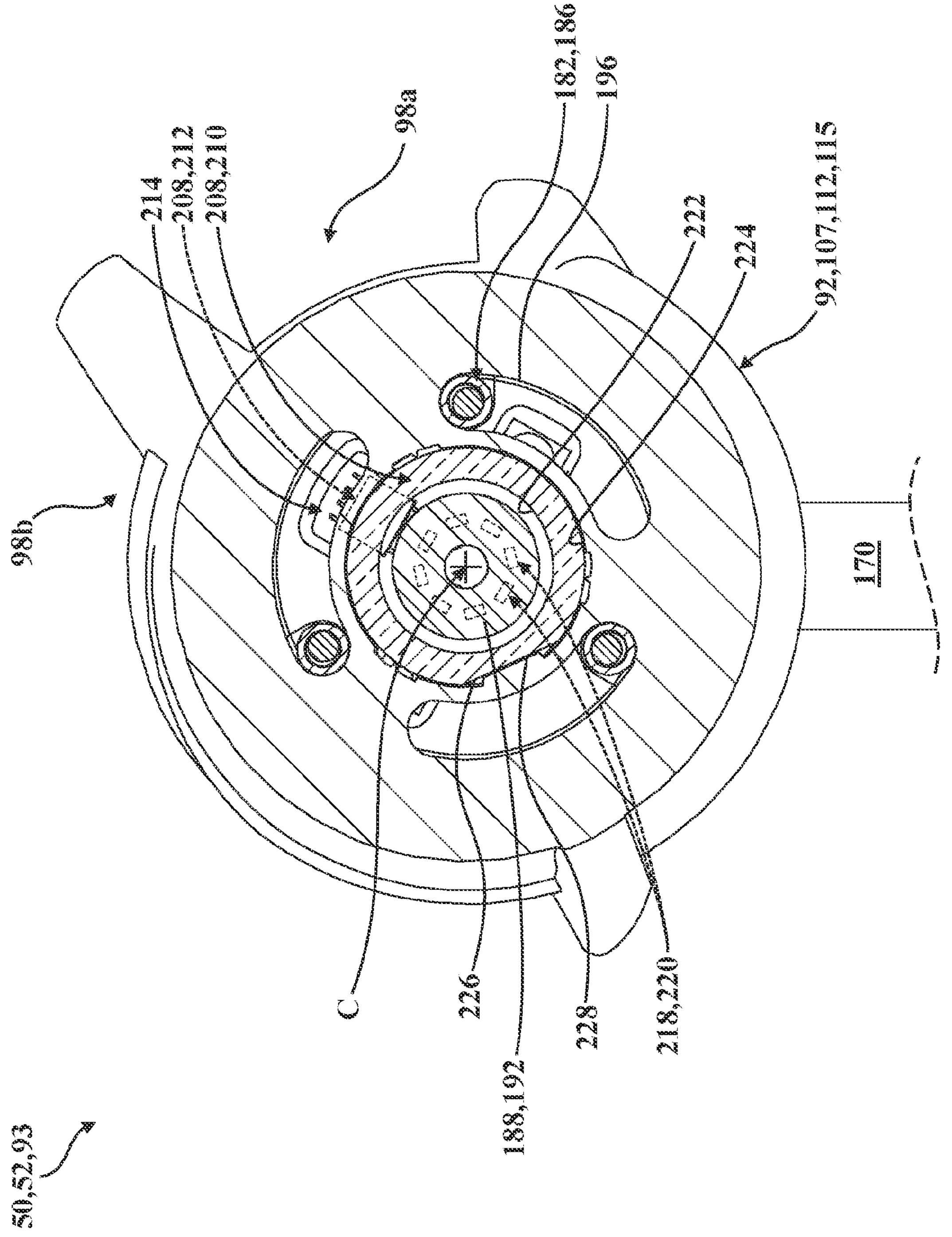
FIG. 16C is another transverse sectional view of the throttle assembly and the handle taken as indicated by line 16-16 in FIG. 15, depicting the throttle in the fifth position relative to the handle.

Referring now to FIGS. 13-16C, the throttle assembly 93 comprises a throttle position sensor, generally indicated at 208, which is interposed between the throttle 92 and the handle body 55 and is disposed in communication with the controller 126 (e.g., via electrical communication as depicted schematically in FIG. 10) to determine movement of the throttle 92 about the central axis C between the neutral throttle position N (see FIG. 16A) and the one or more operating throttle positions 107 (see FIGS. 16B-16C). Here, the throttle position sensor 208 detects the current position of the throttle 92 and generates a position signal used by the controller 126 to facilitate operation of the auxiliary wheel drive system 90. To this end, in the illustrated version, the throttle position sensor 208 comprises an emitter 210 coupled to the throttle 92 for concurrent movement therewith, and a detector 212 operatively attached to the inner support 53 for determining the position of the emitter 210 relative to the detector 212 as the throttle 92 moves between the neutral throttle position N (see FIG. 16A) and the one or more operating throttle positions 107 (see FIGS. 16B-16C).

The controller 126 is coupled to both the auxiliary wheel drive system 90 and the detector 212 of the throttle position sensor 208 (see FIG. 10), and is configured to operate the auxiliary wheel drive system 90 to rotate the auxiliary wheel 64 in the forward direction FW (sec FIG. 5C) when the throttle 92 is moved in the first direction 94 based on the detector 212 determining movement of the emitter 210 with the throttle 92 from the neutral throttle position N (see FIG. 16A) to the one or more forward throttle positions 111 (see FIG. 16B). The controller 126 is also configured to operate the auxiliary wheel drive system 90 to rotate the auxiliary wheel 64 in the rearward direction RW (see FIG. 5C) when the throttle 92 is moved in the second direction 96 based on the detector 212 determining movement of the emitter 210 with the throttle 92 from the neutral throttle position N (see FIG. 16A) to the one or more backward throttle positions 115 (see FIG. 16C).

With continued reference to FIGS. 13-16C, in the illustrated version, the emitter 210 is configured to generate a predetermined magnetic field, and the detector 212 is responsive to predetermined changes in magnetic fields to determine a relative position of the emitter 210 as the throttle 92 moves from the neutral throttle position N to the one or more operating throttle positions 107. To this end, the detector 212 is realized as a Hall-effect sensor in the illustrated version and is supported on a throttle circuit board 214 disposed in communication with the interface sensor board 168 via a connector 216. As described in greater detail below, the interface sensor board 168 is coupled to or otherwise disposed in electrical communication with the controller 126 (e.g., via wired electrical communication across the harness 170).

The throttle circuit board 214 is operatively attached to the coupling body 176 via one or more fasteners 164 (see FIG. 13), and also supports one or more light modules 218 (e.g., single and/or multi-color light emitting diodes LEDs). The light modules 218 and the light guide 188 cooperate to define a status indicator 220 driven by the controller 126 in the illustrated version to communicate various changes in status of the auxiliary wheel drive system 90 to the user as described in greater detail below in connection with FIGS. 17A-18B. The controller 126 is generally configured to selectively drive the one or more light modules 218 to emit light through the light guide 188 which, as noted above, is operatively attached to the inner support 53 adjacent to the throttle 92. Here, the light guide 188 is configured to direct light emitted by the one or more light modules 218 of the status indicator 220 in a direction facing away from the central axis C. To this end, the one or more light modules 218 are arranged so as to selectively emit light in a direction generally parallel to or otherwise along the central axis C. In the illustrated version, the emitter 210 has a substantially annular profile defining an emitter void 222 shaped to permit light emitted by the one or more light modules 218 to pass through the emitter void 222.

As is best depicted in FIG. 15, at least a portion of the light guide 188 (e.g., the guide extension 192) extends into or otherwise through the emitter void 222 of the emitter 210. Here, it will be appreciated that the emitter 210 is not disposed in contact with the light guide 188 and moves concurrently with the throttle 92 about the central axis C relative to the light guide 188 which, as noted above, is operatively attached to the inner support 53 of the handle 52 and is therefore fixed relative to the central axis C. With this arrangement, the throttle 92 similarly comprises a throttle void 224 in which the emitter 210 is supported such that at least a portion of the light guide 188 (e.g., the guide extension 192) also extends into or otherwise through the throttle void 224. While the emitter 210 has a substantially annular profile as noted above, this annular profile also comprises a transverse notch 226 that abuts a corresponding flat 228 formed in the throttle void 224 of the throttle 92. This arrangement "clocks" the emitter 210 relative to the throttle 92 and helps facilitate concurrent movement between the emitter 210 and the throttle 92 about the central axis C. It will be appreciated that other configurations are contemplated for the emitter 210 besides those illustrated throughout the drawings. By way of non-limiting example, while the illustrated emitter 210 is realized as a magnet with an annular profile, in other versions the emitter 210 could be an insert with a cylindrical or other profile, manufactured from magnetic materials or other materials (e.g., steel), that is coupled directly to the throttle 92 or is coupled to a carrier (e.g. an annular ring made from plastic that is shaped similarly to the illustrated annular emitter 210) that is, in turn, coupled to the throttle 92. Other configurations are contemplated. Furthermore, it will be appreciated that certain versions described in the present disclosure could employ differently-configured throttle position sensors 208, realized with similar emitter/detector arrangements or with other sensor types, styles, and configurations (e.g., one or more potentiometers, encoders, and the like). Other configurations are contemplated.

Referring again to FIGS. 13-15, in the illustrated version, the inner support 53 of the handle 52 defines a distal support end 230 and an opposing proximal support end 232. Here, the distal support end 230 is defined by a portion of the coupling body 176, and the proximal support end 232 is defined by a portion of the tubular member 166. Moreover, the handle body 55 defines a distal handle body end 234 and an opposing proximal handle body end 236. As noted above, the handle body 55 is defined by the first and second handle body members 55*a*, 55*b* in the illustrated version, either or both of which define the distal and proximal handle body ends 234, 236. Furthermore, the throttle 92 defines a distal throttle end 238 and an opposing proximal throttle end 240 with a throttle chamber 242 (see FIG. 14) formed extending from the proximal throttle end 240 toward the distal throttle end 238. It will be appreciated that the throttle void 224 and the arc slots 196 of the throttle 92 are arranged adjacent to the distal throttle end 238 (see FIG. 13) such that the emitter 210 is coupled to the throttle 92 adjacent to the distal throttle end 238 and the detector 212 is arranged at least partially within the throttle chamber 242. In addition, and as is best depicted in FIG. 15, the bearing 178 is disposed in the throttle chamber 242 between the distal and proximal throttle ends 238, 240, and is arranged along the central axis C between the distal support end 230 (defined by the coupling body 176 of the inner support 53 as noted above) and the distal handle body end 234. As such, the inner support 53 extends at least partially into the throttle chamber 242 such that the proximal throttle end 240 is arranged between the distal and proximal support ends 230, 232. Here, it will be appreciated that the bearing 178 is completely disposed within the throttle chamber 242. This configuration helps ensure long life of the bearing 178 in that foreign contaminants such as dirt, liquids, and the like cannot readily enter into the throttle chamber 242 and travel toward the bearing 178 to otherwise cause inconsistent or degraded performance of the throttle assembly 93. In the illustrated version, the bearing 178 is realized with a single, elongated needle bearing that is shaped and arranged to both facilitate rotation of the throttle 92 about the central axis C and also to ensure that force applied in directions generally transverse to the central axis C (e.g., via force applied to the throttle 92) do not result in deteriorated performance over time (e.g., bearing "slop" or "play").

As shown in FIG. 15, the distal handle body end 234 of the handle body 55 is arranged between the distal and proximal throttle ends 238, 240 of the throttle 92 such that at least a portion of the handle body 55 is also disposed within the throttle chamber 242 adjacent to the bearing 178. Here, the throttle chamber 242 defines a proximal chamber region 244 having a proximal chamber diameter 246 (see FIG. 14), and the handle body 55 defines a distal pilot region 248 formed adjacent to the distal handle body end 234 and having a distal pilot diameter 250 (see FIG. 14) smaller than the proximal chamber diameter 246. This configuration defines a gap region, generally indicated at 252 in FIG. 15. Here, the throttle 92 further comprises a drip channel, generally indicated at 254, formed extending from the proximal throttle end 240 into communication with the gap region 252 and arranged to promote egress of contaminants entering into the gap region 252. As shown in FIG. 14, the drip channel 254 is "recessed" and has a larger diameter than the proximal chamber diameter 246 (not shown in detail). This configuration helps direct any contaminants out of the throttle chamber 242 that might enter into the gap region 252 during use. In some versions, the drip channel 254 is shaped and/or arranged such that movement of the handle 52 between the use position PU and the stow position PS (see FIG. 1) promotes egress of contaminants from the gap region 252. In some versions, one or more gaskets, seals, O-rings, and the like (not shown) may be provided in the throttle chamber 242, or in other portions of the throttle assembly 93 and/or handle 52, to further inhibit egress of contaminants toward the bearing 178, the interface sensor board 168, the throttle circuit board 214, and/or other components or structural features. Other configurations are contemplated.

Referring now to FIGS. 14-15, as noted above, the throttle biasing element 91 is interposed between the throttle 92 and the inner support 53 to urge the throttle toward the neutral throttle position N. To this end, and in the illustrated version, the throttle biasing element 91 is realized as a torsion spring with first and second tangs 256, 258 that are each arranged to engage against a keeper stop element 260 formed on the keeper plate 180, and also against respective first and second throttle stop elements 262, 264 formed in the drip channel 254 of the throttle 92. Thus, the throttle biasing element 91 permits the throttle 92 to rotate about the central axis C in either of the first and second directions 94, 96 (see FIG. 12) as the user rotates the throttle 92 to the operating throttle positions 107 (see FIGS. 16B-16C), and biases, urges, or otherwise promotes movement of the throttle 92 back toward the neutral throttle position N (see FIG. 16A) in an absence of applied force to the throttle 92 by the user.

Referring now to FIGS. 12-15, the illustrated version similarly employs one or more user interface sensors 88, 88A in communication with the controller 126 to determine engagement by the user with the throttle assembly 93 in order to, among other things, enable or disable rotation of the auxiliary wheel 64 via the auxiliary wheel drive system 90 and/or raise or lower the auxiliary wheel 64 relative to the support structure 22 via the lift actuator 66 based on determining engagement with the user as described in greater detail above in connection with FIGS. 1-10. However, in this version, and as is best depicted in FIG. 15, the handle body 55 of the handle 52 defines an outer housing surface 266 configured to be gripped by the user and an inner housing surface 268 disposed adjacent to the inner support 53, and the user interface sensor 88 comprises a first conductive element 270 and a first sensor controller 272. The first conductive element 270 is coupled to the inner housing surface 268 of the first handle body member 55*a*, and is disposed in electrical communication with the first sensor controller 272 as described in greater detail below.

In the illustrated version, the first sensor controller 272 is supported on the interface sensor board 168, is coupled to the controller 126 (e.g., via wired electrical communication across the harness 170), and is configured to generate a first electrostatic field 274 with the first conductive element 270 to determine engagement of the throttle assembly 93 by the user in response to contact with the outer housing surface 266 adjacent to (but spaced from) the first conductive element 270 that nevertheless interacts with the first electrostatic field 274. Here, the outer housing surface 266 acts as an insulator (manufactured such as from plastic or another material configured for electrical insulation), and the user's hand acts as a conductor such that engagement therebetween results in a measurable capacitance that can be distinguished from an absence of user engagement with the first electrostatic field 274. Those having ordinary skill in the art will appreciate that this arrangement provides the user interface sensor 88 with a "solid state" capacitive-touch type configuration, which helps promote consistent determination of user engagement without requiring physical contact with electrical components. Here too, it will be appreciated that this configuration allows the various components of the user interface sensor 88 to remain out of physical contact with the user and generally unexposed to the environment.

Here too in this version, the auxiliary user interface sensor 88*a* is similarly provided to determine engagement by the user separate from the determination by the user interface sensor 88. More specifically, in this version, the user interface sensor 88 is arranged to determine user engagement with the handle body 55, whereas the auxiliary user interface sensor 88*a* is arranged to determine user engagement with the throttle 92. While similar in arrangement to the previously-described versions depicted in FIGS. 6A-7 in that the auxiliary user interface sensor 88*a* can be utilized to determine engagement adjacent to the thumb throttle interface 98*a* and/or the finger throttle interface 98*b*, in this version the auxiliary user interface sensor 88*a*, similar to the user interface sensor 88, comprises a second conductive element 276 coupled to the inner housing surface 268 of the first handle body member 55*a* adjacent to the distal handle body end 234.

The second conductive element 276 is disposed in electrical communication with a second sensor controller 278, which is likewise supported on the interface sensor board 168 and is coupled to the controller 126 (e.g., via wired electrical communication across the harness 170). Here, the second sensor controller 278 is configured to generate a second electrostatic field 280 with the second conductive element 276 to determine engagement of the throttle assembly 93 by the user in response to contact with the outer housing surface 266 adjacent to (but spaced from) the second conductive element 276 that nevertheless interacts with the second electrostatic field 280.

As shown in FIG. 15, the first and second conductive elements 270, 276 are each realized by respective areas of conductive coating applied to the inner housing surface 268 of the first handle body member 55*a* of the handle body 55. As noted above, the tubular member 166 of the inner support 53 is provided with clearance apertures 172 through which fasteners 164 extend in order to secure the interface sensor board 168 to the first handle body member 55*a*. More specifically, in the illustrated version, the first handle body member 55*a* comprises first and second bosses 282, 284 which depend from the inner housing surface 268 and into which the fasteners 164 extend (e.g., in threaded engagement). Here, the conductive coatings that respectively define the first and second conductive elements 270, 276 are applied both to the inner housing surface 268 as well as to the first and second bosses 282, 284 used to secure the interface sensor board 168. Here, the interface sensor board 168 is provided with first and second pads 286, 288 which respectively contact the conductive coatings applied to the first and second bosses 282, 284. The first and second pads 286, 288 are respectively coupled (e.g., disposed in electrical communication via a soldered connection) to the first and second sensor controllers 272, 278, thereby facilitating electrical communication with the first and second conductive elements 270, 276 via attachment of the interface sensor board 168 to the first handle body member 55*a*. Because the first and second bosses 282, 284 have the conductive coating applied to facilitate electrical communication, the clearance apertures 172 of the tubular member 166 are sized larger than the first and second bosses 282, 284 to prevent electrical contact therebetween (e.g., which might otherwise occur with metallic tubular members 166 manufactured such as from steel).

As noted above, the controller 126 is disposed in electrical communication with the interface sensor board 168 and also with the throttle circuit board 214 via the harness 170 such that the controller 126 is not necessarily disposed within the handle 52 and may be coupled to other portions of the patient transport apparatus 20 (see also FIG. 10). Similar to the controller 126, the first and second sensor controllers 272, 278 may be of a number of different types, styles, and/or configurations, defined by one or more electrical components such as processors, integrated circuits, and the like. In some versions, the first and second sensor controllers 272, 278 may be realized with a common electrical component (e.g., via separate I/O connections of the same processor, integrated circuit, and the like). In some versions, the first and second sensor controllers 272, 278 may not necessarily be supported on the interface sensor board 168. Similarly, in some versions, the first and second sensor controllers 272, 278 may be realized directly by the controller 126 (e.g., via separate I/O connections of the controller 126) rather than being coupled in communication with the controller 126. Other configurations are contemplated.

Furthermore, it will be appreciated that the controller 126 can directly or indirectly use the first and second sensor controllers 272, 278 to facilitate detecting, sensing, or otherwise determining user engagement with the handle body 55 and the throttle 92, respectively, of the throttle assembly 93 in a number of different ways, and can control operation of a number of different aspects of the patient transport apparatus 20 based on engagement with one or both of the user interface sensors 88, 88A based on communication with the first and second sensor controllers 272, 278 (e.g., electrical signals of various types). In some versions, the controller 126 is configured to operate the auxiliary wheel drive system 90 (see FIGS. 5A-5C) in response to movement of the throttle 92 from the neutral throttle position N (see FIGS. 8A and 16A) to the one or more operating throttle positions 107 (see FIGS. 8C, 8F, and 16B-16C) determined by the detector 212 of the throttle position sensor 208 during engagement simultaneously with the handle body 55 determined by the user interface sensor 88 and with the throttle 92 determined by the auxiliary user interface sensor 88*a*. Put differently, the controller 126 may be configured to "ignore" movement of the throttle 92 or otherwise inhibit operation of the auxiliary wheel drive system 90 during an absence of engagement by the user with the throttle assembly 93 simultaneously determined by the user interface sensor 88 and the auxiliary user interface sensor 88*a*. Thus, in some versions, the controller 126 will not drive the auxiliary wheel 64 via the motor 102 unless the user engages both the handle body 55 and the throttle 92 (e.g. at one of the thumb and throttle interfaces 98*a*, 98*b*). Other configurations are contemplated.

In some versions, the controller 126 is configured to operate the lift actuator 66 (see FIGS. 5A-5C) in order to move the auxiliary wheel 64 from the retracted position 70 (see FIG. 5A) to the deployed position 68 (see FIG. 5C) in response to engagement by the user with at least one of the handle body 55 determined by the user interface sensor 88 and the throttle 92 determined by the auxiliary user interface sensor 88*a*. Put differently, the controller 126 may be configured to drive the lift actuator 66 so as to move the auxiliary wheel 64 toward the deployed position 68 when the user engages either the throttle 92 and/or the handle body 55. However, in some versions, even though the controller 126 may move the auxiliary wheel 64 to the deployed position 68 when the user engages only one of the throttle 92 and the handle body 55, rotation of the auxiliary wheel 64 via the motor 102 may remain interrupted, disabled, or otherwise prevented in response to rotation of the throttle 92 determined via the throttle position sensor 208 until the controller 126 has determined that the user is engaging both the throttle 92 and the handle body 55. Other configurations are contemplated.

In some versions, the controller 126 is configured to maintain the auxiliary wheel 64 in the deployed position 68 (see FIG. 5C) in response to continued engagement by the user with the throttle assembly 93 determined by the user interface sensor 88 and/or by the auxiliary user interface sensor 88*a*. Conversely, in some versions, the controller 126 is configured to operate the lift actuator 66 to move the auxiliary wheel 64 from the deployed position 68 toward the retracted position 70 during an absence of engagement by the user with either the handle body 55 determined by the user interface sensor 88 and/or with the throttle 92 determined by the auxiliary user interface sensor 88*a*. Put differently, if the controller 126 moves the auxiliary wheel 64 to the deployed position 68 in response to determining user engagement with the throttle assembly 93, and if the user subsequently disengages the throttle assembly 93 altogether, then the controller 126 may be configured to return the auxiliary wheel 64 to the retracted position 70 in response to sensing complete disengagement of the throttle assembly 93. However, in some versions, the controller 126 may also move the auxiliary wheel 64 to the retracted position 70 (or to one of the intermediate positions 71) in response to detecting partial user disengagement of the throttle assembly 93 (e.g., determining disengagement with the throttle 92 but not the handle body 55, or vice-versa). Here too, other configurations are contemplated.

Figure 17A:
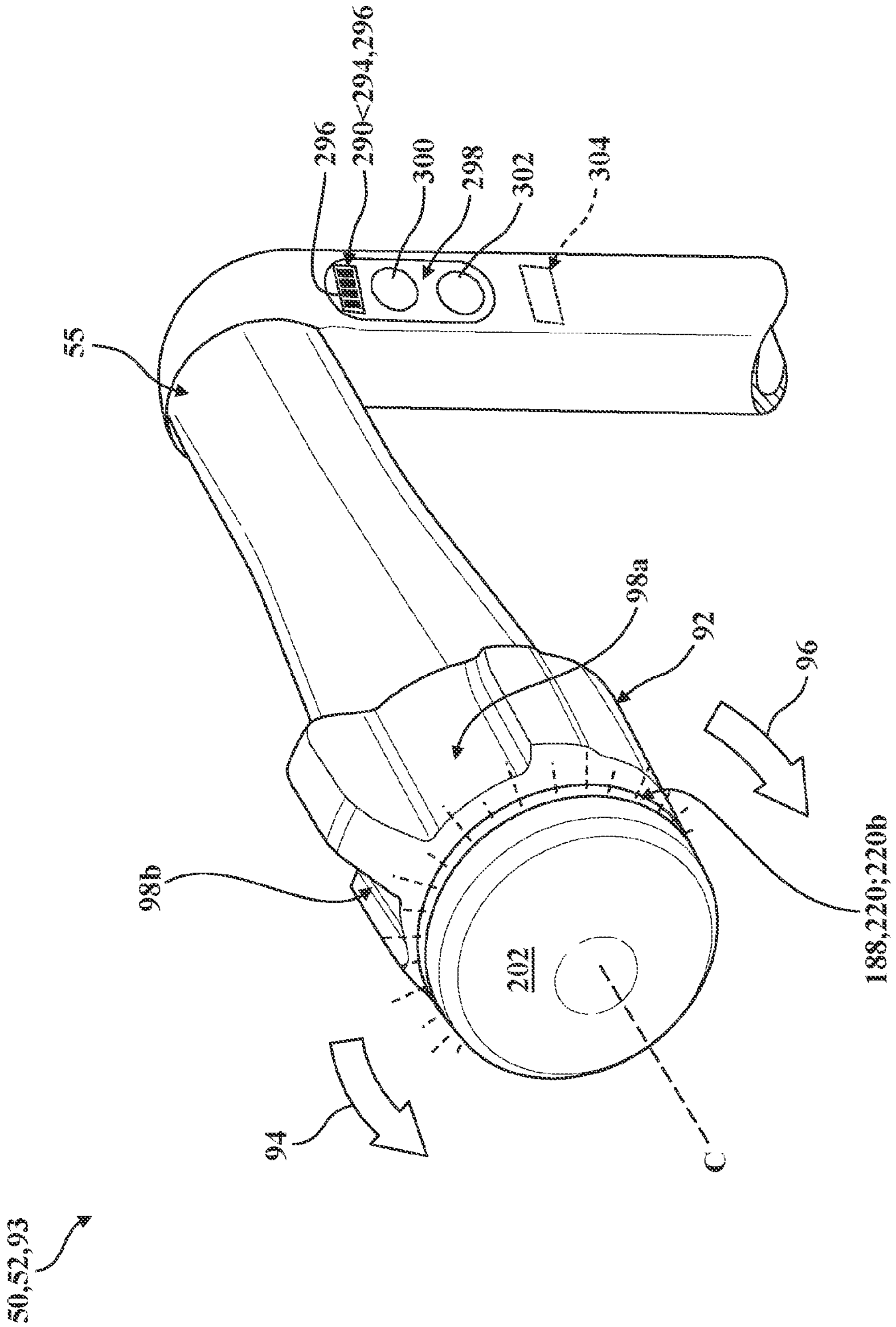
FIG. 17A is another partial perspective view of the handle and the throttle assembly of the patient transport apparatus of FIG. 12, shown with the status indicator operating in a second output state.
Figure 17B:
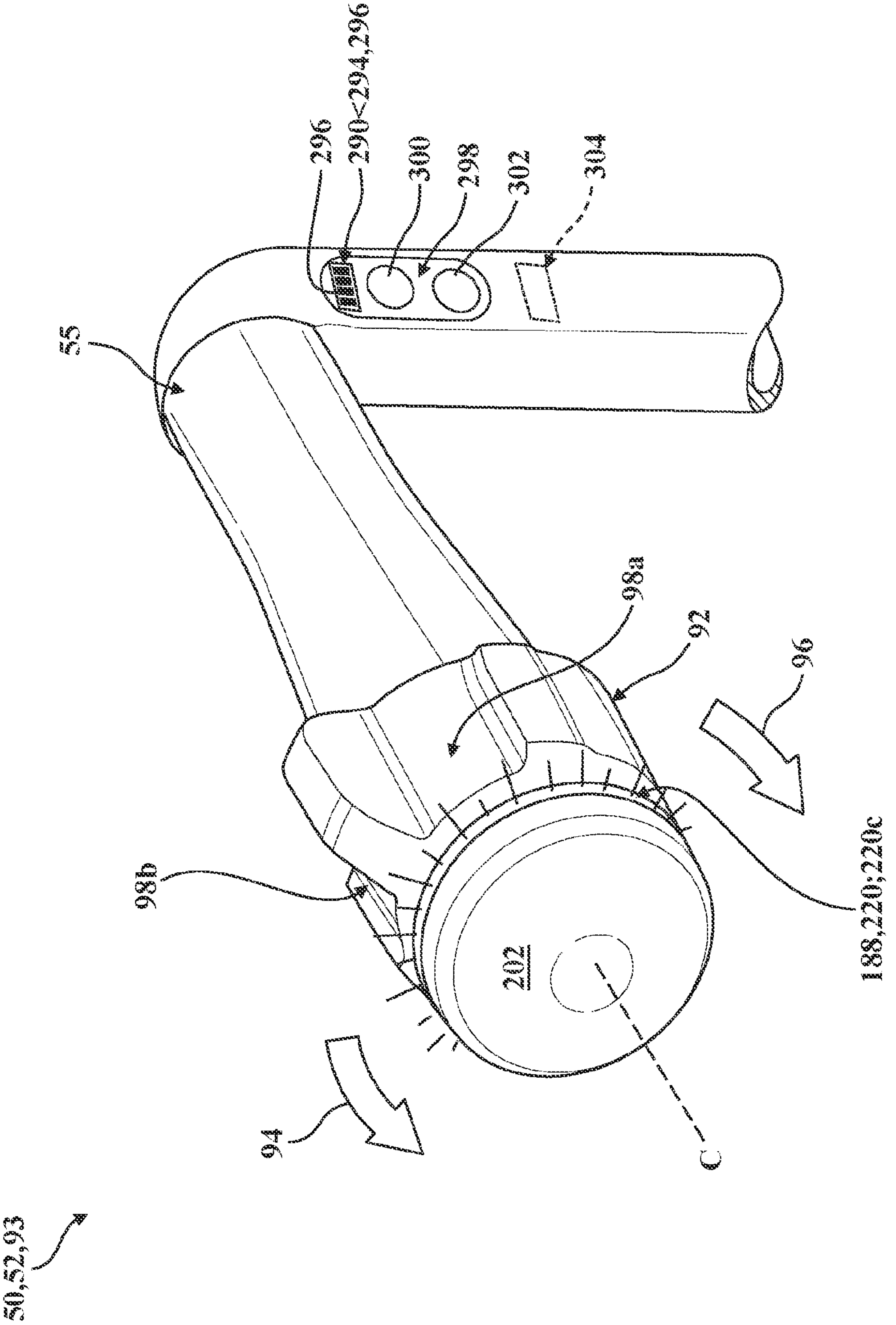
FIG. 17B is another partial perspective view of the handle and the throttle assembly of the patient transport apparatus of FIG. 12, shown with the status indicator operating in a third output state.

As noted above, the controller 126 utilizes the auxiliary wheel position sensor 146 to determine the relative position of the auxiliary wheel 64 between the deployed position 68 (sec FIG. 5C), the retracted position 70 (see FIG. 5A) and the intermediate positions 71 therebetween (see FIG. 5B). Accordingly, the controller 126 is also able to determine movement of the auxiliary wheel 64 via the auxiliary wheel position sensor 146 (e.g., while driving the lift actuator 66). Referring now to FIGS. 12, and 17A-17B, as noted above, the status indicator 220 coupled to the throttle assembly 93 in the illustrated version is employed to facilitate communicating various changes in status of the auxiliary wheel drive system 90 to the user. In one version, the status indicator 220 is operable by the controller 126 in (and between) a first output state 220*a* (see FIG. 12), a second output state 220*b* (see FIG. 17*a*), and a third output state 220*c* (see FIG. 17*b*). Each of the output states 220*a*, 220*b*, 220*c* is different from the others and is configured to communicate a respective status of the auxiliary wheel drive system 90 to the user, as described in greater detail below.

In the exemplary version described and illustrated herein, the first output state 220*a* of the status indicator 220 indicates that the auxiliary wheel 64 is in the retracted position 70 (see FIG. 5A), whereas the second output state 220*b* generally indicates that the auxiliary wheel 64 is moving between the plurality of positions 68, 70, 71, and the third output state 220*c* generally indicates that the auxiliary wheel 64 is in the deployed position 68 (see FIG. 5C). As will be appreciated from the subsequent description below, the status indicator 220 affords functionality that is similar to the auxiliary wheel position indicator 130 (see FIG. 6A) described above in that the user can readily determine whether the auxiliary wheel 64 is deployed or not. In some versions, both the auxiliary wheel position indicator 130 and the status indicator 220 may be utilized. It is also contemplated that aspects of the status indicator 220 described in greater detail below could be implemented into the auxiliary wheel position indicator 130. Other configurations are contemplated.

As noted above, the status indicator 220 comprises the one or more light modules 218 in the illustrated version to selectively (e.g., driven by the controller 126) emit light into the guide extension 192 of the light guide 188 which, in turn, directs the emitted light (e.g., via total internal reflection) out of the guide plate 190 and away from the center axis C so as to be readily observed by the user. In one version, the first output state 220*a* corresponds to or is otherwise further defined as an absence of light emission via the one or more light modules 218 (see FIG. 12) such that no light is emitted out of the light guide 188 when the auxiliary wheel 64 is in the retracted position 70 (see FIG. 5A), the second output state 220*b* corresponds to or is otherwise further defined as a repeating sequence of light emission followed by an absence of light emission out of the light guide 188 via the one or more light modules 218 (see FIG. 17A; light depicted with dashed lines to illustrate "blinking" emission) when the auxiliary wheel 64 is moving between the positions 68, 70, 71; and the third output state 220*c* corresponds to or is otherwise further defined as light emission out of the light guide 188 via the one or more light modules 218 (sec FIG. 17B; light depicted with solid lines to illustrate "constant" emission).

Accordingly, in this version, the controller 126 is configured to operate the status indicator 220 in the first output state 220*a* (see FIG. 12) during an absence of engagement by the user with the throttle assembly 93 determined by the one or more user interface sensors 88*a*, 88*b*, and/or when the auxiliary wheel 64 is otherwise disposed in the retracted position 70 (see FIG. 5A). Here, the status indicator 220 is "off" when the user is not utilizing or attempting to utilize the auxiliary wheel drive system 90.

The controller 126 is also configured to operate the lift actuator 66 to move the auxiliary wheel 64 from the retracted position 70 (see FIG. 5A) to the deployed position 68 (sec FIG. 5C) in response to engagement by the user with the throttle assembly 93 determined by the one or more user interface sensors 88, 88*a*. Here, while driving the lift actuator 66, the controller 126 is also configured to simultaneously operate the status indicator 220 in the second output state 220*b* (see FIG. 17A) when the auxiliary wheel 64 is moving, such as in response to signals generated by the auxiliary wheel position sensor 146 that indicate movement of the auxiliary wheel 64 in response to corresponding actuation of the lift actuator 66. Here, the status indicator 220 is illuminated in a "blinking" fashion via light emitted from the one or more light modules 218 when the user engages the throttle assembly 93 and as the auxiliary wheel 64 is moving. This configuration readily indicates to the user that their engagement with the throttle assembly 93 has been recognized, which promotes significantly improved usability for applications which utilize "capacitive-touch" and or other types of "solid state" user interface sensors 88, 88*a* that do not otherwise afford the user with tactile feedback (e.g., "feeling" movement of a momentary button, switch, and the like).

Furthermore, the controller 126 is also configured to operate the status indicator 220 in the third output state 220*c* (see FIG. 17B) in response to the auxiliary wheel 64 moving into or otherwise being in the deployed position 68 (see FIG. 5C) determined such as by the auxiliary wheel position sensor 146. Here, the status indicator 220 is illuminated in a "constant" fashion via light emitted from the one or more light modules 218 when the user remains in engagement with the throttle assembly 93 once the auxiliary wheel 64 reaches the deployed position 68 (see FIG. 5C). This configuration readily indicates to the user that their continued engagement with the throttle assembly 93 has been recognized while, at the same time, differentiating between the second output state 220*b* to indicate that the auxiliary wheel drive system 90 is "ready for use" after movement via the lift actuator 66 has been completed. This is particularly advantageous in applications where movement to the deployed position 70 is relatively slow because the user can readily appreciate that the auxiliary wheel drive system 90 is "not ready for use" whenever the status indicator 220 is blinking, and can similarly recognize that the auxiliary wheel drive system 90 is "ready for use" whenever the status indicator is illuminated without blinking.

While the first, second, and third output states 220*a*, 220*b*, 220*c* of the status indicator 220 correspond to different and distinguishable "types" of light emission via the one or more light modules 218, it will be appreciated that different "types" of light emission could be utilized to differentiate between output states, and/or that the status indicator 220 could comprise other and/or additional types of indicators sufficient to communicate different states to the user. By way of non-limiting example, the status indicator 220 may be configured to generate different types of audible (e.g., to generate different types of "beeping" sounds via a speaker) and/or tactile feedback (e.g., to generate different types of haptic patterns such as by a vibrating motor) that can be observed by the user. Furthermore, it is contemplated that, in some versions, fewer or more than three output states could be utilized, and could be attributed to different types of status indicators 220. By way of non-limiting example, rather than "blinking" during movement of the lift actuator 66, the one or more light modules 218 could remain "off" while a vibrating motor "pulses" until the deployed position 68 is reached and the one or more light modules 218 then turn "on" and the vibrating motor stops. Other configurations are contemplated.

Figure 18A:
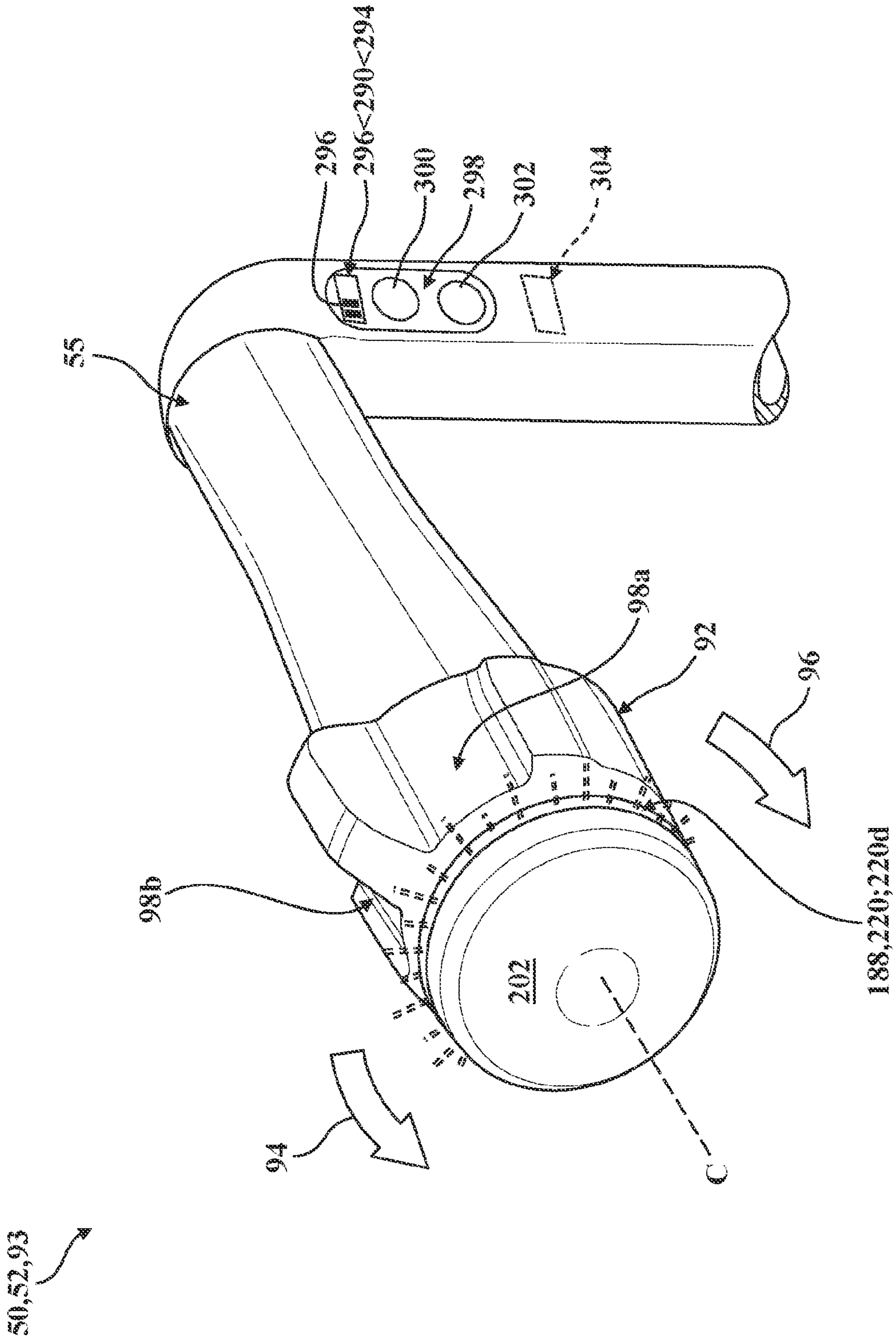
FIG. 18A is another partial perspective view of the handle and the throttle assembly of the patient transport apparatus of FIG. 12, shown with the status indicator operating in an auxiliary second output state.
Figure 18B:
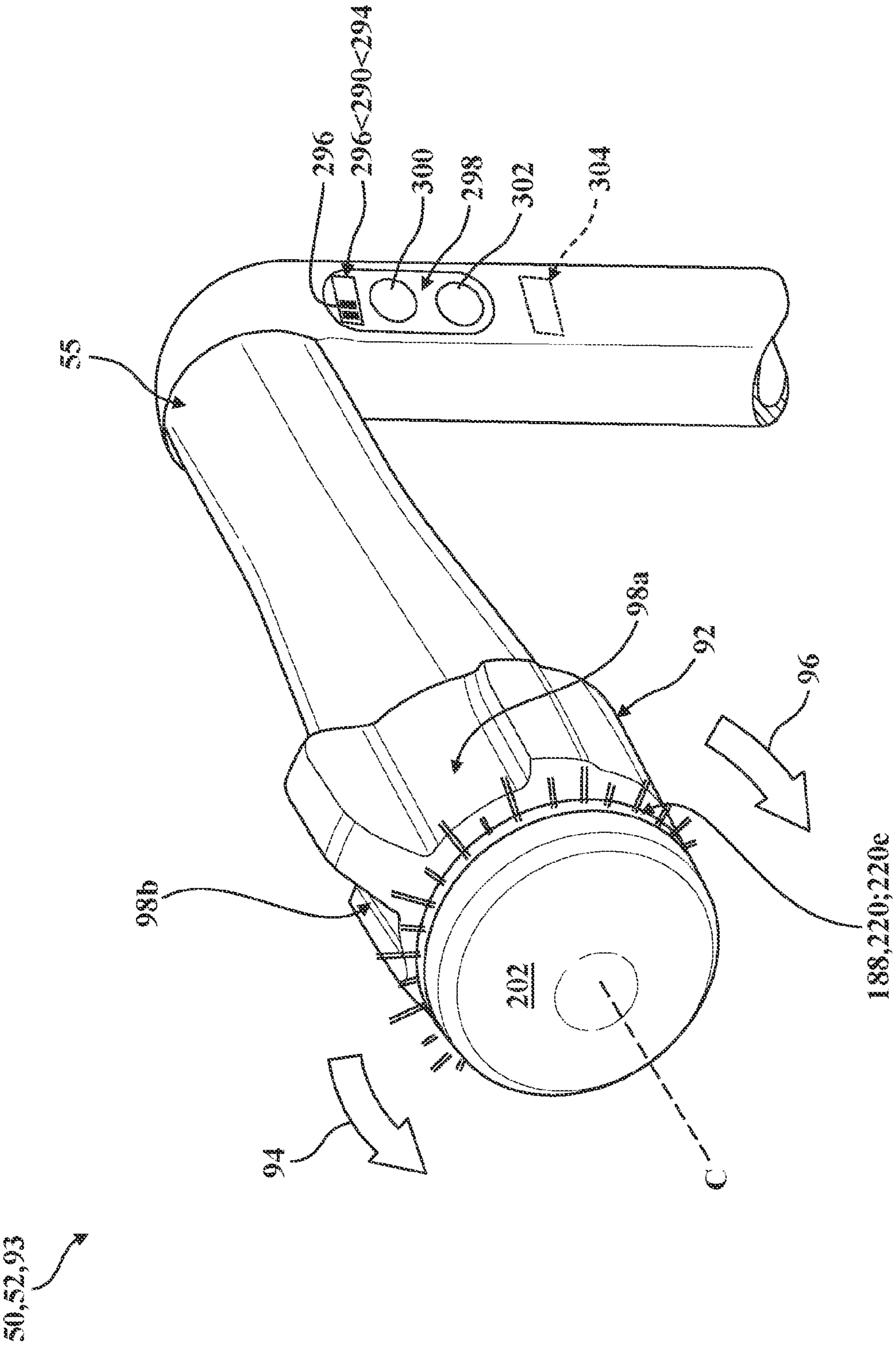
FIG. 18B is another partial perspective view of the handle and the throttle assembly of the patient transport apparatus of FIG. 12, shown with the status indicator operating in an auxiliary third output state.
Figure 19:
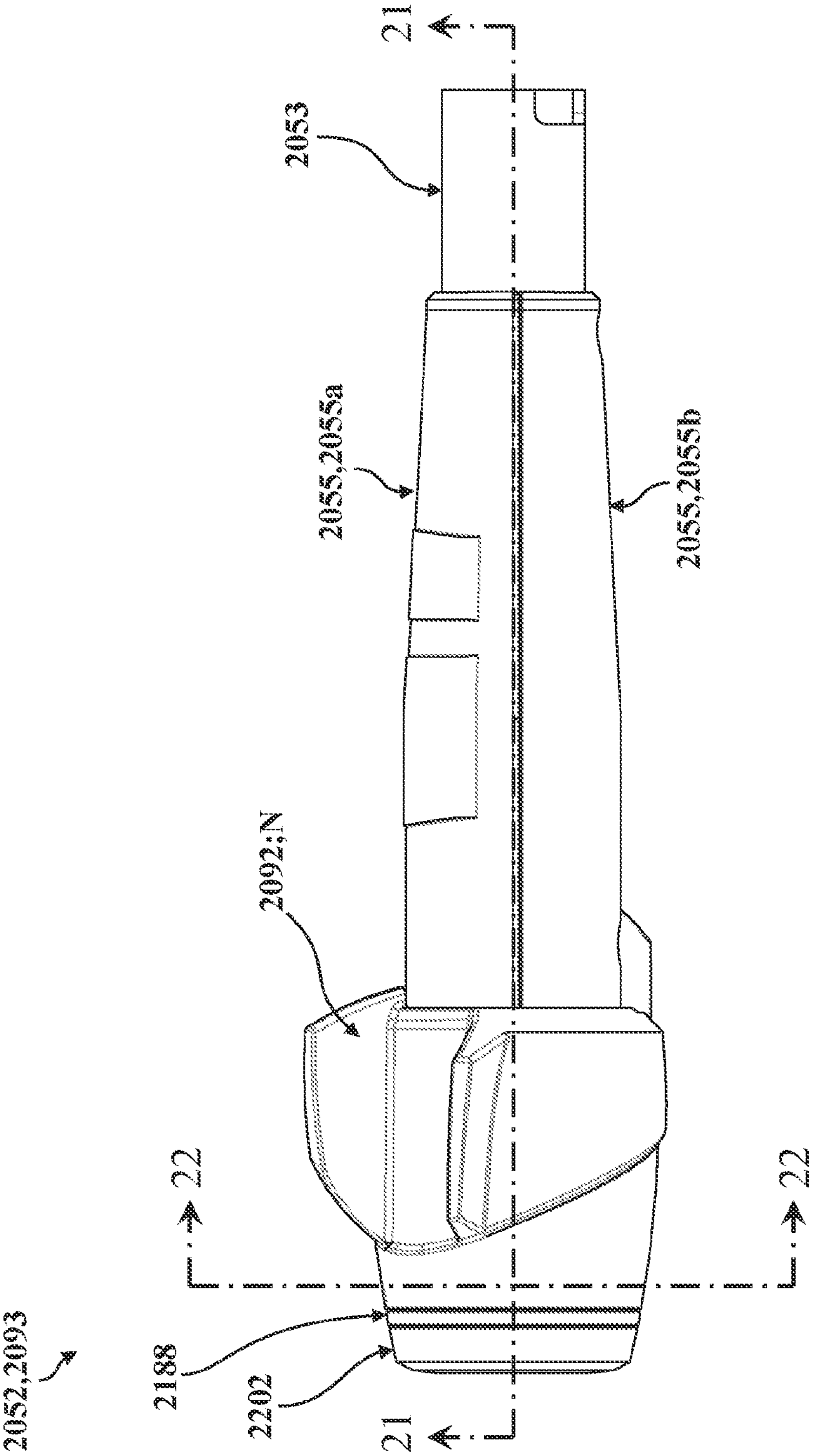
FIG. 19 is a left-side plan view of another version of a user interface of the patient transport apparatus, the user interface shown having a throttle assembly including a throttle and a handle with a coupling body, an inner support, a handle body.

As noted above, the battery 128 (depicted schematically in FIG. 10) is employed to facilitate supplying power to the auxiliary wheel drive system 90 and the lift actuator 66, and is also generally disposed in electrical communication with the controller 126. Here, the controller 126 is configured to determine a level of charge of the battery 128 between various predetermined charge thresholds. In some versions, a first predetermined charge threshold 290 is defined by the battery 128 being less than fully charged but sufficiently charged to generally facilitate operation of the auxiliary wheel drive system 90 and the lift actuator 66 (e.g., with enough charge to propel the patient transport apparatus 20 along a typical route, such as across a hospital). Similarly, in some versions, a second predetermined charge threshold 292 is defined by the battery being depleted to the point where there is insufficient charge to facilitate operation of the auxiliary wheel drive system 90 and/or the lift actuator 66 (e.g., without enough charge to propel the patient transport apparatus 20 along a typical route, such as across a hospital). In some versions, such as those depicted in FIGS. 12 and 17A-18B, one or more portions of the handle 52 (and/or another user interface 50) comprises a battery charge indicator 294 comprising a plurality of segments 296 (e.g., realized with single or multi-color light emitting diodes LEDs) to communicate a relative charge of the battery 128 to the user. As will be appreciated from the subsequent description below, for illustrative purposes, the battery charge indicator 294 is depicted in FIGS. 12 and 17A-17B with four "illuminated" segments 296 to indicate that the battery 128 is "fully charged" at a level above both the first and second predetermined charge thresholds 290, 292. On the other hand, the battery charge indicator 294 is depicted in FIGS. 18A-18B with two "illuminated" segments 296 to indicate that the battery 128 is "half charged" at a level between the first and second predetermined charge thresholds 290, 292.

In some versions, the status indicator 220 is further operable in an auxiliary second output state 220*d* (see FIG. 18A), different from the second output state 220*b* (see FIG. 17A), to indicate to the user that the auxiliary wheel 64 is moving between the positions 68, 70, 72 when the controller 126 determines that the battery 128 has a level of charge below the predetermined first charge threshold 290. Here, the status indicator 220 is also operable in an auxiliary third output state 220*e* (see FIG. 18B), different from the third output state 220*c* (see FIG. 17B), to indicate to the user that the auxiliary wheel 64 is in the deployed position 68 (see FIG. 5C) when the controller 126 determines that the battery 128 has a level of charge below the predetermined first charge threshold 290. Put differently, the second output state 220*b* (see FIG. 17A) and the auxiliary second output state 220*d* (see FIG. 18A) are similar in that they are both configured to communicate to the user that their engagement with the throttle assembly 93 was recognized and that the lift actuator 66 is moving, while remaining distinguishable from each other (and from each of the other output states) to communicate additional information to the user relating to the level of charge of the battery 128. Similarly, the third output the second output state 220*c* (see FIG. 17B) and the auxiliary third output state 220*e* (see FIG. 18B) are similar in that they are both configured to communicate to the user that the auxiliary wheel 64 has been deployed and the auxiliary wheel drive system 90 is "ready for use" while remaining distinguishable from each other (and from each of the other output states) to communicate additional information to the user relating to the level of charge of the battery 128.

In some versions, the second output state 220*b* (see FIG. 17A) is further defined as a repeating sequence of light emission in a first color followed by an absence of light emission (e.g., "blinking" green light emitted via the one or more light modules 218), and the auxiliary second output state 220*d* (see FIG. 18A) is further defined as a repeating sequence of light emission in a second color followed by an absence of light emission (e.g., "blinking" amber light emitted via the one or more light modules 218). For illustrative purposes, FIG. 17A depicts "blinking green light" emission with a single set of dashed lines, whereas FIG. 18A depicts "blinking amber light" emission with a double set of dashed lines. Furthermore, in some versions, the third output state 220*c* (see FIG. 17B) is further defined as light emission in the first color (e.g., "constant" green light emitted via the one or more light modules 218), and the auxiliary third output state 220*e* (see FIG. 18B) is further defined as light emission in the second color (e.g., "constant" amber light emitted via the one more light modules 218). For illustrative purposes, FIG. 17B depicts "constant green light" emission with a single set of solid lines, whereas FIG. 18B depicts "constant amber light" emission with a double set of solid lines.

With the configuration described above, the user can readily determine the relative charge level of the battery 128 after engaging the throttle assembly 93 based, in the illustrated version, on the color of the light emitted by the status indicator 220. Thus, in this version, observing green light emitted from the status indicator 220 indicates to the user that charging is not immediately required, whereas observing amber light emitted from the status indicator 220 indicates to the user that the battery 128 is sufficiently charged to operate the auxiliary wheel drive system 90 but charging may be required after a certain amount of use. In some versions, the controller 126 may also be configured to operate the status indicator 220 in other output states (e.g., to emit "blinking red light") in response to user engagement with the throttle assembly 93 determined by the one or more user interface sensors 88, 88*a* whenever the battery 128 charge has been depleted to a level below the second predetermined charge threshold 292. Here in this illustrative example, rather than moving the lift actuator 66 to bring the auxiliary wheel 64 toward the deployed position 68 when the battery 128 is "close to dead," the emission of "blinking red light" communicates to the user that the battery 128 needs to be charged while still acknowledging their engagement with the one or more user interface sensors 88, 88*a*. Other configuration are contemplated. Furthermore, in some versions, the controller 126 is further configured to operate the lift actuator 66 to move the auxiliary wheel to the retracted position 70 (see FIG. 5A) in response to the battery 128 being below the second predetermined charge threshold 292 irrespective of engagement by the user with the throttle assembly 93 determined by the one or more user interface sensors 88, 88*a*. Put differently, if the battery 128 charge is depleted significantly during use, the controller 126 can retract the auxiliary wheel 64 via the lift actuator 66 so as not to inhibit the user's ability to "manually" propel the patient transport apparatus 20 without the auxiliary wheel drive system 90.

It will be appreciated that other types of light emission via the one or more light modules 218 are contemplated by the present disclosure besides those described herein with respect to the output states 220*a*, 220*b*, 220*c*, 220*d*, 220*e*. By way of non-limiting example, light emission could occur in a variety of different colors, at different brightness levels, at different frequencies, in different patterns, and/or various combinations of each, sufficient to differentiate from each other in a way that can be observed by the user. By way of illustrative example, in addition to changing color when operating in the second auxiliary output state 220*d*, the controller 126 could also be configured to "blink" at a faster speed compared to when operating in the second output state 220*b*. Furthermore, while the first output state 220*a* is described and illustrated herein as an absence of light emission, light could alternatively be emitted in the first output state 220*a* sufficient to differentiate from the other output states (e.g., at a relatively dim brightness level, in another color, and the like). Other configurations are contemplated.

In the version illustrated in FIGS. 12 and 17A-18B, a lift interface, generally indicated at 298, is operatively attached to the handle body 55 and is disposed in spaced relation to the throttle 92. Here, the lift interface 298 comprises first and second lift buttons 300, 302 arranged for engagement by the user and disposed in electrical communication with the controller 126 to facilitate operation of the bed lift actuator

37*a* of the lift assembly 37 to respectively raise and lower the support frame 36 relative to the base 24 (see FIG. 1). Here too, the lift interface 298 comprises the battery charge indicator 294 which, as noted above, comprises the plurality of segments 296. In some versions, the first and second lift buttons 300, 302 comprise capacitive touch sensors, and the controller 126 is configured to drive the bed lift actuator 37*a* of the lift assembly 37 in response to engagement by the user. Other configurations are contemplated.

In some versions, a handle position sensor 304 is coupled to one or more of the user interfaces 50 (e.g., the first and second handles 52, 54) to determine movement relative to the intermediate frame 26, or another part of the patient transport apparatus 20, between the use position PU arranged for engagement by the user, and the stow position PS (depicted in phantom in FIG. 1). Here, the handle position sensor 304 is disposed in communication with the controller 126 which, in turn, may be configured to enable/disable various aspects of the throttle assembly 93, the lift interface 298, and the like based on the relative position of the handle 52. By way of non-limiting example, the controller 126 may be configured to ignore rotation of the throttle 92 determined by the throttle position sensor 208 when the handle position sensor 304 determines that the handle 52 is not in the use position PU. In some versions, the handle position 304 is realized with one or more inertial sensors, such as accelerometers, gyroscopes, and the like. However, other configurations are contemplated.

As noted above, another version of the throttle assembly and handle of the user interface of the patient transport apparatus 20 is shown in FIGS. 19-23C. In the description that follows, the structure and components that are the same as or that otherwise correspond to the structure and components of versions described above are provided with the same reference numerals increased by 2000. Because many of the components and features of the version of the throttle assembly 2093 of FIGS. 19-23C of are substantially similar to those of the other versions of the throttle assembly 93 described above (e.g., in connection with FIGS. 6A-8F and/or 12-18B), for the purposes of clarity, consistency, and brevity, only certain specific differences between the version of the throttle assembly 2093 of FIGS. 19-23C and the other versions of the throttle assembly 93 will be described below, and only some of the components and features common between the versions will be discussed herein and depicted in the drawings. Thus, unless otherwise indicated below, the preceding description of other versions of the throttle assembly 93 (as well as other portions of the patient transport apparatus 20) may be incorporated by reference with respect to the version of the throttle assembly 2093 of FIGS. 19-23C without limitation.

Referring now to FIGS. 19-23C, here too the throttle assembly 2093 is arranged for engagement by the user and is operably coupled to the wheel drive system 90 (e.g., via the controller 126 or other portions of the control system 124) to enable the user to modulate propulsion of the patient transport apparatus 20 between the forward direction FW and the rearward direction RW via driving or otherwise effecting rotation of the wheel 64 (e.g., via the motor 102) at different rotational speeds in the deployed position 68. To this end, the throttle assembly 2093 similarly includes the handle 2052 configured to be gripped by the user, and the throttle 2092 arranged for user-selected rotation relative to the handle 2052 about the central axis C between the maximum forward throttle position 2108 and the maximum backward throttle position 2112. Here too, the throttle assembly 2093 employs the throttle biasing element 2091 to urge the throttle 2092 toward the neutral throttle position N defined between the maximum forward throttle position 2108 and the maximum backward throttle position 2112. However, when compared to the other versions of the throttle assembly 93 described above, however, the version of the throttle assembly 2093 of FIGS. 19-23C employs a limiter, generally indicated at 2306, to restrict rotation of the throttle 2092 relative to the handle 2052, and employs a guide 2308, a first limit surface 2310, and a second limit surface 2312 spaced from the first limit surface 2310. The guide 2308 is arranged to abut the first limit surface 2310 to inhibit rotation of the throttle 2092 beyond the maximum forward throttle position 2108, and to abut the second limit surface 2312 to inhibit rotation of the throttle 2092 beyond the maximum backward throttle position 2112. Here, as is described in greater detail below, the limiter 2306 cooperates with the throttle 2092, the handle 2052, and the throttle biasing element 2091 to facilitate asymmetric rotation of the throttle 2092 about the central axis C whereby the guide 2308 is positioned closer to the second limit surface 2312 than to the first limit surface 2310 when the throttle 2092 is disposed in the neutral throttle position N (see FIGS. 22A and 23A), and such that rotation of the throttle 2092 from the neutral throttle position N to the maximum forward throttle position 2108 occurs along a first arc path 2314 (see FIG. 22B) and rotation of the throttle 2092 from the neutral throttle position N to the maximum backward throttle position 2112 occurs along a second arc path 2316 (see FIG. 22C) that is smaller than the first arc path 2314.

As will be appreciated from the subsequent description below, the configuration of this version of the throttle assembly 2093 affords significant advantages relating to usability under a variety of different operating conditions. For example, because the first arc path 2314 is larger than the second arc path 2316, the user is able to rotate the throttle 2092 further in the first direction 2094 from the neutral throttle position N than in the second direction 2096 which, in turn, provides the user with the ability to modulate user to modulate propulsion of the patient transport apparatus 20 with a higher level of sensitivity in the forward direction FW. This can be particularly advantageous during propulsion of the patient transport apparatus 20 in the forward direction FW where differences in elevation are encountered by the user (e.g., transitioning onto or off of a ramp, incline, and the like). Here, for example, transitioning onto or off of a ramp necessarily changes how the throttle assembly 2093 becomes positioned relative to the user, who may have to adjust their engagement with the throttle assembly 2093 to maintain a desired propulsion speed. However, because users of different heights (e.g., a relatively short caregiver compared to a relatively tall caregiver) generally engage the throttle assembly 2093 in respectively different ways (e.g., defined such as by how their arms are articulated relative to their torsos), the amount of adjustment of engagement with the throttle assembly 2093 for different users may vary significantly for different users. Here, it will be appreciated that the ability to rotate the throttle 2092 further in the first direction 2094 from the neutral throttle position N than in the second direction 2096, while also limiting how far the throttle 2092 can rotate in either direction 2094, 2096, helps optimize usability throughout the entire rotatable range of the throttle 2092 for different users (e.g., without requiring excessive rotation to achieve either the maximum forward throttle position 2108 or the maximum backward throttle position 2112) while, at the same time, allowing different users to predictably and reliably modulate the speed of the patient transport apparatus 20.

Figure 22C:
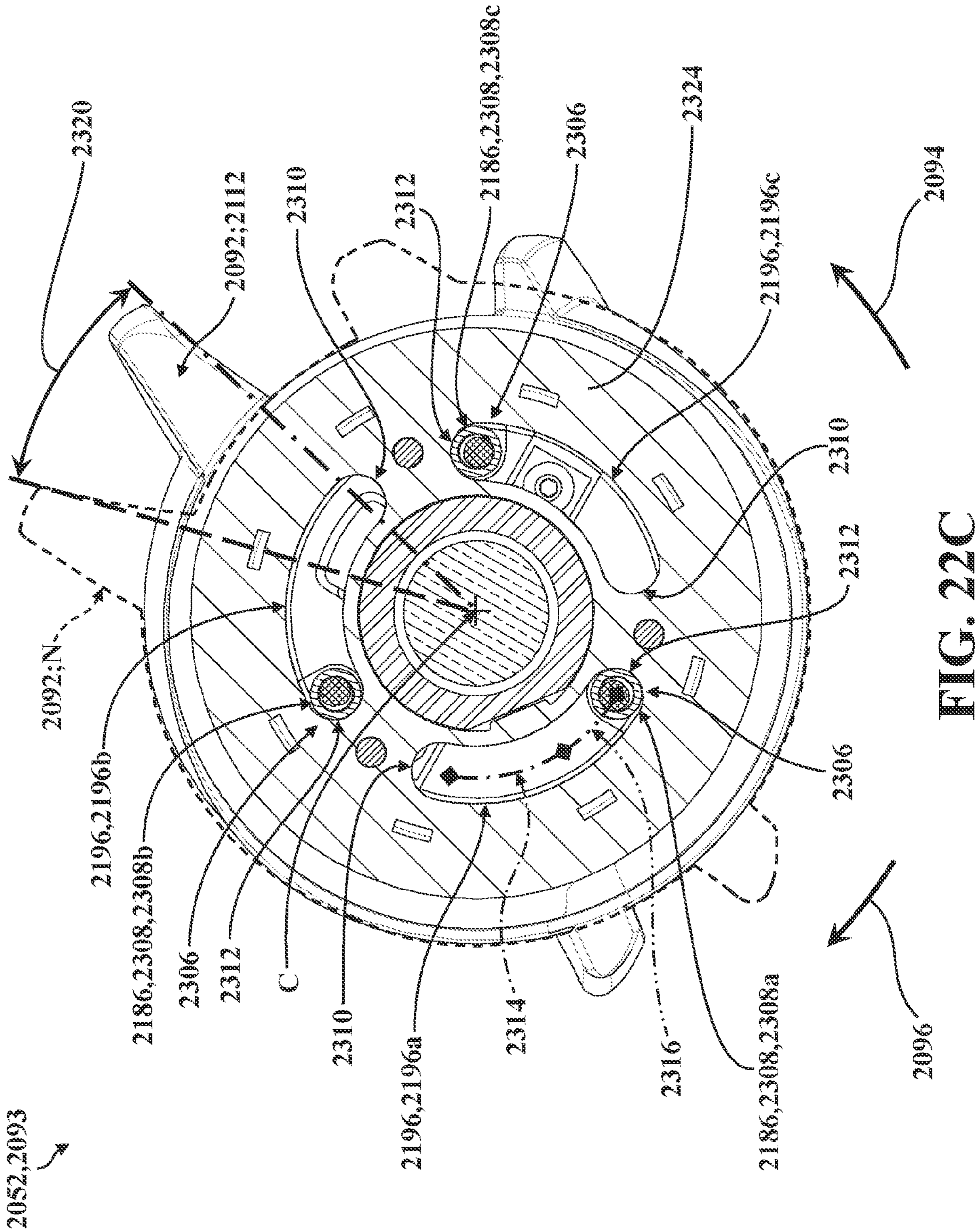
FIG. 22C is another sectional view of the throttle assembly and the handle taken as indicated by line 22-22 in FIG. 19, depicting the throttle in a maximum backward throttle position relative to the handle.

Movement of the throttle 2092 along the first arc path 2314 from the neutral throttle position N to the maximum forward throttle position 2108 rotate the throttle 2092 a first angular distance 2318 about the central axis C (see FIG. 22B), and movement of the throttle 2092 along the second arc path 2316 from the neutral throttle position N to the maximum backward throttle position 2112 rotates the throttle a second angular distance 2320 about the central axis C (see FIG. 22C). The first angular distance 2318 larger than the second angular distance 2320. In the illustrated version, a sum of the first angular distance 2318 and the second angular distance 2320 is approximately 70-degrees. This configuration affords ergonomic usability throughout the entire rotational range of the throttle 2092 for caregivers of different heights. In the illustrated version, the first angular distance 2318 is approximately 45-degrees, and the second angular distance 2320 is approximately 25-degrees. Here too, this configuration affords ergonomic usability and predictable, reliable engagement during modulation along the first arc path 2314 for caregivers of different heights. However, it will be appreciated that other configurations are contemplated. In some versions, a ratio of the first angular distance 2318 to the second angular distance 2320 is greater than 1.15:1. In some versions, a ratio of the first angular distance 2318 to the second angular distance 2320 is greater than 1.5:1. In some versions, the ratio of the first angular distance 2318 to the second angular distance 2320 is at least 1.8:1. In some configuration, the first angular distance 2318 is at least 45-degrees.

Figure 20A:
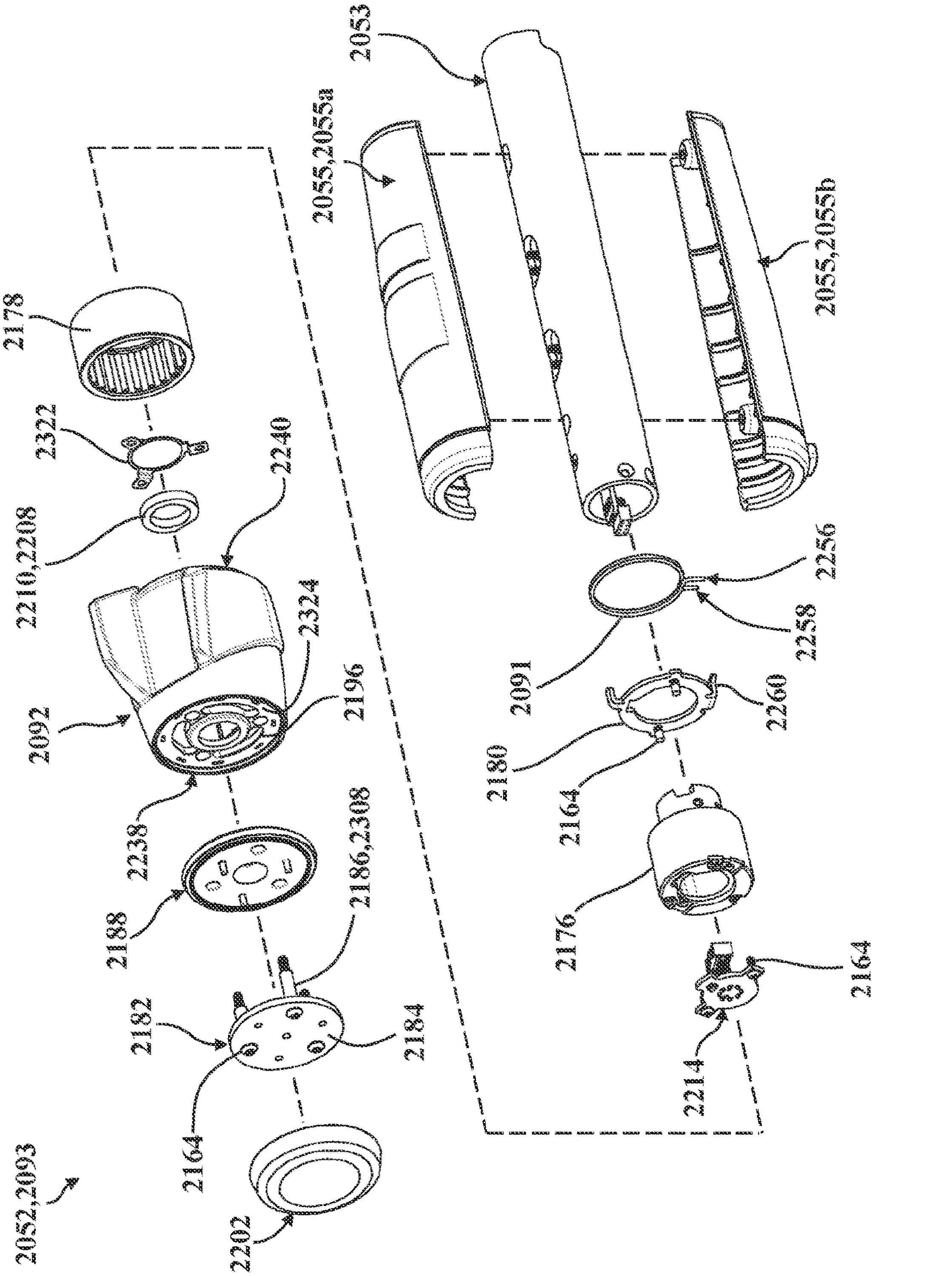
FIG. 20A is a partially-exploded perspective view of portions of the handle and the throttle assembly of FIG. 19.
Figure 20B:
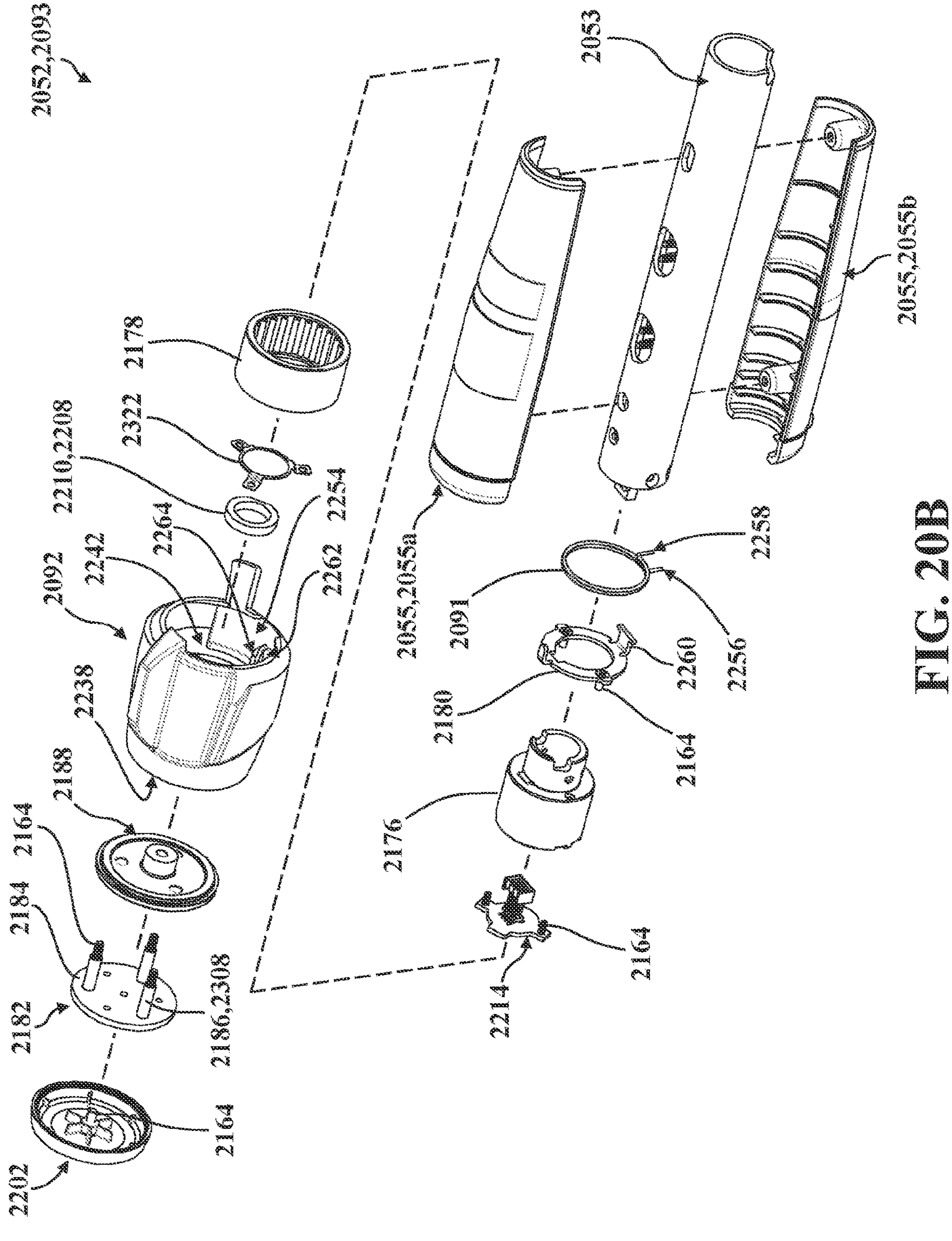
FIG. 20B is another partially-exploded perspective view of the portions of the handle and the throttle assembly of FIG. 20A.
Figure 21:
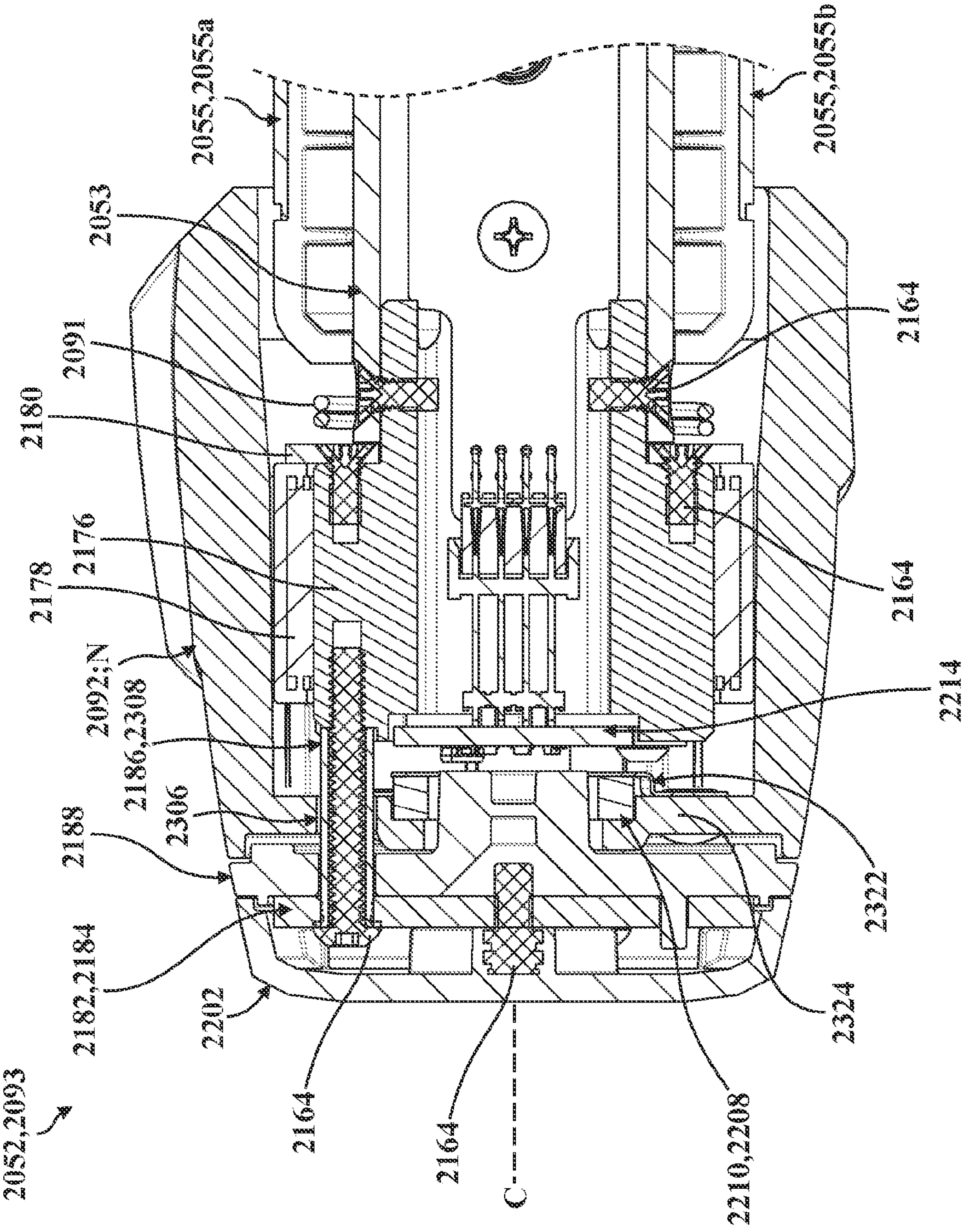
FIG. 21 is a broken, partial sectional view taken along line 21-21 in FIG. 19.

As is best shown in FIGS. 20A-20B, the handle 2052 of the throttle assembly 2093 generally includes the inner support 2053, the coupling body 2176, and the first and second handle body members 2055*a*, 2055*b* to, among other things, facilitate rotatably supporting the throttle 2092 via the bearing 2178. Here too, the retainer 2182 is arranged generally between the end cap 2202 and the light guide 2188 along the central axis C. The throttle circuit board 2214 and the keeper plate 2180 are operatively attached to the coupling body 2176 via fasteners 2164 (e.g., bolts, screws, and the like). In this version, the end cap 2202 retains the light guide 2188 via a fastener 2164. Furthermore, in this version, the emitter 2210 of the throttle position sensor 2208 is further retained via a emitter bracket 2322 operatively attached to the throttle 2092 via fasteners 2164 (e.g., rivets).

In the version of the throttle assembly 2093 illustrated in FIGS. 19-23C, the throttle 2092 defines a seat body 2324 arranged adjacent to the distal throttle end 2238 and into which the arc slots 2196 are formed extending through the seat body 2324. Here, one of the arc slots 2196 defines the first limit surface 2310 and the second limit surface 2312 of the limiter 2306, and the guide 2308 is operatively attached to the handle 2052 and extends at least partially into the arc slot 2196 (see FIG. 21), with rotation of the throttle 2092 about the central axis C effecting movement of the first limit surface 2310 and the second limit surface 2312, concurrent with the throttle 2092, relative to the guide 2308. However, it will be appreciated that other configurations are contemplated, and rotation of the throttle 2092 could instead effect movement of the guide 2308 concurrent with the throttle 2092 relative to the first limit surface 2310 and the second limit surface 2312.

The guide 2308 has a substantially cylindrical profile, and is defined by one of the retainer braces 2186 in the illustrated version. Here too, the first limit surface 2310 and the second limit surface 2312 each have rounded profiles complimentary to the cylindrical profile of the guide 2308. The guide 2308 is arranged parallel to and spaced from the central axis C. In the illustrated version, the throttle 2092 has first, second, and third arc slots 2196*a*, 2196*b*, 2196*c* (see FIG. 22C) each formed extending through the seat body 2324, and the limiter includes first, second, and third guides 2308*a*, 2308*b*, 2308*c* (see FIG. 22C) operatively attached to the handle 2052 and extending, respectively, at least partially into the first, second, and third arc slots 2196*a*, 2196*b*, 2196*c*. Here, it will be appreciated that one or more of the first, second, and third arc slots 2196*a*, 2196*b*, 2196*c* could define the first limit surface 2310 and/or the second limit surface 2312 of the limiter, and that one or more of the first, second, and third guides 2308*a*, 2308*b*, 2308*c* could serve as the guide 2308 of the limiter 2306 (see FIG. 22C). The first, second, and third guides 2308*a*, 2308*b*, 2308*c* are each arranged parallel to and spaced from the central axis C, and are radially spaced from each other about the central axis C. Similarly, the first, second, and third arc slots 2196*a*, 2196*b*, 2196*c* are radially spaced from each other about the central axis C.

Figure 23A:
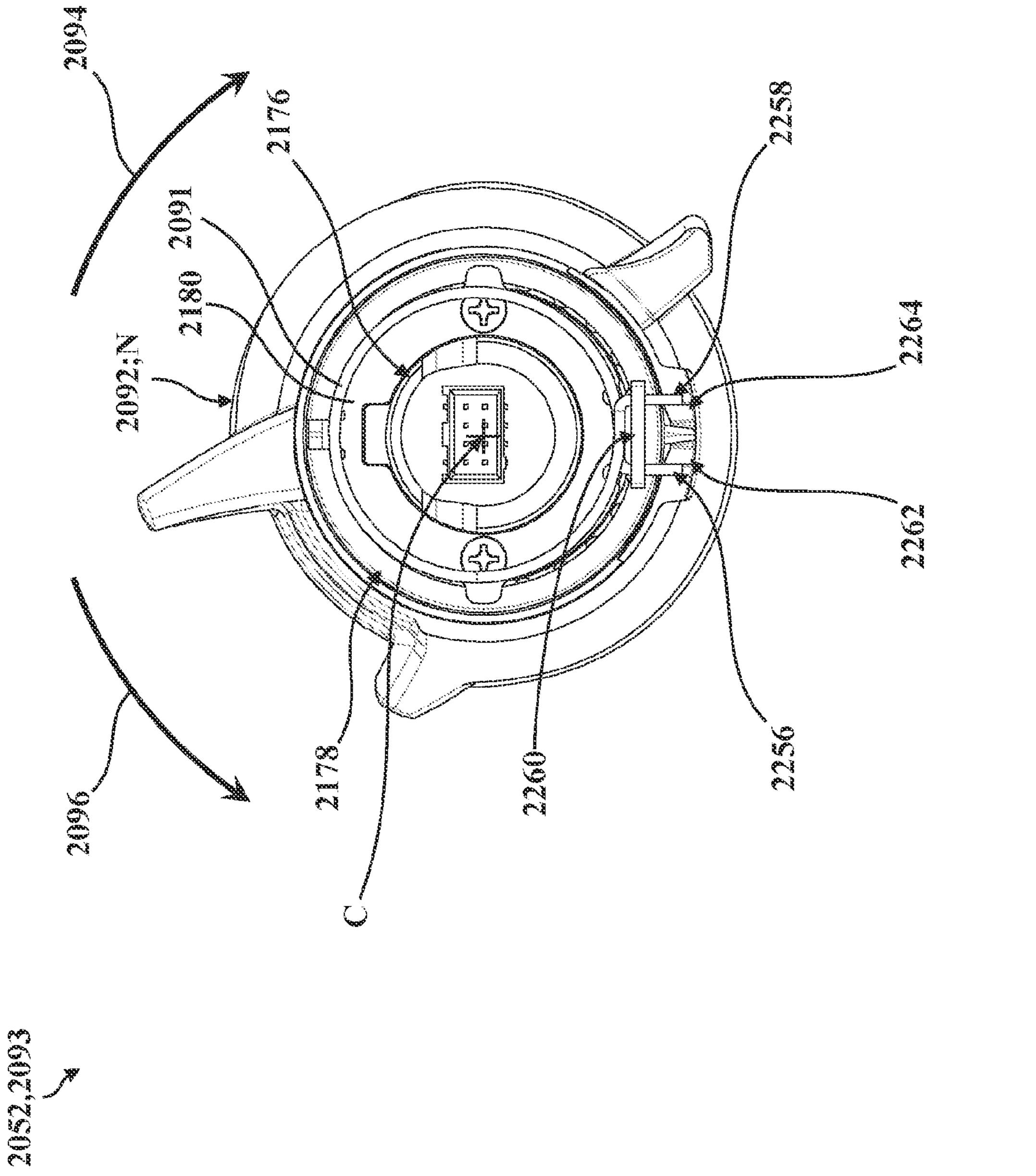
FIG. 23A is a rear-side plan view of portions of the throttle assembly and the handle of FIGS. 19-22C, depicted without the handle body or the inner support of the handle for illustrative purposes, and shown with the throttle arranged in the neutral throttle position relative to the handle
Figure 23B:
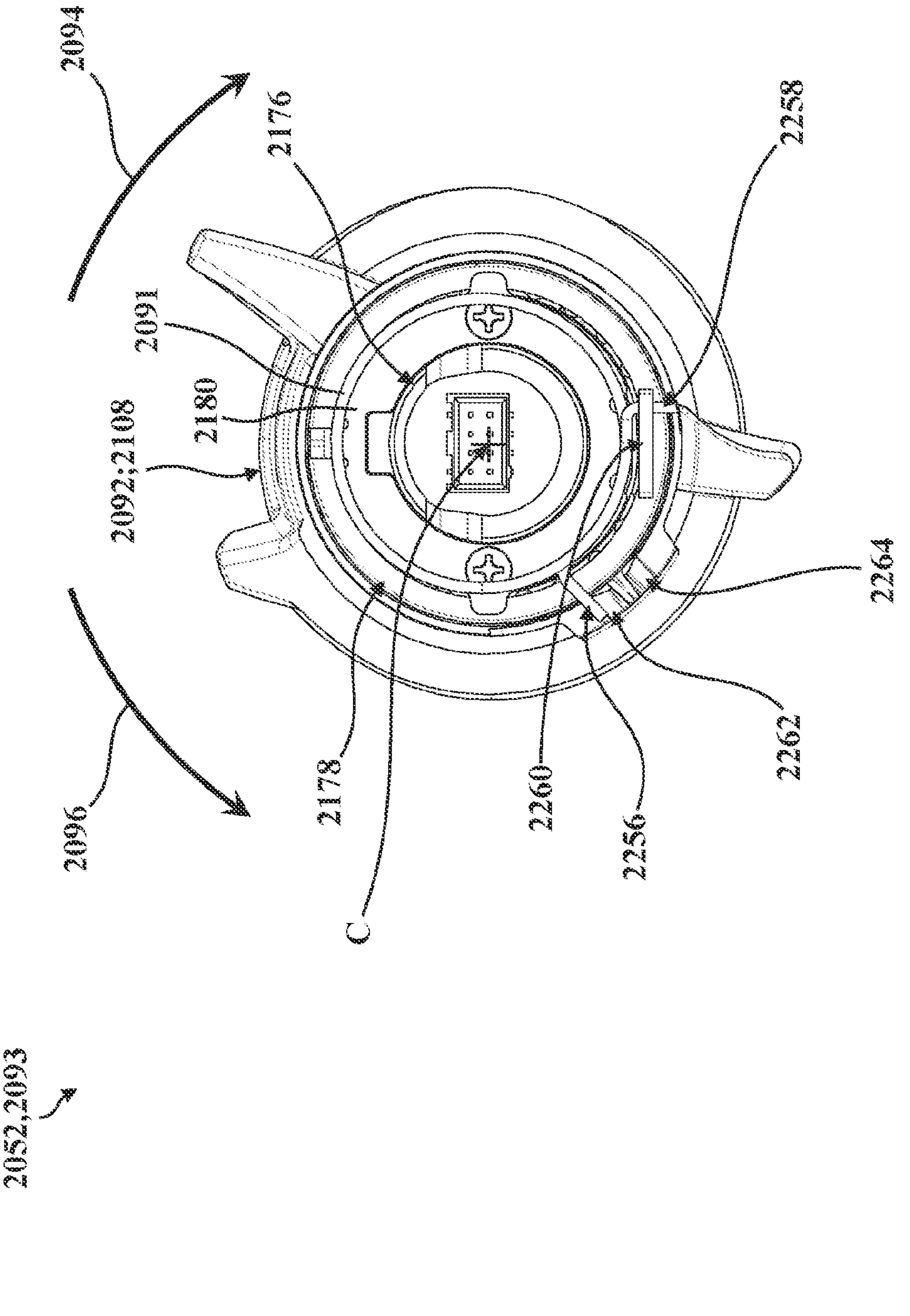
FIG. 23B is another a rear-side plan view of portions of the throttle assembly and the handle of FIGS. 19-23A, depicted without the handle body or the inner support of the handle for illustrative purposes, and shown with the throttle arranged in the maximum forward throttle position relative to the handle.
Figure 23C:
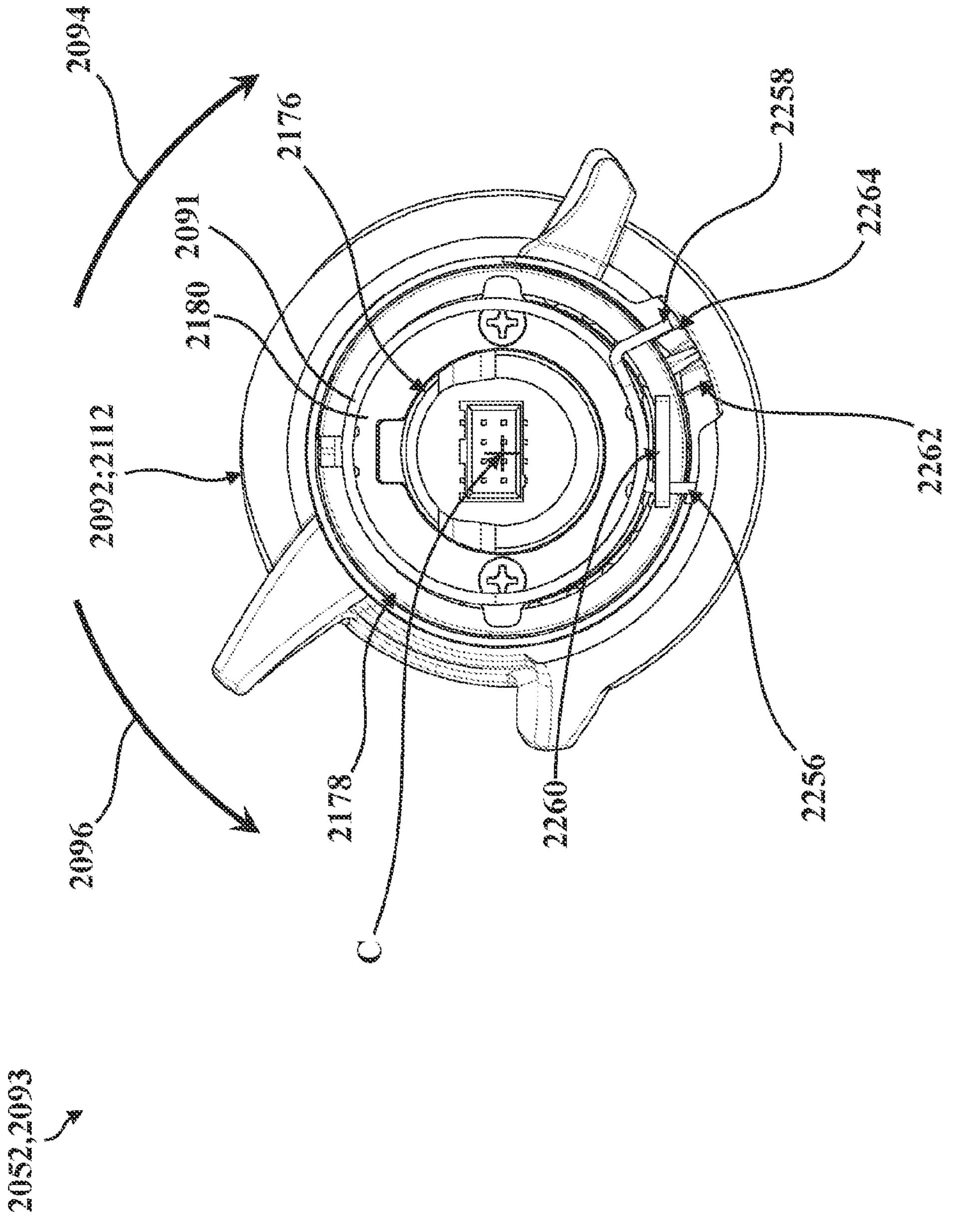
FIG. 23C is a rear-side plan view of portions of the throttle assembly and the handle of FIGS. 19-22C, depicted without the handle body or the inner support of the handle for illustrative purposes, and shown with the throttle arranged in the maximum backward throttle position relative to the handle.

The first, second, and third guides 2308*a*, 2308*b*, 2308*c* are each realized as cylindrical tubes that are operatively attached to the coupling body 2176 via fasteners 2164 extending through the retainer plate 2184 of the retainer 2182. As noted above, the coupling body 2176 is operatively attached to the handle 2052, and the keeper plate 2180 is operatively attached to the coupling body 2176 to at least partially support the throttle biasing element 2091. The first and second tangs 2256, 2258 of the throttle biasing element 2091 are each arranged to engage against the keeper stop element 2260 of the keeper plate 2180 when the throttle 2092 is disposed in the neutral throttle position N (see FIG. 23A). The throttle 2092 includes first and second throttle stop elements 2262, 2264 disposed in the channel 2254. As shown in FIG. 23A, the first tang 2256 of the throttle biasing element 2091 engages against the first throttle stop element 2262 when the throttle 2092 is disposed in the neutral throttle position N, and the second tang 2258 of the throttle biasing element 2091 engages against the second throttle stop element 2264 when the throttle 2092 is disposed in the neutral throttle position N. As shown in FIG. 23B, the first tang 2256 disengages from the keeper stop element 2260 when the throttle 2092 moves from the neutral throttle position N to the maximum forward throttle position 2108 along the first arc path 2314 (see FIG. 22B; compare with FIG. 23B). Here too, the first tang 2256 remains in engagement with the first throttle stop element 2262 when the throttle 2092 moves from the neutral throttle position N to the maximum forward throttle position 2108 along the first arc path 2314. As shown in FIG. 23C, the second tang 2258 disengages from the keeper stop element 2260 when the throttle 2092 moves from the neutral throttle position N to the maximum backward throttle position 2112 along the second arc path 2316. Here too, the second tang 2258 remains in engagement with the second throttle stop element 2264 when the throttle 2092 moves from the neutral throttle position N to the maximum backward throttle position 2112 along the second arc path 2316 (see FIG. 22C; compare with FIG. 23C).

In this way, the versions described herein afford significant advantages in a number of different applications where patient transport apparatuses 20 are utilized.

It will be further appreciated that the terms “include,” “includes,” and “including” have the same meaning as the terms “comprise,” “comprises,” and “comprising.” Moreover, it will be appreciated that terms such as “first,” “second,” “third,” and the like are used herein to differentiate certain structural features and components for the non-limiting, illustrative purposes of clarity and consistency.

Several versions and configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

CLAUSES

I. A patient transport apparatus comprising:
- a support structure;
- a wheel coupled to the support structure to influence motion of the patient transport apparatus over a floor surface;
- a wheel drive system coupled to the wheel to rotate the wheel relative to the support structure at a rotational speed; and a throttle assembly arranged for engagement by a user and operably coupled to the wheel drive system to enable the user to modulate propulsion of the patient transport apparatus between a forward direction and a rearward direction, the throttle assembly including:
  - a handle configured to be gripped by the user,
  - a throttle arranged for user-selected rotation relative to the handle about a central axis between a maximum forward throttle position and a maximum backward throttle position,
  - a throttle biasing element interposed between the throttle and the handle to urge the throttle toward a neutral throttle position defined between the maximum forward throttle position and the maximum backward throttle position, and
  - a limiter to restrict rotation of the throttle relative to the handle, the limiter including a guide, a first limit surface, and a second limit surface spaced from the first limit surface, with the guide arranged to abut the first limit surface to inhibit rotation of the throttle beyond the maximum forward throttle position, and to abut the second limit surface to inhibit rotation of the throttle beyond the maximum backward throttle position;
  - wherein the guide is positioned closer to the second limit surface than to the first limit surface when the throttle is disposed in the neutral throttle position such that rotation of the throttle from the neutral throttle position to the maximum forward throttle position occurs along a first arc path and rotation of the throttle from the neutral throttle position to the maximum backward throttle position occurs along a second arc path smaller than the first arc path.

II. The patient transport apparatus as set forth in clause I, wherein movement of the throttle along the first arc path from the neutral throttle position to the maximum forward throttle position rotates the throttle a first angular distance about the central axis; wherein movement of the throttle along the second arc path from the neutral throttle position to the maximum backward throttle position rotates the throttle a second angular distance about the central axis; and wherein a ratio of the first angular distance to the second angular distance is greater than 1.15:1.

III. The patient transport apparatus as set forth in clause II, wherein the ratio of the first angular distance to the second angular distance is greater than 1.5:1.

IV. The patient transport apparatus as set forth in clause II, wherein the ratio of the first angular distance to the second angular distance is at least 1.8:1.

V. The patient transport apparatus as set forth in any of clauses II-IV, wherein a sum of the first angular distance and the second angular distance is at least 70-degrees.

VI. The patient transport apparatus as set forth in clause V, wherein the first angular distance is at least 45-degrees.

VII. The patient transport apparatus as set forth in any of clauses I-VI, wherein the guide of the limiter is operatively attached to the handle; wherein the throttle includes a seat body with an arc slot formed extending through the seat body, the arc slot defining the first limit surface and the second limit surface of the limiter; and wherein the guide extends at least partially into the arc slot, with rotation of the throttle about the central axis effecting movement of the first limit surface and the second limit surface relative to the guide.

VIII. The patient transport apparatus as set forth in clause VII, wherein the guide has a cylindrical profile; and
- wherein the first limit surface and the second limit surface each have rounded profiles.

IX. The patient transport apparatus as set forth in any of clauses VII-VIII, wherein the guide is arranged parallel to and spaced from the central axis.

X. The patient transport apparatus as set forth in any of clauses VII-IX, wherein the throttle further includes a second arc slot and a third arc slot each formed extending through the seat body; and wherein the limiter further includes a second guide operatively attached to the handle and extending at least partially into the second arc slot, and a third guide operatively attached to the handle and extending at least partially into the third arc slot.

XI. The patient transport apparatus as set forth in clause X, wherein the guide, the second guide, and the third guide are each arranged parallel to and spaced from the central axis.

XII. The patient transport apparatus as set forth in clause XI, wherein the guide, the second guide, and the third guide are radially spaced from each other about the central axis.

XIII. The patient transport apparatus as set forth in any of clause X-XII, wherein the arc slot, the second arc slot, and the third arc slot are radially spaced from each other about the central axis.

XIV. The patient transport apparatus as set forth in any of clauses I-XIII, wherein the throttle assembly includes a coupling body operatively attached to the handle, and a keeper plate coupled to the coupling body to at least partially support the throttle biasing element.

XV. The patient transport apparatus as set forth in clause XIV, wherein the keeper plate includes a keeper stop element; and wherein the throttle biasing element includes first and second tangs each arranged to engage against the keeper stop element when the throttle is disposed in the neutral throttle position.

XVI. The patient transport apparatus as set forth in clause XV, wherein the throttle defines a distal throttle end and an opposing proximal throttle end with a throttle chamber formed extending from the proximal throttle end towards the distal throttle end, the throttle chamber including channel arranged adjacent to the proximal throttle end, and wherein the throttle further includes first and second throttle stop elements each disposed in the channel.

XVII. The patient transport apparatus as set forth in clause XVI, wherein the first tang of the throttle biasing element is arranged to engage the first throttle stop element when the throttle is disposed in the neutral throttle position;

wherein the first tang disengages from the keeper stop element when the throttle moves from the neutral throttle position to the maximum forward throttle position along the first arc path.

XVIII. The patient transport apparatus as set forth in clause XVII, wherein the first tang remains in engagement with the first throttle stop element when the throttle moves from the neutral throttle position to the maximum forward throttle position along the first arc path.

XIX. The patient transport apparatus as set forth in clause XVII, wherein the second tang of the throttle biasing element is arranged to engage the second throttle stop element when the throttle is disposed in the neutral throttle position; and wherein the second tang disengages from the keeper stop element when the throttle moves from the neutral throttle position to the maximum backward throttle position along the second arc path.

XX. The patient transport apparatus as set forth in clause XIX, wherein the second tang remains in engagement with the second throttle stop element when the throttle moves from the neutral throttle position to the maximum backward throttle position along the second arc path.

What is claimed is:

1. A patient transport apparatus comprising:

a support structure;

a wheel coupled to the support structure to influence motion of the patient transport apparatus over a floor surface;

a wheel drive system coupled to the wheel to rotate the wheel relative to the support structure at a rotational speed; and a throttle assembly arranged for engagement by a user and operably coupled to the wheel drive system to enable the user to modulate propulsion of the patient transport apparatus between a forward direction and a rearward direction, the throttle assembly including:

a handle configured to be gripped by the user, a throttle arranged for user-selected rotation relative to the handle about a central axis between a maximum forward throttle position and a maximum backward throttle position, a throttle biasing element interposed between the throttle and the handle to urge the throttle toward a neutral throttle position defined between the maximum forward throttle position and the maximum backward throttle position, and a limiter to restrict rotation of the throttle relative to the handle, the limiter including a guide, a first limit surface, and a second limit surface spaced from the first limit surface, with the guide arranged to abut the first limit surface to inhibit rotation of the throttle beyond the maximum forward throttle position, and to abut the second limit surface to inhibit rotation of the throttle beyond the maximum backward throttle position;

wherein the guide is positioned closer to the second limit surface than to the first limit surface when the throttle is disposed in the neutral throttle position such that rotation of the throttle from the neutral throttle position to the maximum forward throttle position occurs along a first arc path and rotation of the throttle from the neutral throttle position to the maximum backward throttle position occurs along a second arc path smaller than the first arc path.

2. The patient transport apparatus as set forth in claim 1, wherein movement of the throttle along the first arc path from the neutral throttle position to the maximum forward throttle position rotates the throttle a first angular distance about the central axis; wherein movement of the throttle along the second arc path from the neutral throttle position to the maximum backward throttle position rotates the throttle a second angular distance about the central axis; and wherein a ratio of the first angular distance to the second angular distance is greater than 1.15:1.

3. The patient transport apparatus as set forth in claim 2, wherein the ratio of the first angular distance to the second angular distance is greater than 1.5:1.

4. The patient transport apparatus as set forth in claim 2, wherein the ratio of the first angular distance to the second angular distance is at least 1.8:1.

5. The patient transport apparatus as set forth in claim 2, wherein a sum of the first angular distance and the second angular distance is at least 70-degrees.

6. The patient transport apparatus as set forth in claim 5, wherein the first angular distance is at least 45-degrees.

7. The patient transport apparatus as set forth in claim 1, wherein the guide of the limiter is operatively attached to the handle; wherein the throttle includes a seat body with an arc slot formed extending through the seat body, the arc slot defining the first limit surface and the second limit surface of the limiter; and wherein the guide extends at least partially into the arc slot, with rotation of the throttle about the central axis effecting movement of the first limit surface and the second limit surface relative to the guide.

8. The patient transport apparatus as set forth in claim 7, wherein the guide has a cylindrical profile; and wherein the first limit surface and the second limit surface each have rounded profiles.

9. The patient transport apparatus as set forth in claim 7, wherein the guide is arranged parallel to and spaced from the central axis.

10. The patient transport apparatus as set forth in claim 7, wherein the throttle further includes a second arc slot and a third arc slot each formed extending through the seat body; and wherein the limiter further includes a second guide operatively attached to the handle and extending at least partially into the second arc slot, and a third guide operatively attached to the handle and extending at least partially into the third arc slot.

11. The patient transport apparatus as set forth in claim 10, wherein the guide, the second guide, and the third guide are each arranged parallel to and spaced from the central axis.

12. The patient transport apparatus as set forth in claim 11, wherein the guide, the second guide, and the third guide are radially spaced from each other about the central axis.

13. The patient transport apparatus as set forth in claim 10, wherein the arc slot, the second arc slot, and the third arc slot are radially spaced from each other about the central axis.

14. The patient transport apparatus as set forth in claim 1, wherein the throttle assembly includes a coupling body operatively attached to the handle, and a keeper plate coupled to the coupling body to at least partially support the throttle biasing element.

15. The patient transport apparatus as set forth in claim 14, wherein the keeper plate includes a keeper stop element; and wherein the throttle biasing element includes first and second tangs each arranged to engage against the keeper stop element when the throttle is disposed in the neutral throttle position.

16. The patient transport apparatus as set forth in claim 15, wherein the throttle defines a distal throttle end and an opposing proximal throttle end with a throttle chamber formed extending from the proximal throttle end towards the distal throttle end, the throttle chamber including channel arranged adjacent to the proximal throttle end, and wherein the throttle further includes first and second throttle stop elements each disposed in the channel.

17. The patient transport apparatus as set forth in claim 16, wherein the first tang of the throttle biasing element is arranged to engage the first throttle stop element when the throttle is disposed in the neutral throttle position; and wherein the first tang disengages from the keeper stop element when the throttle moves from the neutral throttle position to the maximum forward throttle position along the first arc path.

18. The patient transport apparatus as set forth in claim 17, wherein the first tang remains in engagement with the first throttle stop element when the throttle moves from the neutral throttle position to the maximum forward throttle position along the first arc path.

19. The patient transport apparatus as set forth in claim 17, wherein the second tang of the throttle biasing element is arranged to engage the second throttle stop element when the throttle is disposed in the neutral throttle position; and wherein the second tang disengages from the keeper stop element when the throttle moves from the neutral throttle position to the maximum backward throttle position along the second arc path.

20. The patient transport apparatus as set forth in claim 19, wherein the second tang remains in engagement with the second throttle stop element when the throttle moves from the neutral throttle position to the maximum backward throttle position along the second arc path.

* * * * *